(12) United States Patent
Yamaguchi

(10) Patent No.: US 8,619,372 B2
(45) Date of Patent: Dec. 31, 2013

(54) ZOOM LENS SYSTEM, OPTICAL DEVICE WITH THE ZOOM LENS SYSTEM, AND METHOD OF MANUFACTURING THE ZOOM LENS SYSTEM

(71) Applicant: Nikon Corporation, Tokyo (JP)

(72) Inventor: Satoshi Yamaguchi, Sagamihara (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/732,709

(22) Filed: Jan. 2, 2013

(65) Prior Publication Data

US 2013/0120854 A1 May 16, 2013

Related U.S. Application Data

(62) Division of application No. 13/116,593, filed on May 26, 2011, now Pat. No. 8,363,332, which is a division of application No. 12/408,545, filed on Mar. 20, 2009, now Pat. No. 7,974,012.

(30) Foreign Application Priority Data

Mar. 31, 2008 (JP) .................. P2008-089058
Mar. 31, 2008 (JP) .................. P2008-089059
Mar. 31, 2008 (JP) .................. P2008-089060

(51) Int. Cl.
  *G02B 15/14* (2006.01)
  *G02B 27/64* (2006.01)
(52) U.S. Cl.
  USPC ........................... 359/684; 359/557
(58) Field of Classification Search
  CPC ....... G02B 15/173; G02B 27/646; G02B 9/00

USPC .................. 359/557, 676, 683, 684, 691
See application file for complete search history.

(56) References Cited

U.S. PATENT DOCUMENTS 5,978,150 A 11/1999 Hamanishi et al.
6,025,962 A 2/2000 Suzuki
(Continued)

FOREIGN PATENT DOCUMENTS

JP 07-306362 11/1995
JP 10-039210 A 2/1998
(Continued)

OTHER PUBLICATIONS

English-language translation of Japanese Patent Application Publication JP2006-081155 A, downloaded from IPDL website http://www.ipdl.inpit.go.jp/homepg_e.ipdl on Aug. 19, 2010.

*Primary Examiner* — David N Spector
(74) *Attorney, Agent, or Firm* — Miles & Stockbridge P.C.

(57) ABSTRACT

A zoom lens system has a front lens group and a rear lens group along the optical axis and in order from the object side. The rear lens group has a first lens unit having a positive refracting power, a second lens unit having a negative refracting power, and a third lens unit having a positive refracting power. Upon zooming from a wide-angle end state to a telephoto end state, a space between the front lens group and the first lens unit varies, a space between the first lens unit and the second lens unit increases, and a space between the second lens unit and the third lens unit decreases. At least a part of the second lens unit is movable so as to have a component in a direction perpendicular to the optical axis.

10 Claims, 45 Drawing Sheets

(56) References Cited

U.S. PATENT DOCUMENTS

| | | |
|---|---|---|
| 6,320,698 B1 | 11/2001 | Suzuki |
| 6,483,648 B1 | 11/2002 | Yamanashi |
| 6,618,198 B1 | 9/2003 | Endo |
| 6,788,464 B2 | 9/2004 | Misaka |
| 7,158,315 B2 | 1/2007 | Shibayama |
| 7,196,853 B2 | 3/2007 | Nishio et al. |
| 7,242,532 B2 | 7/2007 | Shibayama et al. |
| 7,268,954 B2 | 9/2007 | Fujimoto |
| 7,304,805 B2 | 12/2007 | Endo et al. |
| 7,330,316 B2 | 2/2008 | Shibayama et al. |
| 7,428,107 B2 | 9/2008 | Nishimura |
| 7,443,604 B2 | 10/2008 | Nishimura |
| 7,453,642 B2 | 11/2008 | Fujimoto et al. |
| 7,839,577 B2 | 11/2010 | Yamamoto et al. |
| 7,974,012 B2* | 7/2011 | Yamaguchi .................. 359/676 |
| 8,363,332 B2* | 1/2013 | Yamaguchi .................. 359/683 |
| 2008/0212206 A1 | 9/2008 | Hatada |
| 2011/0149412 A1 | 6/2011 | Sato |
| 2011/0228407 A1 | 9/2011 | Yamaguchi |
| 2011/0273776 A1 | 11/2011 | Obama et al. |
| 2012/0188647 A1* | 7/2012 | Tanaka et al. ................ 359/601 |

FOREIGN PATENT DOCUMENTS

| | | |
|---|---|---|
| JP | 10-090601 A | 4/1998 |
| JP | 11-231220 A | 8/1999 |
| JP | 11-258506 | 9/1999 |
| JP | 2001-033703 A | 2/2001 |
| JP | 2001-183585 A | 7/2001 |
| JP | 2001-249276 A | 9/2001 |
| JP | 2002-107625 | 4/2002 |
| JP | 2003-050350 | 2/2003 |
| JP | 2003-241093 A | 8/2003 |
| JP | 2004-226644 A | 8/2004 |
| JP | 2004-233750 A | 8/2004 |
| JP | 2005-284097 | 10/2005 |
| JP | 2006-047348 | 2/2006 |
| JP | 2006-085155 A | 3/2006 |
| JP | 2006-227526 A | 8/2006 |
| JP | 2006-234892 A | 9/2006 |
| JP | 2006-349947 | 12/2006 |
| JP | 2007-156251 | 6/2007 |
| JP | 2007-219315 A | 8/2007 |
| JP | 2008-003511 A | 1/2008 |
| JP | 2009-175324 | 8/2009 |

\* cited by examiner

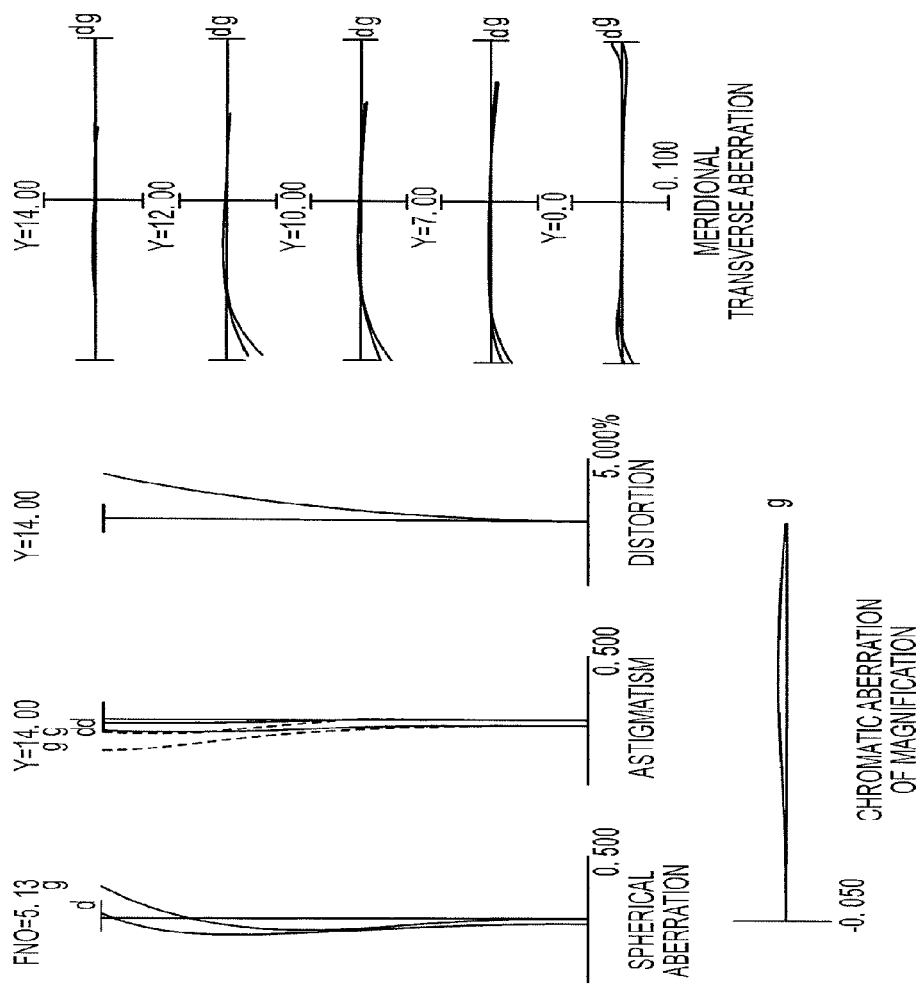

ZOOM LENS SYSTEM, OPTICAL DEVICE WITH THE ZOOM LENS SYSTEM, AND METHOD OF MANUFACTURING THE ZOOM LENS SYSTEM

BACKGROUND OF THE INVENTION

1. Field of the Invention

The present invention relates to a zoom lens system, an optical device with this zoom lens system, and a method of manufacturing the zoom lens system.

2. Related Background Art

There are hitherto-proposed zoom lens systems suitable for photographic cameras, digital still cameras, video cameras, and so on (e.g., cf. Japanese Patent Application Laid-open No. 2006-85155). Japanese Patent Application Laid-open No. 2006-85155 proposes a zoom lens system capable of changing a position of an image by moving a part of a lens so as to have a component in a direction perpendicular to the optical axis, which is suitable, particularly, for photographic cameras, digital still cameras, video cameras, and so on.

SUMMARY OF THE INVENTION

However, the conventional zoom lens systems had the problem that they failed to achieve satisfactory optical performance.

The present invention has been accomplished in light of the problem as described above, and an object of the present invention is to provide a zoom lens system successfully achieving satisfactory optical performance.

For purposes of summarizing an embodiment of the invention, certain aspects, advantages, and novel features of the invention have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessary achieving other advantages as may be taught or suggested herein.

In order to solve the above problem, a zoom lens system according to the present invention comprises a front lens group and a rear lens group arranged along an optical axis and in order from an object side, wherein the rear lens group comprises: a first lens unit having a positive refracting power; a second lens unit having a negative refracting power; and a third lens unit having a positive refracting power, wherein upon zooming from a wide-angle end state to a telephoto end state, a space between the front lens group and the first lens unit varies, a space between the first lens unit and the second lens unit increases from d12$w$ to d12$t$, and a space between the second lens unit and the third lens unit decreases from d23$w$ to d23$t$, wherein at least a part of the second lens unit is movable so as to have a component in a direction perpendicular to the optical axis, the zoom lens system satisfying conditions of the following expressions:

$$0.010 < (d12t-d12w)/Bfw < 0.170, \text{ and}$$

$$0.010 < (d23w-d23t)/Bfw < 0.185,$$

where Bfw is a distance from a lens surface nearest to an image side to an image plane in the wide-angle end state.

The foregoing zoom lens system preferably satisfies conditions of the following expressions:

$$0.010 < (d12w/d13w) < 0.400, \text{ and}$$

$$0.010 < (d23t/d13t) < 0.400,$$

where d13$w$ is a space between the first lens unit and the third lens unit in the wide-angle end state and d13$t$ is a space between the first lens unit and the third lens unit in the telephoto end state.

The foregoing zoom lens system preferably satisfies a condition of the following expression:

$$0.500 < |\Delta x1|/Bfw < 1.300,$$

where $\Delta x1$ is a moving distance of the first lens unit relative to the image plane upon zooming from the wide-angle end state to the telephoto end state and Bfw is a distance from the lens surface nearest to the image side to the image plane in the wide-angle end state.

The foregoing zoom lens system preferably satisfies a condition of the following expression:

$$0.100 < (-f2)Bfw < 1.500,$$

where f2 is a focal length of the second lens unit and Bfw is a distance from the lens surface nearest to the image side to the image plane in the wide-angle end state.

The foregoing zoom lens system is preferably configured in a configuration wherein the second lens unit comprises the following units arranged in order from the object side: a 2$a$ partial lens unit having a negative refracting power; and a 2$b$ partial lens unit having a negative refracting power, wherein either the 2$a$ partial lens unit or the 2$b$ partial lens unit is movable so as to have a component in a direction perpendicular to the optical axis.

The foregoing zoom lens system is preferably configured in a configuration wherein the 2$a$ partial lens unit is movable so as to have a component in a direction perpendicular to the optical axis, the zoom lens system further satisfying a condition of the following expression:

$$0.050 < fR2a/fR2b < 3.000,$$

where fR2$a$ is a focal length of the 2$a$ partial lens unit and fR2$b$ is a focal length of the 2$b$ partial lens unit.

The foregoing zoom lens system preferably satisfies a condition of the following expression:

$$0.200 < Rs/(-f2) < 3.000,$$

where Rs is a radius of curvature of cemented surfaces in a cemented lens of the 2$a$ partial lens unit and f2 is a focal length of the second lens unit.

The foregoing zoom lens system preferably satisfies a condition of the following expression:

$$-0.150 < Np-Nn < 0.150,$$

where Np is a refractive index of a positive meniscus lens of the 2$a$ partial lens unit for the d line and Nn is a refractive index of a biconcave lens of the 2$a$ partial lens unit for the d line.

The foregoing zoom lens system preferably satisfies a condition of the following expression:

$$5.000 < \nu p - \nu n < 30.000,$$

where $\nu n$ is an Abbe number of the biconcave lens of the 2$a$ partial lens unit and $\nu p$ is an Abbe number of the positive meniscus lens of the 2$a$ partial lens unit.

The foregoing zoom lens system is preferably configured in a configuration wherein the front lens group comprises the following lens units arranged in order from the object side: a front partial lens unit having a positive refracting power; and a rear partial lens unit having a negative refracting power, wherein upon zooming from the wide-angle end state to the telephoto end state, a space between the front partial lens unit and the rear partial lens unit increases.

The foregoing zoom lens system preferably satisfies a condition of the following expression:

$$-0.010 < (d12t - d12w)/Bfw < 0.130.$$

Another zoom lens system according to the present invention comprises a front lens group and a rear lens group arranged along an optical axis and in order from an object side, wherein the rear lens group comprises: a first lens unit having a positive refracting power; a second lens unit having a negative refracting power; and a third lens unit having a positive refracting power, wherein upon zooming from a wide-angle end state to a telephoto end state, a space between the front lens group and the first lens unit varies, a space between the first lens unit and the second lens unit increases from d12w to d12t, and a space between the second lens unit and the third lens unit decreases from d23w to d23t, and wherein at least a part of the second lens unit is movable so as to have a component in a direction perpendicular to the optical axis, the zoom lens system satisfying conditions of the following expressions:

$$0.002 < (d12t - d12w)/BL < 0.110, \text{ and}$$

$$0.002 < (d23w - d23t)/BL < 0.090,$$

where $BL = fw123 \times (1 - \beta w123)$, and where fw123 is a composite focal length of the first lens unit, the second lens unit, and the third lens unit in the wide-angle end state and $\beta w123$ is a composite magnification of the first lens unit, the second lens unit, and the third lens unit in the wide-angle end state.

The foregoing zoom lens system preferably satisfies a condition of the following expression:

$$0.300 < |\Delta x1|/BL < 1.000,$$

where $BL = fw123 \times (1 - \beta w123)$, and where $\Delta x1$ is a moving distance of the first lens unit relative to an image plane upon zooming from the wide-angle end state to the telephoto end state, fw123 is the composite focal length of the first lens unit, the second lens unit, and the third lens unit in the wide-angle end state, and $\beta w123$ is the composite magnification of the first lens unit, the second lens unit, and the third lens unit in the wide-angle end state.

The foregoing zoom lens system preferably satisfies a condition of the following expression:

$$0.050 < (-f2)/BL < 0.900,$$

where $BL = fw123 \times (1 - \beta w123)$, and where f2 is a focal length of the second lens unit, fw123 is the composite focal length of the first lens unit, the second lens unit, and the third lens unit in the wide-angle end state, and $\beta w123$ is the composite magnification of the first lens unit, the second lens unit, and the third lens unit in the wide-angle end state.

The foregoing zoom lens system preferably satisfies a condition of the following expression:

$$-0.002 < (d23w - d23t)/BL < 0.065.$$

The foregoing zoom lens system is preferably configured in a configuration wherein at least one of the second lens unit and the third lens unit comprises at least one aspherical surface.

Another zoom lens system according to the present invention comprises the following lens units arranged along an optical axis and in order from an object side: a first lens unit having a positive refracting power; a second lens unit having a negative refracting power; a third lens unit having a positive refracting power; a fourth lens unit having a negative refracting power; and a fifth lens unit having a positive refracting power, wherein the fourth lens unit comprises the following lenses arranged in order from the object side: a 4a lens having a negative refracting power; a 4b lens having a positive refracting power; and a 4c lens having a negative refracting power, the zoom lens system satisfying a condition of the following expression:

$$-1.00 < ((1/r4BR2) \times (-f4)) < 4.00,$$

where r4BR2 is a radius of curvature of an image-side lens surface of the 4b lens and f4 is a focal length of the fourth lens unit.

The foregoing zoom lens system preferably satisfies a condition of the following expression:

$$0.10 < (-f4/fw345) < 1.60,$$

where fw345 is a composite focal length of the third lens unit, the fourth lens unit, and the fifth lens unit in the wide-angle end state and f4 is the focal length of the fourth lens unit.

The foregoing zoom lens system is preferably configured in a configuration wherein upon zooming from a wide-angle end state to a telephoto end state, a space between the third lens unit and the fourth lens unit varies from d34w to d34t and a space between the fourth lens unit and the fifth lens unit varies from d45w to d45t, the zoom lens system satisfying conditions of the following expressions:

$$0.02 < (d34t - d34w)/fw345 < 0.40, \text{ and}$$

$$0.02 < (d45w - d45t)/fw345 < 0.40,$$

where fw345 is a composite focal length of the third lens unit, the fourth lens unit, and the fifth lens unit in the wide-angle end state.

The foregoing zoom lens system is preferably configured in a configuration wherein the fourth lens unit is so configured that at least a part of the fourth lens unit is movable so as to have a component in a direction perpendicular to the optical axis.

The foregoing zoom lens system is preferably configured in a configuration wherein the 4a lens has a biconcave shape.

The foregoing zoom lens system preferably satisfies conditions of the following expressions:

$$0.30 < ((1/r4AR2) \times (-f4)) < 4.00, \text{ and}$$

$$0.30 < ((1/r4BR1) \times (-f4)) < 4.00,$$

where r4AR2 is a radius of curvature of an image-side lens surface of the 4a lens and r4BR1 is a radius of curvature of an object-side lens surface of the 4b lens.

An optical device according to the present invention comprises one of the foregoing zoom lens systems.

A manufacturing method of a zoom lens system according to the present invention is a method of manufacturing a zoom lens system, comprising: a step of arranging a front lens group and a rear lens group along an optical axis and in order from an object side, the rear lens group comprising a first lens unit having a positive refracting power, a second lens unit having a negative refracting power, and a third lens unit having a positive refracting power, and a step of, upon zooming from a wide-angle end state to a telephoto end state, varying a space between the front lens group and the first lens unit, increasing a space between the first lens unit and the second lens unit from d12w to d12t, and decreasing a space between the second lens unit and the third lens unit from d23w to d23t, wherein at least a part of the second lens unit is movable so as to have a component in a direction perpendicular to the optical axis, the zoom lens system satisfying conditions of the following expressions:

$$0.010 < (d12t - d12w)/Bfw < 0.170, \text{ and}$$

$$0.010 < (d23w - d23t)/Bfw < 0.185,$$

where Bfw is a distance from a lens surface nearest to an image side to an image plane in the wide-angle end state.

The foregoing manufacturing method of the zoom lens system satisfies conditions of the following expressions:

$$0.010<(d12w/d13w)<0.400, \text{ and}$$

$$0.010<(d23t/d13t)<0.400,$$

where d13w is a space between the first lens unit and the third lens unit in the wide-angle end state and d13t is a space between the first lens unit and the third lens unit in the telephoto end state.

The foregoing manufacturing method of the zoom lens system satisfies a condition of the following expression:

$$0.500<|\Delta x1|/Bfw<1.300,$$

where $\Delta x1$ is a moving distance of the first lens unit relative to the image plane upon zooming from the wide-angle end state to the telephoto end state and Bfw is a distance from the lens surface nearest to the image side to the image plane in the wide-angle end state.

The foregoing manufacturing method of the zoom lens system satisfies a condition of the following expression:

$$0.100<(-f2)/Bfw<1.500,$$

where f2 is a focal length of the second lens unit and Bfw is a distance from the lens surface nearest to the image side to the image plane in the wide-angle end state.

A manufacturing method of a zoom lens system according to the present invention is A method of manufacturing a zoom lens system, comprising: a step of arranging a front lens group and a rear lens group along an optical axis and in order from an object side, the rear lens group comprising a first lens unit having a positive refracting power, a second lens unit having a negative refracting power, and a third lens unit having a positive refracting power, and a step of, upon zooming from a wide-angle end state to a telephoto end state, varying a space between the front lens group and the first lens unit, increasing a space between the first lens unit and the second lens unit from d12w to d12t, and decreasing a space between the second lens unit and the third lens unit from d23w to d23t, wherein at least a part of the second lens unit is movable so as to have a component in a direction perpendicular to the optical axis, the zoom lens system satisfying conditions of the following expressions:

$$0.002<(d12t-d12w)/BL<0.110, \text{ and}$$

$$0.002<(d23w-d23t)/BL<0.090,$$

where BL=fw123×(1−βw123), and where fw123 is a composite focal length of the first lens unit, the second lens unit, and the third lens unit in the wide-angle end state and βw123 is a composite magnification of the first lens unit, the second lens unit, and the third lens unit in the wide-angle end state.

The foregoing manufacturing method of the zoom lens system satisfies conditions of the following expressions:

$$0.010<(d12w/d13w)<0.400, \text{ and}$$

$$0.010<(d23t/d13t)<0.400,$$

where d13w is a space between the first lens unit and the third lens unit in the wide-angle end state and d13t is a space between the first lens unit and the third lens unit in the telephoto end state.

The foregoing manufacturing method of the zoom lens system satisfies a condition of the following expression:

$$0.300<|\Delta x1|/BL<1.000,$$

where BL=fw123×(1−βw123), and where $\Delta x1$ is a moving distance of the first lens unit relative to an image plane upon zooming from the wide-angle end state to the telephoto end state, fw123 is the composite focal length of the first lens unit, the second lens unit, and the third lens unit in the wide-angle end state, and βw123 is the composite magnification of the first lens unit, the second lens unit, and the third lens unit in the wide-angle end state.

The foregoing manufacturing method of the zoom lens system satisfies a condition of the following expression:

$$0.050<(-f2)/BL<0.900,$$

where BL=fw123×(1−βw123), and where f2 is a focal length of the second lens unit, fw123 is the composite focal length of the first lens unit, the second lens unit, and the third lens unit in the wide-angle end state, and βw123 is the composite magnification of the first lens unit, the second lens unit, and the third lens unit in the wide-angle end state.

A manufacturing method of a zoom lens system according to the present invention is a method of manufacturing a zoom lens system, comprising: a step of arranging a first lens unit having a positive refracting power, a second lens unit having a negative refracting power, a third lens unit having a positive refracting power, a fourth lens unit having a negative refracting power, and a fifth lens unit having a positive refracting power, along an optical axis and in order from an object side, wherein the fourth lens unit comprises the following lenses arranged in order from the object side: a 4a lens having a negative refracting power; a 4b lens having a positive refracting power; and a 4c lens having a negative refracting power, the zoom lens system satisfying a condition of the following expression:

$$-1.00<((1/r4BR2)\times(-f4))<4.00,$$

where r4BR2 is a radius of curvature of an image-side lens surface of the 4b lens and f4 is a focal length of the fourth lens unit.

The foregoing manufacturing method of the zoom lens system satisfies a condition of the following expression:

$$0.10<(-f4/fw345)<1.60,$$

where fw345 is a composite focal length of the third lens unit, the fourth lens unit, and the fifth lens unit in the wide-angle end state and f4 is the focal length of the fourth lens unit.

In the foregoing manufacturing method of the zoom lens system, upon zooming from a wide-angle end state to a telephoto end state, a space between the third lens unit and the fourth lens unit varies from d34w to d34t and a space between the fourth lens unit and the fifth lens unit varies from d45w to d45t, the zoom lens system satisfying conditions of the following expressions:

$$0.02<(d34t-d34w)/fw345<0.40, \text{ and}$$

$$0.02<(d45w-d45t)/fw345<0.40,$$

where fw345 is a composite focal length of the third lens unit, the fourth lens unit, and the fifth lens unit in the wide-angle end state.

As the zoom lens systems according to the present invention, the optical devices with the zoom lens system, and the manufacturing methods thereof are configured as described above, satisfactory optical performance is achieved thereby.

BRIEF DESCRIPTION OF THE DRAWINGS

FIG. 11 is aberration diagrams in the infinity in-focus state in an intermediate focal length state of the third example.

DESCRIPTION OF THE PREFERRED EMBODIMENTS

Figure 1:
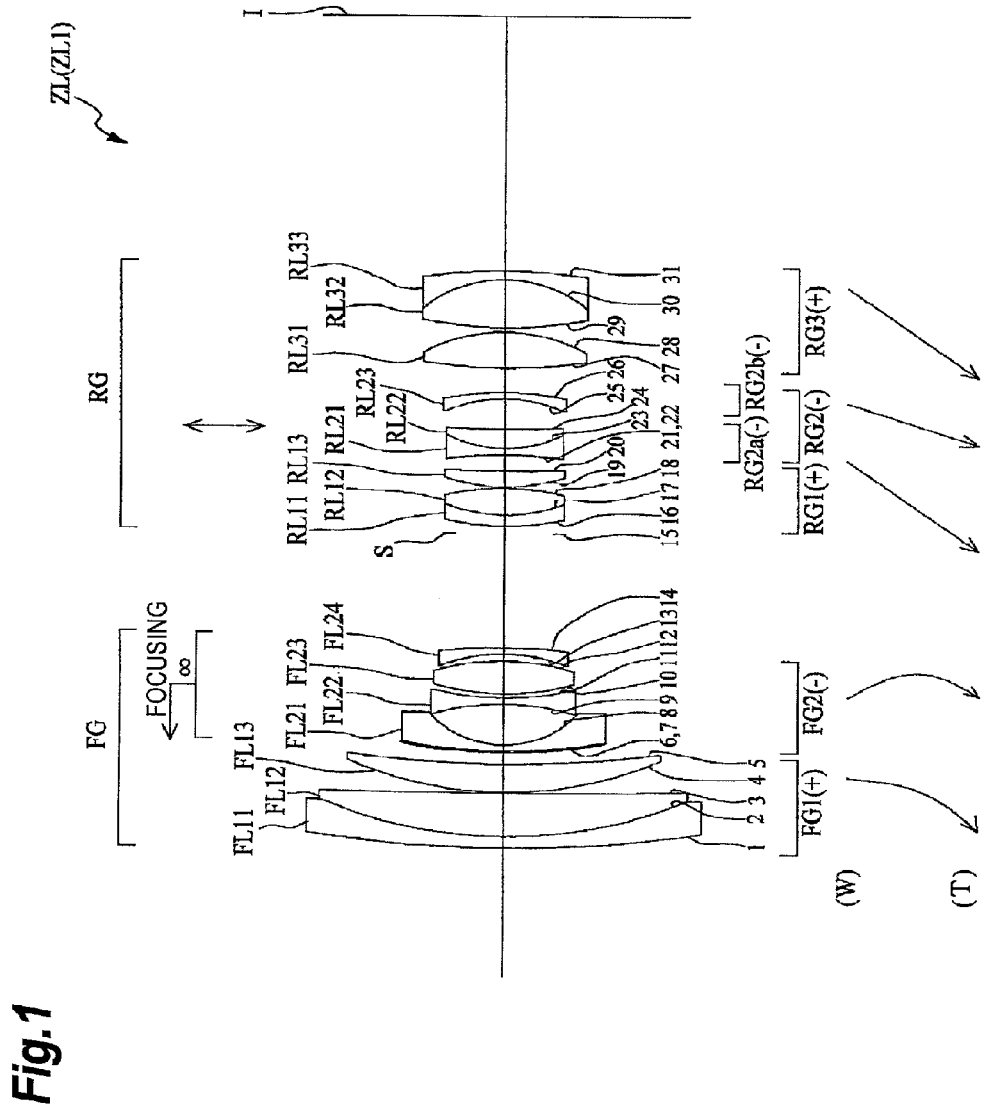
FIG. 1 is a sectional view showing a configuration of a zoom lens system according to the first example.

The first preferred embodiment of the present invention will be described below with reference to the drawings. In the present specification, the wide-angle end state and the telephoto end state will denote those in the infinity in-focus state unless otherwise stated. As shown in FIG. 1, the zoom lens system ZL has a front lens group FG and a rear lens group RG arranged along the optical axis and in order from the object side, and this rear lens group RG is composed of a first lens unit RG1 having a positive refracting power, a second lens unit RG2 having a negative refracting power, and a third lens unit RG3 having a positive refracting power. The zoom lens system ZL is so configured that during change in the lens position state from the wide-angle end state to the telephoto end state, a space between the front lens group FG and the first lens unit RG1 varies, a space between the first lens unit RG1 and the second lens unit RG2 increases from d12w to d12t, and a space between the second lens unit RG2 and the third lens unit RG3 decreases from d23w to d23t, where d12t is the space between the first lens unit RG1 and the second lens unit RG2 in the telephoto end state, d12w the space between the first lens unit RG1 and the second lens unit RG2 in the wide-angle end state, d23t the space between the second lens unit RG2 and the third lens unit RG3 in the telephoto end state, and d23w the space between the second lens unit RG2 and the third lens unit RG3 in the wide-angle end state. This configuration allows the principal point position of the rear lens group RG to be moved from the image plane side to the object side during zooming from the wide-angle end state to the telephoto end state, so as to increase a zoom amount achieved by the rear lens group RG, whereby the overall system can be an optical system with a high zoom ratio. Furthermore, it is feasible to suitably correct for variation in curvature of field and spherical aberration during the zooming operation.

This zoom lens system ZL is desirably so configured that with occurrence of camera shake, at least a part of the second lens unit RG2 is moved so as to have a component in a direction perpendicular to the optical axis, thereby compensating the position of the image with occurrence of the camera shake. As the zoom lens system ZL is made capable of compensating for variation of the image plane with occurrence of camera shake in this manner, it can be used as an anti-vibration optical system. The second lens unit RG2 is composed of relatively compact optical elements and this configuration permits the zoom lens system ZL to achieve both of reduction in size and weight of the lens barrel and imaging performance with the compensation for the image plane being active with occurrence of camera shake. Here at least a part of the second lens unit RG2 may move so as to have at least a component in a direction perpendicular to the optical axis. Therefore, at least a part of the second lens unit RG2 may move in an oblique direction with respect to the optical axis or move so as to draw an arc relative to the direction perpendicular to the optical axis, as well as may move in the direction perpendicular to the optical axis.

The zoom lens system ZL is desirably so configured that during the change in the lens position state from the wide-angle end state to the telephoto end state, the first lens unit RG1 and the third lens unit RG3 move toward the object side and moving distances thereof relative to the image plane are equal. As the first lens unit RG1 and the third lens unit RG3 move toward the object side during the zooming from the wide-angle end state to the telephoto end state as described above, it is feasible to achieve both of reduction in the overall length at the wide-angle end and excellent correction for various aberrations. When the moving distances of the first lens unit RG1 and the third lens unit RG3 are made equal, the first lens unit RG1 and the third lens unit RG3 can be constructed in an integral structure. This structure keeps change small in mutual decentration between the first lens unit RG1 and the third lens unit RG3 during the zooming from the wide-angle end state to the telephoto end state and thus relieves deterioration of optical performance due to manufacturing error.

The zoom lens system ZL preferably satisfies Condition expressions (1) and (2) below, where Bfw represents a distance from the lens surface nearest to the image side to the image plane in the wide-angle end state (provided that the value of Bfw is an air-equivalent length excluding a prism having no refracting power, a filter, an optical low-pass filter, and so on).

$$0.010<(d12t-d12w)/Bfw<0.170 \quad (1)$$

$$0.010<(d23w-d23t)/Bfw<0.185 \quad (2)$$

Condition expression (1) is a condition for defining a change amount of the space between the first lens unit RG1 and the second lens unit RG2 in transition of the zoom lens system ZL from the wide-angle end state to the telephoto end state. Condition expression (2) is a condition for defining a change amount of the space between the second lens unit RG2 and the third lens unit RG3 in transition of the zoom lens system ZL from the wide-angle end state to the telephoto end state. When the zoom lens system ZL satisfies these Condition expressions (1) and (2), it is able to suitably correct for aberration variation with the compensation for the image plane being active with occurrence of camera shake, while ensuring a high zoom ratio.

If the change amount ratio is more than the upper limit of Condition expression (1), the space will increase between the first lens unit RG1 and the second lens unit RG2 at the telephoto end and it will thus be difficult to correct for spherical aberration and coma aberration at the telephoto end. In addition, decentration coma aberration will become too significant to correct at the telephoto end, with the compensation for the image plane being active with occurrence of camera shake, and it is thus unfavorable. The effect of the present invention can be made more definite by setting the upper limit of Condition expression (1) to 0.150, 0.130, or 0.110. On the other hand, if the change amount ratio is less than the lower limit of Condition expression (1), variation in spherical aberration will become too significant to correct during the zooming from the wide-angle end state to the telephoto end state and it is thus unfavorable. The effect of the present invention can be made more definite by setting the lower limit of Condition expression (1) to 0.030, 0.050, or 0.070.

If the change amount ratio is more than the upper limit of Condition expression (2), the space will increase between the second lens unit RG2 and the third lens unit RG3 at the wide-angle end and ray heights of off-axis marginal rays at the wide-angle end will become higher in the third lens unit RG3. This makes it difficult to correct for curvature of field and coma aberration at the wide-angle end and it is thus unfavorable. In addition, off-axis marginal rays at the wide-angle end will largely vary in the third lens unit RG3 with the compensation for the image plane being active with occurrence of camera shake and this makes it difficult to correct for decentration field tilt. The effect of the present invention can be made more definite by setting the upper limit of Condition expression (2) to 0.150, 0.130, or 0.110. On the other hand, if the change amount ratio is less than the lower limit of Condition expression (2), variation in curvature of field will become too significant to correct during the zooming from the wide-angle end state to the telephoto end state, and it is thus unfavorable. The effect of the present invention can be made more definite by setting the lower limit of Condition expression (2) to 0.030, 0.050, or 0.070.

The zoom lens system ZL preferably satisfies Condition expressions (1-a) and (2-a) below, where fw123 is a composite focal length of the first lens unit RG1, the second lens unit RG2, and the third lens unit RG3 in the wide-angle end state and βw123 a composite magnification of the first lens unit RG1, the second lens unit RG2, and the third lens unit RG3 in the wide-angle end state.

$$0.002<(d12t-d12w)/BL<0.110 \quad (1\text{-a})$$

$$0.002<(d23w-d23t)/BL<0.090 \quad (2\text{-a})$$

where BL=fw123×(1−βw123).

Condition expression (1-a) is a condition for defining a change amount of the space between the first lens unit RG1 and the second lens unit RG2 in transition of the zoom lens system ZL from the wide-angle end state to the telephoto end state. Condition expression (2-a) is a condition for defining a change amount of the space between the second lens unit RG2 and the third lens unit RG3 in transition of the zoom lens system ZL from the wide-angle end state to the telephoto end state. As the zoom lens system ZL satisfies these Condition expressions (1-a) and (2-a), it is able to suitably correct for aberration variation with the compensation for the image plane being active with occurrence of camera shake, while ensuring a high zoom ratio.

If the change amount ratio is more than the upper limit of Condition expression (1-a), the space will increase between the first lens unit RG1 and the second lens unit RG2 at the telephoto end and it will thus be difficult to correct for spherical aberration and coma aberration at the telephoto end. In addition, decentration coma aberration will become too significant to correct at the telephoto end, with the compensation for the image plane being active with occurrence of camera shake, and it is thus unfavorable. The effect of the present invention can be made more definite by setting the upper limit of Condition expression (1-a) to 0.100, 0.090, or 0.050. On the other hand, if the change amount ratio is less than the lower limit of Condition expression (1-a), variation in spherical aberration will become too significant to correct during the zooming from the wide-angle end state to the telephoto end state and it is thus unfavorable. The effect of the present invention can be made more definite by setting the lower limit of Condition expression (1-a) to 0.010, 0.020, or 0.040.

If the change amount ratio is more than the upper limit of Condition expression (2-a), the space will increase between the second lens unit RG2 and the third lens unit RG3 at the wide-angle end and ray heights of off-axis marginal rays at the wide-angle end will become higher in the third lens unit RG3. This makes it difficult to correct for curvature of field and coma aberration at the wide-angle end and it is thus unfavorable. In addition, off-axis marginal rays at the wide-angle end will largely vary in the third lens unit RG3 with the compensation for the image plane being active with occurrence of camera shake and this makes it difficult to correct for decentration field tilt. The effect of the present invention can be made more definite by setting the upper limit of Condition expression (2-a) to 0.080, 0.065, or 0.050. On the other hand, if the change amount ratio is less than the lower limit of Condition expression (2-a), variation in curvature of field will become too significant to correct during the zooming from the wide-angle end state to the telephoto end state, and it is thus unfavorable. The effect of the present invention can be made more definite by setting the lower limit of Condition expression (2-a) to 0.010, 0.020, or 0.040.

The zoom lens system ZL preferably further satisfies Condition expressions (3) and (4) below:

$$0.010 < (d12w/d13w) < 0.400 \qquad (3);$$

$$0.010 < (d23t/d13t) < 0.400 \qquad (4),$$

where d13w is a distance from the surface nearest to the image side in the first lens unit FG1 to the surface nearest to the object side in the third lens unit FG3 in the wide-angle end state and d13t is a distance from the surface nearest to the image side in the first lens unit FG1 to the surface nearest to the object side in the third lens unit FG3 in the telephoto end state.

When the zoom lens system ZL satisfies Condition expression (3), it becomes feasible to suitably correct for curvature of field and distortion at the wide-angle end, while realizing downsizing of the zoom lens system ZL. If the ratio is more than the upper limit of Condition expression (3), negative curvature of field at the wide-angle end will become too significant to correct and it is thus unfavorable. The effect of the present invention can be made more definite by setting the upper limit of Condition expression (3) to 0.300, 0.200, or 0.160. On the other hand, if the ratio is less than the lower limit of Condition expression (3), positive curvature of field at the wide-angle end and positive distortion will become too significant, and it is thus unfavorable. The effect of the present invention can be made more definite by setting the lower limit of Condition expression (3) to 0.030, 0.050, or 0.110.

When the zoom lens system ZL satisfies Condition expression (4), it becomes feasible to suitably correct for spherical aberration and curvature of field at the telephoto end. If the ratio is more than the upper limit of Condition expression (4), positive spherical aberration and curvature of field at the telephoto end will become too significant to correct and it is thus unfavorable. The effect of the present invention can be made more definite by setting the upper limit of Condition expression (4) to 0.300, 0.250, or 0.210. On the other hand, if the ratio is less than the lower limit of Condition expression (4), negative spherical curvature and curvature of field at the telephoto end will become too significant to correct, and it is thus unfavorable. The effect of the present invention can be made more definite by setting the lower limit of Condition expression (4) to 0.030, 0.040, or 0.050.

The zoom lens system ZL preferably satisfies Condition expression (5) below, where Δx1 is a moving distance of the first lens unit RG1 relative to the image plane during the change in the lens position state from the wide-angle end state to the telephoto end state and Bfw is a distance from the lens surface nearest to the image side to the image plane in the wide-angle end state.

$$0.500 < |\Delta x1|/Bfw < 1.300 \qquad (5)$$

Condition expression (5) is a condition for defining the moving distance of the first lens unit RG1 relative to the image plane during the zooming of the zoom lens system ZL from the wide-angle end state to the telephoto end state. When the zoom lens system ZL satisfies this Condition expression (5), it becomes feasible to realize a high-zoom-ratio optical system with a zoom ratio of more than 5, while maintaining excellent imaging performance with the compensation for the image plane being active with occurrence of camera shake.

It the ratio is more than the upper limit of Condition expression (5), lateral magnifications (absolute values) of the first lens unit RG1 and the third lens unit RG3 at the telephoto end in the zoom lens system ZL will become too significant to correct for spherical aberration and coma aberration at the telephoto end. In addition, decentration coma aberration at the telephoto end will become too significant to correct with the compensation for the image plane being active with occurrence of camera shake, and it is thus unfavorable. Furthermore, there is another problem that a feed amount of the first lens unit RG1 becomes so large as to make construction of the mechanism difficult. In order to compensate for it, it is necessary to increase the overall length of the optical system at the wide-angle end, but it is unfavorable because of increase in the overall length of the lens barrel. The effect of the present invention can be made more definite by setting the upper limit of Condition expression (5) to 1.200 or 1.100. On the other hand, if the ratio is less than the lower limit of Condition expression (5), a zoom amount achieved by the rear lens group RG will become smaller to make it difficult to obtain a predetermined zoom ratio. If the refracting powers of the first lens unit RG1, the second lens unit RG2, and the third lens unit RG3 are increased in order to compensate for it, it will become difficult to correct for spherical aberration and coma aberration at the telephoto end. Furthermore, there will arise a problem that deterioration of imaging performance becomes significant due to manufacturing error, e.g., decentration among the lens units; i.e., decentration coma aberration and decentration field tilt will become significant. Therefore, it is not preferred. The effect of the present invention can be made more definite by setting the lower limit of Condition expression (5) to 0.600, 0.700, or 0.850.

The zoom lens system ZL preferably satisfies Condition expression (6) below, where f2 is the focal length of the second lens unit RG2 and Bfw is a distance from the lens surface nearest to the image side to the image plane in the wide-angle end state.

$$0.100 < (-f2)/Bfw < 1.500 \qquad (6)$$

Condition expression (6) is a condition for defining the focal length of the second lens unit RG2 to the back focus at the wide-angle end of the present zoom lens system ZL. As the present zoom lens system ZL satisfies this Condition expression (6), it is able to relieve deterioration of optical performance due to manufacturing error, while maintaining excellent imaging performance with the compensation for the image plane being active with occurrence of camera shake. If the ratio is more than the upper limit of Condition expression (6), the refracting power of the second lens unit RG2 will become so small as to make an anti-vibration compensation factor (moving amount of the image position in the direction perpendicular to the optical axis÷moving amount of the anti-vibration unit in the direction perpendicular to the optical axis) smaller. For this reason, if the moving amount of the anti-vibration unit is increased, it will lead to significant deterioration of decentration coma aberration and decentration field tilt at the telephoto end, and it is thus unpreferred. In addition, it will also result in causing a problem of increase in the size of the lens barrel. The effect of the present invention can be made more definite by setting the upper limit of Condition expression (6) to 0.860 or 0.720. On the other hand, if the ratio is less than the lower limit of Condition expression (6), the refracting power of the second lens unit RG2 will become too large to correct for curvature of filed and coma aberration at the wide-angle end. Furthermore, it will lead to significant deterioration of imaging performance due to manufacturing error such as decentration among the lens units, i.e., significant deterioration of decentration field tilt, and it is thus unpreferred. The effect of the present invention can be made more definite by setting the lower limit of Condition expression (6) to 0.200, 0.400, or 0.450.

The foregoing zoom lens system ZL preferably satisfies Condition expression (5-a) below, where Δx1 is the moving distance of the first lens unit RG1 relative to the image plane during the change in the lens position state from the wide-angle end state to the telephoto end state, fw123 is the composite focal length of the first lens unit RG1, the second lens unit RG2, and the third lens unit RG3 in the wide-angle end state, and βw123 is the composite magnification of the first lens unit RG1, the second lens unit RG2, and the third lens unit RG3 in the wide-angle end state.

$$0.300 < |\Delta x1|/BL < 1.000 \quad (5\text{-a})$$

where $BL = fw123 \times (1 - \beta w123)$.

Condition expression (5-a) is a condition for defining the moving distance of the first lens unit RG1 relative to the image plane during the zooming of the zoom lens system ZL from the wide-angle end state to the telephoto end state. As the zoom lens system ZL satisfies this Condition expression (5-a), it becomes feasible to realize a high-zoom-ratio optical system with a zoom ratio of more than 5, while maintaining excellent imaging performance with the compensation for the image plane being active with occurrence of camera shake.

If the ratio is more than the upper limit of Condition expression (5-a), lateral magnifications (absolute values) of the first lens unit RG1 and the third lens unit RG3 will become too large at the telephoto end of the zoom lens system ZL to correct for spherical aberration and coma aberration at the telephoto end. In addition, decentration coma aberration will become too large to correct at the telephoto end, with the compensation for the image plane being active with occurrence of camera shake, and it is thus unpreferred. There will arise another problem that a feed amount of the first lens unit RG1 becomes too large and it becomes difficult to construct the mechanism. It is necessary to increase the overall length of the optical system at the wide-angle end, in order to compensate for it, but it is unpreferable because of increase in the overall length of the lens barrel. The effect of the present invention can be made more definite by setting the upper limit of Condition expression (5-a) to 0.850, 0.750, or 0.660. On the other hand, if the ratio is less than the lower limit of Condition expression (5-a), a zoom amount achieved by the rear lens group RG will become too small to oblation a predetermined zoom ratio. If the refracting powers of the first lens unit RG1, the second lens unit RG2, and the third lens unit RG3 are increased in order to compensate for it, it will become difficult to correct for spherical aberration and coma aberration at the telephoto end. Furthermore, it will lead to a problem of significant deterioration of imaging performance due to manufacturing error such as decentration among the lens units, i.e., increase in decentration coma aberration and decentration field tilt, and it is thus unpreferred. The effect of the present invention can be made more definite by setting the lower limit of Condition expression (5-a) to 0.440, 0.500, or 0.600.

The zoom lens system ZL preferably satisfies Condition expression (6-a) below, where f2 is the focal length of the second lens unit RG2, fw123 is the composite focal length of the first lens unit RG1, the second lens unit RG2, and the third lens unit RG3 in the wide-angle end state, and βw123 is the composite magnification of the first lens unit RG1, the second lens unit RG2, and the third lens unit RG3 in the wide-angle end state.

$$0.050 < (-f2)/BL < 0.900 \quad (6\text{-a})$$

where $BL = fw123 \times (1 - \beta w123)$.

Condition expression (6-a) is a condition for defining the focal length of the second lens unit RG2. As the zoom lens system ZL satisfies this Condition expression (6-a), it is able to relieve deterioration of optical performance due to manufacturing error, while maintaining excellent imaging performance with the compensation for the image plane being active with occurrence of camera shake. If the ratio is more than the upper limit of Condition expression (6-a), the refracting power of the second lens unit RG2 will become so small as to make the anti-vibration compensation factor (moving amount of the image position in the direction perpendicular to the optical axis÷moving amount of the anti-vibration unit in the direction perpendicular to the optical axis) smaller. For this reason, if the moving amount of the anti-vibration unit is increased, it will lead to significant deterioration of decentration coma aberration and decentration field tilt at the telephoto end, and it is thus unpreferred. In addition, it will also result in causing a problem of increase in the size of the lens barrel. The effect of the present invention can be made more definite by setting the upper limit of Condition expression (6-a) to 0.520, 0.460, or 0.380. On the other hand, if the ratio is less than the lower limit of Condition expression (6-a), the refracting power of the second lens unit RG2 will become too large to correct for curvature of filed and coma aberration at the wide-angle end. Furthermore, it will lead to significant deterioration of imaging performance due to manufacturing error such as decentration among the lens units, i.e., significant deterioration of decentration field tilt, and it is thus unpreferred. The effect of the present invention can be made more definite by setting the lower limit of Condition expression (6-a) to 0.110, 0.200, or 0.280.

The zoom lens system ZL is preferably configured in a configuration wherein the second lens unit RG2 comprises the following units arranged in order from the object side: a 2a partial lens unit RG2a having a negative refracting power; and a 2b partial lens unit RG2b having a negative refracting power, and wherein either the 2a partial lens unit RG2a or the 2b partial lens unit RG2b is movable so as to have a component in a direction perpendicular to the optical axis.

When this configuration is adopted, various aberrations of the negative refracting power produced by the lens unit without the anti-vibration function in the second lens unit RG2 cancel out various aberrations of the positive refracting power components produced by the first lens unit RG1 and the third lens unit RG3 with the compensation for the image plane being active with occurrence of camera shake, whereby the zoom lens system ZL is able to exhibit a high aberration compensation capability as a whole. When the second lens unit RG2 is separated into two units, it becomes easier to change the refracting power of the anti-vibration unit and it is feasible to set the anti-vibration compensation factor (moving amount of the image position in the direction perpendicular to the optical axis÷moving amount of the anti-vibration unit in the direction perpendicular to the optical axis) to any desired value. This makes it feasible to reduce the moving amount of the anti-vibration unit in the direction perpendicular to the optical axis, which can cause a problem at the telephoto end of a high-zoom-ratio optical system, and to reduce the diameter of the lens barrel.

Furthermore, the zoom lens system ZL is preferably configured in a configuration wherein the 2a partial lens unit RG2a is movable so as to have a component in a direction perpendicular to the optical axis. In this configuration, the zoom lens system ZL desirably satisfies Condition expression (7) below, where fR2a is a focal length of the 2a partial lens unit RG2a and fR2b is a focal length of the 2b partial lens unit RG2b.

$$0.050 < fR2a/fR2b < 3.000 \tag{7}$$

Condition expression (7) is a condition for defining the focal length of the 2a partial lens unit RG2a to the focal length of the 2b partial lens unit RG2b. When the zoom lens system ZL satisfies this Condition expression (7), decentration aberration with the compensation for the image plane being active with occurrence of camera shake is corrected for in a well-balanced manner in the entire range from the wide-angle end to the telephoto end, and excellent imaging performance is obtained. If the ratio is more than the upper limit of Condition expression (7), the refracting power of the 2b partial lens unit RG2b will become too large to correct for the decentration field tilt at the wide-angle end with the compensation for the image plane being active with occurrence of camera shake, and it is thus unpreferred. The effect of the present invention can be made more definite by setting the upper limit of Condition expression (7) to 1.500, 1.200, or 1.050. On the other hand, if the ratio is less than the lower limit of Condition expression (7), the refracting power of the 2a partial lens unit 2a will become too large to correct for the decentration coma aberration at the telephoto end with the compensation for the image plane being active with occurrence of camera shake, and it is thus unpreferred. The effect of the present invention can be made more definite by setting the lower limit of Condition expression (7) to 0.300, 0.500, or 0.850.

The zoom lens system ZL is preferably configured in a configuration wherein the 2a partial lens unit RG2a consists of a cemented lens of a biconcave lens and a positive meniscus lens with a convex surface on the object side arranged in order from the object side. This configuration allows the principal point position of the second lens unit RG2 to be arranged on the image side, whereby the distance is reduced between the principal points of the second lens unit RG2 and the third lens unit RG3. This makes it feasible to reduce the decentration field tilt with the compensation for the image plane being active with occurrence of camera shake, at the wide-angle end of the zoom lens system ZL. It also offers an effect of decreasing the diameter of the third lens unit RG3.

In this zoom lens system ZL, the 2b partial lens unit preferably consists of a negative meniscus lens with a concave surface on the object side. When this configuration is adopted, it is feasible to effectively compensate for the negative aberration component, which is insufficient with the compensation for the image plane being active with occurrence of camera shake, and to keep aberration variation due to decentration small.

When the 2a partial lens unit RG2a consists of the cemented lens as described above, the zoom lens system ZL preferably satisfies Condition expression (8) below, where Rs is a radius of curvature of cemented surfaces in the cemented lens of the 2a partial lens unit RG2a and f2 is the focal length of the second lens unit RG2.

$$0.200 < Rs/(-f2) < 3.000 \tag{8}$$

Condition expression (8) is a condition for defining the curvature of the cemented surfaces in the cemented lens of the 2a partial lens unit RG2a to the focal length of the second lens unit RG2. If the ratio is off either of the upper limit and the lower limit of Condition expression (8), it will become difficult to correct for spherical aberration and decentration aberration will become significant with the compensation for the image plane being active with occurrence of camera shake; thus it is unpreferred. If the ratio is more than the upper limit of Condition expression (8), the curvature of the cemented surfaces will become small and positive spherical aberration will become too significant to correct. The effect of the present invention can be made more definite by setting the upper limit of Condition expression (8) to 1.500 or 1.000. On the other hand, if the ratio is less than the lower limit of Condition expression (8), the curvature of the cemented surfaces will become large and negative spherical aberration will become too large to correct. The effect of the present invention can be made more definite by setting the lower limit of Condition expression (8) to 0.400 or 0.800.

The zoom lens system ZL preferably satisfies Condition expression (9) below, where Np is the refractive index of the positive meniscus lens of the 2a partial lens unit RG2a for the d line and Nn is the refractive index of the biconcave lens of the 2a partial lens unit RG2a for the d line.

$$-0.150 < Np-Nn < 0.150 \tag{9}$$

Condition expression (9) is a condition for defining a relation between the refractive index of the biconcave lens of the 2a partial lens unit RG2a for the d line and the refractive index of the positive meniscus lens thereof for the d line. If the difference is off either of the upper limit and the lower limit of Condition expression (9), the decentration filed tilt will become too large to correct, with the compensation for the image plane being active with occurrence of camera shake, and it is thus unpreferred. For securely achieving the effect of the present invention, it is preferable to set the upper limit of Condition expression (9) to 0.100. 0.045, or 0.020 and to set the lower limit of Condition expression (9) to -0.100 or -0.030.

Furthermore, the zoom lens system ZL preferably satisfies Condition expression (10) below, where vn is the Abbe number of the biconcave lens of the 2a partial lens unit RG2a and vp is the Abbe number of the positive meniscus lens of the 2a partial lens unit RG2a.

$$5.000 < vp-vn < 30.000 \tag{10}$$

Condition expression (10) is a condition for defining a relation between the Abbe number of the biconcave lens of the 2a partial lens unit RG2a and the Abbe number of the positive meniscus lens thereof. If the difference is off either of the upper limit and the lower limit of Condition expression (10), chromatic aberration produced by the second lens unit RG2 will become too large to correct, and it is thus unpreferred. For securely achieving the effect of the present invention, it is preferable to set the upper limit of Condition expression (10) to 25.000 or 19.000 and to set the lower limit of Condition expression (10) to 8.000 or 11.500.

When the zoom lens system ZL satisfies Condition expressions (8)-(10) as described above, it becomes feasible to suppress various aberrations and decentration aberration with occurrence of camera shake and thus to obtain excellent imaging performance.

In this zoom lens system ZL, the second lens unit RG2 desirably has at least one aspherical surface. This makes it feasible to suitably correct for spherical aberration at the telephoto end and decentration coma aberration at the telephoto end with the compensation for the image plane being active with occurrence of camera shake.

In this zoom lens system ZL, the third lens unit RG3 desirably has at least one aspherical surface. This makes it feasible to suitably correct for the decentration field tilt at the wide-angle end with the compensation for the image plane being active with occurrence of camera shake, while well correcting for curvature of field and distortion at the wide-angle end.

In the zoom lens system ZL, preferably, the front lens group FG has the following lens units arranged in order from the object side: a front partial lens unit FG1 having a positive refracting power; and a rear partial lens unit FG2 having a negative refracting power; during the change in the lens position state from the wide-angle end state to the telephoto end state, a space between the front partial lens unit FG1 and the rear partial lens unit FG2 increases. When this configuration is adopted, it is feasible to achieve a high zoom ratio and to increase the zoom ratio of the overall system. In addition, it is also feasible to decrease the zoom ratio of the first lens unit RG1, the second lens unit RG2, and the third lens unit RG3 of the rear lens group RG, and to improve the imaging performance with the compensation for the image plane being active with occurrence of camera shake.

In this zoom lens system ZL, the rear partial lens unit FG2 desirably has at least one aspherical surface. This makes it feasible to suitably correct for curvature of field and distortion at the wide-angle end and thus to increase the angle of view at the wide-angle end.

This zoom lens system ZL desirably has an aperture stop S on the object side with respect to the second lens unit RG2, i.e., near or in the first lens unit RG1. By adopting this structure, it is feasible to achieve both of decrease in the diameter of the front lens and excellent correction for various aberrations.

Figure 21A:
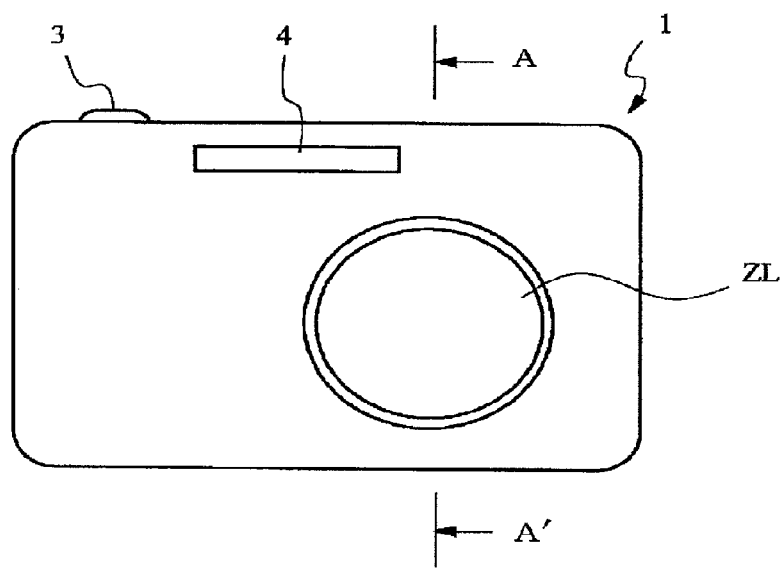
FIG. 21A shows an digital still camera equipped with a zoom lens system according to the present invention, and is a front view thereof.
Figure 21B:
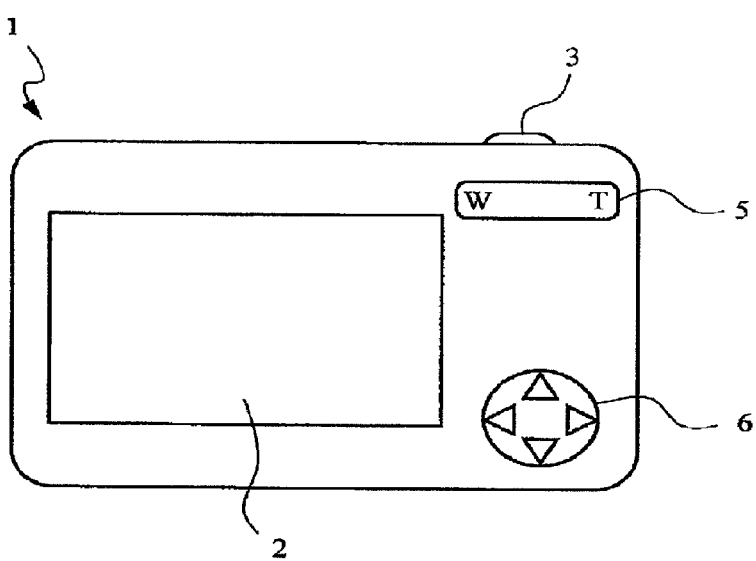
FIG. 21B shows the digital still camera equipped with the zoom lens system according to the present invention, and is a back view thereof.
Figure 22:
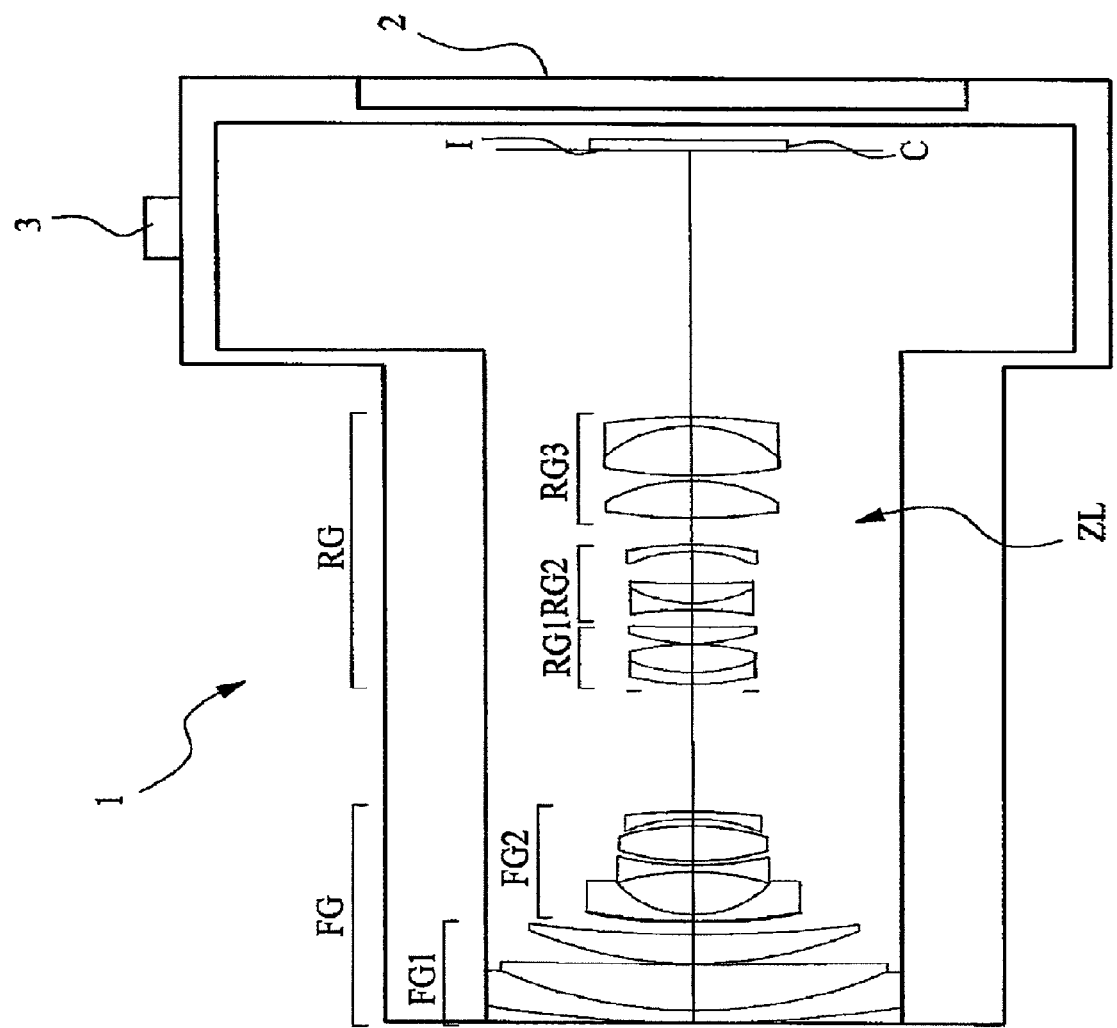
FIG. 22 is a sectional view along line A-A' in FIG. 21A.

FIGS. 21 and 22 show a configuration of an digital still camera 1 (which will be referred to simply as a camera), as an optical device with the above-described zoom lens system ZL. This camera 1 operates as follows. When a photographer pushes an unrepresented power button, an unrepresented shutter of a taking lens (zoom lens system ZL) is opened and the zoom lens system ZL collects light from a subject not shown, to form an image of the subject on an image pickup device C (e.g., a CCD, CMOS, or the like) arranged on the image plane I. The subject image formed on the image pickup device C is displayed on a liquid crystal monitor 2 arranged on the back of the camera 1. The photographer decides a composition of the subject image while viewing the liquid crystal monitor 2, and then depresses a shutter release button 3 to take the subject image by the image pickup device C to record and store it into an unrepresented memory.

This camera 1 is provided with an auxiliary light emitter 4 to emit auxiliary light to a dark subject, a wide (W)-tele (T) button 5 for zooming of the zoom lens system ZL from the wide-angle end state (W) to the telephoto end state (T), a function button 6 to be used, e.g., for setting various conditions of the camera 1, and so on. FIG. 22 shows the example of the compact type camera in which the camera 1 is integrally farmed with the zoom lens system ZL, but it should be noted that the present invention is also applicable to such an optical device as a single-lens reflex camera in which the lens barrel with the zoom lens system ZL is detachably mounted on the camera main body.

In the first embodiment described above and hereinafter, the zoom lens system ZL is one of the two-group configuration (the front lens group FG and the rear lens group RG) as a whole and with the rear lens group of the three-unit configuration, but the above constituent conditions and others are also applicable to other unit configurations: e.g., the front lens group FG of a one-unit configuration, and the entire lens system of a four-unit, five-unit, or other unit configuration. For example, in the first embodiment, the lens system of the rear lens group RG is composed of three movable lens units, and it is also possible to add another lens unit between the lens units, or to add another lens unit adjacent to the image side or the object side of the lens system.

Furthermore, one or more lens units, or a partial lens unit may be configured as a focusing lens unit to move in the optical-axis direction to effect focusing from an infinity object to a short-range object. In this case, the focusing lens unit is also applicable to autofocus, and is also suitable for driving by a motor (e.g., an ultrasonic motor) for autofocus. Particularly, where the zoom lens system ZL is of the five-unit configuration as a whole, at least a part of the front lens group FG is preferably configured as a focusing lens unit. In a case where the front lens group FG is composed of one lens unit, it is preferable to implement focusing by the front lens group FG or the first lens unit RG1 of the rear lens group RG and by a part of the first lens unit RG1.

In the first embodiment, the lens system may be configured as follows in order to prevent failure of photography due to image blur caused, e.g., by camera shake likely to occur in a high-zoom-ratio optical system: the lens system is combined with a vibration detector for detecting vibration of the lens system, and a driving device; the whole or a part of one lens unit among the lens units of the lens system is decentered as an anti-vibration lens unit so that the anti-vibration unit is vibrated to have a component in a direction perpendicular to the optical axis, by the driving device so as to correct for the image blur (variation in the position of the image plane) caused by vibration of the lens system detected by the vibration detector; whereby the image is shifted to correct for the image blur. Particularly, it is preferable to configure at least a part of the second lens unit RG2 in the rear lens group RG, as an anti-vibration lens unit. Furthermore, the first lens unit RG1 of the rear lens group RG may be constructed as an anti-vibration lens unit. In this manner, the zoom lens system ZL of the first embodiment can be made to function as a so-called anti-vibration optical system.

The above description showed the case where at least one aspherical lens was arranged in the second lens unit RG2 of the rear lens group RG; or in the third lens unit RG3 thereof, or in the rear partial lens unit FG2 of the front lens group FG, but a lens surface of any other lens unit may be formed as an aspherical surface. In this connection, the aspherical surface may be any one of an aspherical surface made by grinding, a glass mold aspherical surface made in an aspherical shape of glass by a mold, and a composite aspherical surface made in an aspherical shape of resin on a surface of glass.

The aperture stop S is preferably arranged on the object side with respect to the second lens unit RG2 as described above, but it is also possible to use a lens frame functioning as an aperture stop, without providing any member as an aperture stop.

Furthermore, each lens surface may be coated with an anti-reflection coating having high transmittance over a wide wavelength region to reduce flares and ghosts, thereby achieving optical performance with high contrast.

Based on the above, the zoom lens system of the first embodiment is able to achieve excellent optical performance even if a part of the zoom lens system is moved to have the component in the direction perpendicular to the optical axis.

The present invention was described above with the constituent features of the first embodiment for easier understanding thereof, but it is needless to mention that the present invention is not limited to it.

Second Embodiment

Figure 23:
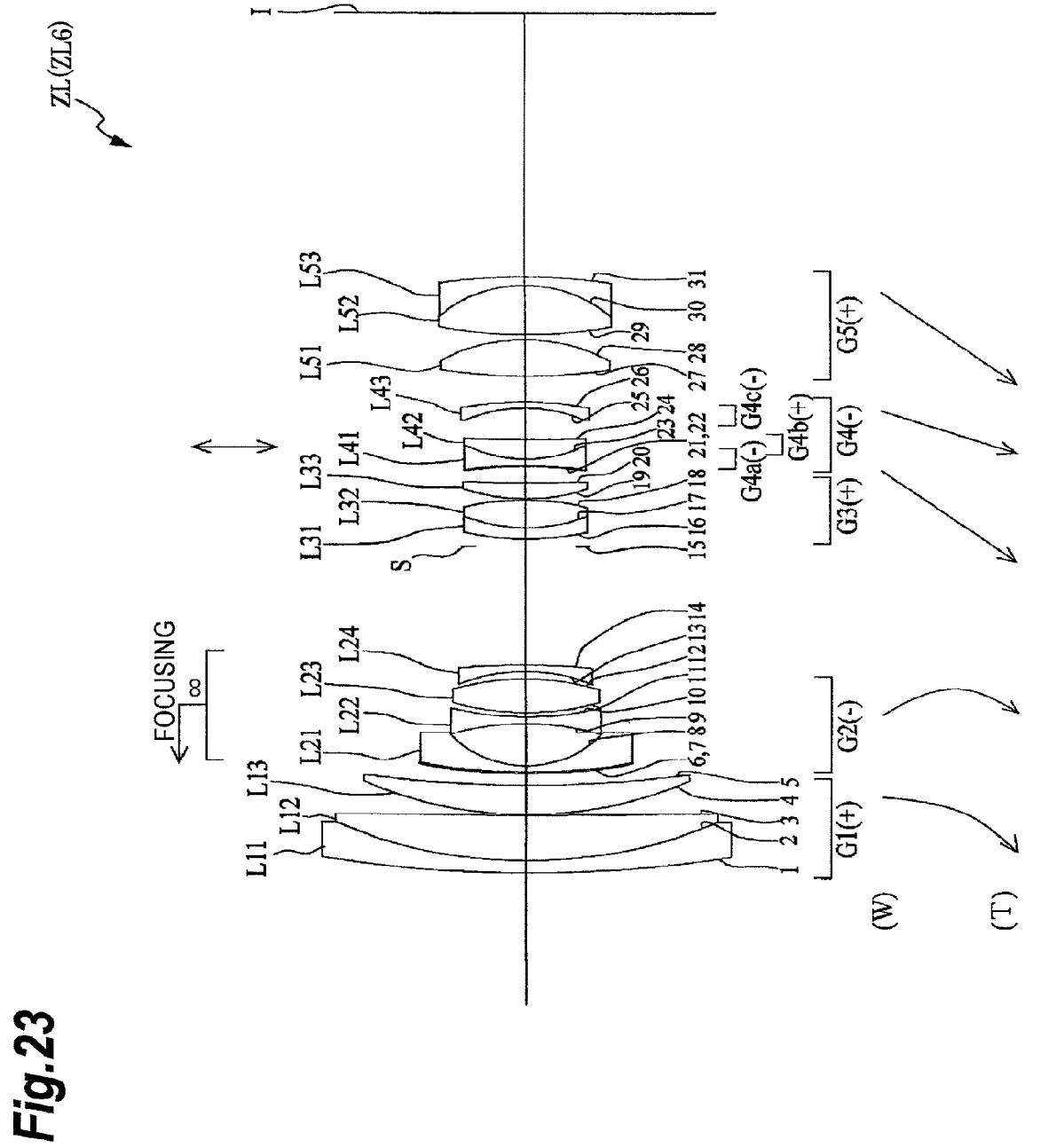
FIG. 23 is a sectional view showing a configuration of a zoom lens system according to the sixth example.

The second preferred embodiment of the present invention will be described below with reference to the drawings. In the present specification, the wide-angle end state and the telephoto end state will refer to those in the infinity in-focus state unless otherwise stated. As shown in FIG. 23, the zoom lens system ZL is composed of the following lens units arranged along the optical axis and in order from the object side: a first lens unit G1 having a positive refracting power; a second lens unit G2 having a negative lens power; a third lens unit G3 having a positive refracting power; a fourth lens unit G4 having a negative refracting power; and a fifth lens unit G5 having a positive refracting power. During zooming from the wide-angle end state to the telephoto end state, a space between the first lens unit G1 and the second lens unit G2 varies, a space between the second lens unit G2 and the third lens unit G3 varies, a space between the third lens unit G3 and the fourth lens unit G4 varies, and a space between the fourth lens unit G4 and the fifth lens unit G5 varies.

This configuration makes it feasible to lower heights of rays of various kinds (e.g., Rand rays, off-axis rays, etc.) incident to the second lens unit G2. This enables to keep down deterioration of various aberrations such as spherical aberration and curvature of field, while increasing the refracting power of the second lens unit G2 to achieve a high zoom ratio. In addition, the fourth lens unit G4 is configured to vary the spaces to the lens units before and after it, whereby curvature of field is suitably corrected for in the entire zoom range from the wide-angle end state to the telephoto end state.

In the present zoom lens system ZL, the fourth lens unit G4 is preferably composed of the following lenses arranged in order from the object side: a 4a lens G4a having a negative refracting power; a 4b lens G4b having a positive refracting power; and a 4c lens G4c having a negative refracting power. In general, a positive lens in a negative lens unit has a large load of aberration correction and gives rise to higher-order aberrations with increase in incidence heights and angles of rays, which are hard to correct. In the present zoom lens system ZL the 4b lens G4b having the positive refracting power is arranged on the image side of the 4a lens G4a having the negative refracting power, whereby incidence angles of Rand rays are made smaller at the 4b lens G4b to enable good correction for spherical aberration. In addition, the 4b lens G4b is arranged on the object side of the 4c lens G4c, whereby heights of off-axis rays are made smaller at the 4b lens G4b to enable good correction for curvature of field and distortion. These 4a to 4c lenses G4a-G4c may be cemented together. Furthermore, a further lens (e.g., a 4d lens) or the like may be located after the 4c lens G4c.

In the present zoom lens system ZL, preferably, the fourth lens unit G4 is so configured that at least a part of the fourth lens unit G4 is movable so as to have a component in a direction perpendicular to the optical axis. This enables correction for the image position and a photographic range can be readily changed by decentration of only the relatively compact and lightweight lens system. The zoom lens system ZL can be provided with the camera shake compensation function as it is configured to correct for deviation of the image position due to occurrence of camera shake.

In the present zoom lens system ZL, the 4a lens G4a is desirably of a biconcave shape. This configuration permits arrangement of minimum angle of deviation for Rand rays and is suitable for correction for spherical aberration.

Furthermore, in the present zoom lens system ZL, preferably, the fourth lens unit G4 has a cemented lens of the 4a lens G4a and the 4b lens G4b cemented together, and it is so configured that the cemented lens is movable so as to have a component in a direction perpendicular to the optical axis. When the 4a lens G4a and the 4b lens G4b are constructed as the cemented lens, it is feasible to make change smaller in mutual decentration of the 4a lens G4a and the 4b lens G4b and to relieve deterioration of optical performance due to manufacturing error. When the cemented lens is arranged as movable so as to have the component in the direction perpendicular to the optical axis, it is feasible to change the image position of the zoom lens system ZL and to provide the zoom lens system ZL with the camera shake compensation function. When the cemented lens is configured as a decentering unit, it becomes feasible to make excellent correction for chromatic aberration and coma aberration when decentration is made for correcting for the image position with occurrence of camera shake.

In the zoom lens system ZL, the 4c lens G4c is preferably a negative meniscus lens with a concave surface on the object side. This enables good correction for coma aberration at the telephoto end and curvature of field at the wide-angle end.

The zoom lens system ZL is preferably configured in a configuration wherein during change in the lens position state from the wide-angle end state to the telephoto end state, the third lens unit G3 and the fifth lens unit G5 move toward the object side and moving distances thereof relative to the image plane are equal. When the third lens unit G3 and the fifth lens unit G5 are configured to move toward the object side during zooming from the wide-angle end state to the telephoto end state, it is feasible to achieve both of decrease in the overall length in the wide-angle end state and good correction for various aberrations. When the moving distances of the third lens unit G3 and the fifth lens unit G5 are made equal, the third lens unit G3 and the fifth lens unit G5 can be constructed in an integral structure. This structure keeps down change in mutual decentration of the third lens unit G3 and the fifth lens unit G5 during the zooming from the wide-angle end state to the telephoto end state and thus relieves deterioration of optical performance due to manufacturing error.

The zoom lens system ZL is preferably configured in a configuration wherein during change in the lens position state from the wide-angle end state to the telephoto end state, the space between the first lens unit and the second lens unit increases, the space between the second lens unit and the third lens unit decreases, the space between the third lens unit and the fourth lens unit increases, and the space between the fourth lens unit and the fifth lens unit decreases. This configuration realizes the compact structure and high zoom ratio with excellent optical performance by making correction for curvature of field during zooming by the fourth lens unit G4 while achieving the satisfactory zoom ratio by the first, second, and third lens units G1-G3.

The zoom lens system ZL preferably satisfies Condition expression (11) below, where r4BR2 is a radius of curvature of an image-side lens surface of the 4b lens and f4 is a focal length of the fourth lens unit G4.

$$-1.00 < ((1/r4BR2) \times (-f4)) < 4.00 \qquad (11)$$

Condition expression (11) is a condition for defining the curvature of the image-side surface of the 4b lens G4b. When the zoom lens system ZL satisfies this Condition expression (11), it is corrected in a well-balanced manner for various aberrations in the entire zoom range from the wide-angle end state to the telephoto end state. If the ratio is more than the upper limit of Condition expression (11), variation in distortion will become too significant during zooming from the wide-angle end state to the telephoto end state and, particularly, it will be difficult to correct for positive distortion in the telephoto end state; therefore, it is unpreferred. The effect of the present invention can be made more definite by setting the upper limit of Condition expression (11) to 3.00, 2.00, or 1.00. On the other hand, if the ratio is less than the lower limit of Condition expression (11), angles of refraction of R and rays will become large on the image-side surface of the 4b lens G4b so as to make higher-order spherical aberration and chromatic aberration too significant. The positive power in the fourth lens unit G4 will become strong and if the negative refracting power in the third lens unit G3 is made stronger in order to cancel it, variation in spherical aberration and chromatic aberration will become too significant to correct during zooming; therefore, it is unpreferred. The effect of the present invention can be made more definite by setting the lower limit of Condition expression (11) to −0.50, 0.00, or 0.10.

The zoom lens system ZL preferably satisfies Condition expression (12) below, where fw345 is a composite focal length of the third lens unit G3, the fourth lens unit G4, and the fifth lens unit G5 in the wide-angle end state and f4 the focal length of the fourth lens unit G4.

$$0.10 < (-f4/fw345) < 1.60 \quad (12)$$

Condition expression (12) is a condition for defining the focal length of the fourth lens unit G4 of the zoom lens system ZL. When the zoom lens system ZL satisfies this Condition expression (12), it is well corrected for variation in curvature of field during the zooming from the wide-angle end state to the telephoto end state. If the ratio is more than the upper limit of Condition expression (12), the refracting power of the fourth lens unit G4 will become smaller and it will become difficult to correct for variation in curvature of field during the zooming from the wide-angle end state to the telephoto end state. If the spaces are changed before and after the fourth lens unit G4 during the zooming in order to compensate for it, it will lead to increase in the overall length in the wide-angle end state; therefore, it is unpreferred. The effect of the present invention can be made more definite by setting the upper limit of Condition expression (12) to 1.40, 1.20, or 1.00. On the other hand, if the ratio is less than the lower limit of Condition expression (12), the refracting power of the fourth lens unit G4 will become too large to correct for curvature of field and coma aberration in the wide-angle end state. Furthermore, it will result in significant deterioration of optical performance due to mutual decentration among the lens units (or the like) and, particularly, significant decentration field tilt. The effect of the present invention can be made more definite by setting the lower limit of Condition expression (12) to 0.50, 0.60, or 0.70.

The zoom lens system ZL is preferably configured in a configuration wherein during change in the lens position state from the wide-angle end state to the telephoto end state, the space between the third lens unit G3 and the fourth lens unit G4 varies from d34w to d34t and the space between the fourth lens unit G4 and the fifth lens unit G5 varies from d45w to d45t, and it satisfies Condition expressions (13) and (14) below, where fw345 is the composite focal length of the third lens unit G3, the fourth lens unit G4, and the fifth lens unit G5 in the wide-angle end state.

$$0.02 < (d34t - d34w)/fw345 < 0.40 \quad (13)$$

$$0.02 < (d45w - d45t)/fw345 < 0.40 \quad (14)$$

Condition expression (13) is a condition for defining a change amount of the space between the third lens unit G3 and the fourth lens unit G4 during transition of the zoom lens system ZL from the wide-angle end state to the telephoto end state. Condition expression (14) is a condition for defining a change amount of the space between the fourth lens unit G4 and the fifth lens unit G5 during transition of the zoom lens system ZL from the wide-angle end state to the telephoto end state. When the zoom lens system ZL satisfies Condition expressions (13) and (14), it is feasible to suitably correct for spherical aberration in the telephoto end state and curvature of field in the wide-angle end state, while achieving reduction in the overall length at the wide-angle end.

If the change amount ratio is more than the upper limit of Condition expression (13), the space between the third lens unit G3 and the fourth lens unit G4 will become too large in the telephoto end state to correct for spherical aberration and coma aberration in the telephoto end state and it is thus unpreferred. The effect of the present invention can be made more definite by setting the upper limit of Condition expression (13) to 0.30, 0.20, or 0.15. On the other hand, if the change amount ratio is less than the lower limit of Condition expression (13), variation in spherical aberration will become too large to correct during the zooming from the wide-angle end state to the telephoto end state; therefore, it is unpreferred. The effect of the present invention can be made more definite by setting the lower limit of Condition expression (13) to 0.05, 0.07, or 0.09.

If the change amount ratio is more than the upper limit of Condition expression (14), the space between the fourth lens unit G4 and the fifth lens unit G5 will become large in the wide-angle end state and ray heights of off-axis rays will become high at the fifth lens unit G5. This makes it difficult to correct for curvature of field and coma aberration in the wide-angle end state and it is thus unpreferred. The effect of the present invention can be made more definite by setting the upper limit of Condition expression (14) to 0.30, 0.20, or 0.15. On the other hand, if the change amount ratio is less than the lower limit of Condition expression (14), variation in curvature of field will become too large to correct during the zooming from the wide-angle end state to the telephoto end state; therefore, it is unpreferred. The effect of the present invention can be made more definite by setting the lower limit of Condition expression (14) to 0.05, 0.07, or 0.09.

The zoom lens system ZL preferably satisfies Condition expressions (15) and (16) below, where r4AR2 is a radius of curvature of an image-side lens surface of the 4a lens G4a and r4BR1 is a radius of curvature of an object-side lens surface of the 4b lens G4b.

$$0.30 < ((1/r4AR2) \times (-f4)) < 4.00 \quad (15)$$

$$0.30 < ((1/r4BR1) \times (-f4)) < 4.00 \quad (16)$$

Condition expression (15) is a condition for defining the curvature of the image-side surface of the 4a lens G4a to the focal length of the fourth lens unit G4. Condition expression (16) is a condition for defining the curvature of the object-side surface of the 4b lens G4b to the focal length of the fourth lens unit G4. If either of the ratios in Condition expressions (15) and (16) is off the upper limit and the lower limit thereof, it will become difficult to correct for spherical aberration and variation in spherical aberration will increase during the zooming from the wide-angle end state to the telephoto end state; it is thus unpreferred.

If the ratio is more than the upper limit of Condition expression (15), the curvature of the image-side surface of the 4a lens G4a will become large and positive spherical aberration will become too significant to correct; it is thus unpreferred. The effect of the present invention can be made more definite by setting the upper limit of Condition expression (15) to 3.00, 2.00, or 1.50. On the other hand, if the ratio is less than the lower limit of Condition expression (15), the curvature of the image-side surface of the 4a lens G4a will become small and negative spherical aberration will become too significant to correct; it is thus unpreferred. The effect of the present invention can be made more definite by setting the lower limit of Condition expression (15) to 0.50, 0.80, or 1.00.

If the ratio is more than the upper limit of Condition expression (16), the curvature of the image-side surface of the 4b lens G4b will become large and positive spherical aberration will become too significant to correct; it is thus unpreferred. The effect of the present invention can be made more definite by setting the upper limit of Condition expression (16) to 3.00, 2.00, or 1.50. On the other hand, if the ratio is less than the lower limit of Condition expression (16), the curvature of the image-side surface of the 4b lens G4b will become small and negative spherical aberration will become too significant to correct; it is thus unpreferred. The effect of the present invention can be made more definite by setting the lower limit of Condition expression (16) to 0.50, 0.80, or 1.00.

The zoom lens system ZL preferably satisfies Condition expression (17) below, where N4A is a refractive index of the 4a lens G4a for the d line and N4B is a refractive index of the 4b lens G4b for the d line.

$$-0.150 < (N4B - N4A) < 0.150 \quad (17)$$

Condition expression (17) is a condition for defining a relation between the refractive index of the 4b lens G4b for the d line and the refractive index of the 4a lens G4a for the d line. If the difference is off either of the upper limit and the lower limit of Condition expression (17), variation in curvature of field will become too large to correct during transition from the wide-angle end state to the telephoto end state; it is thus unpreferred. For securely achieving the effect of the present invention, it is preferable to set the upper limit of Condition expression (17) to 0.100, 0.045, or 0.020 and to set the lower limit thereof to −0.100 or −0.030.

The zoom lens system ZL preferably satisfies Condition expression (18) below, where ν4A is an Abbe number of the 4a lens and ν4B is an Abbe number of the 4b lens.

$$5.00 < \nu 4A - \nu 4B < 30.00 \quad (18)$$

Condition expression (18) is a condition for defining a relation between the Abbe number of the 4a lens G4a and the Abbe number of the 4b lens G4b. If the difference is off either of the upper limit and the lower limit of Condition expression (18), chromatic aberration produced by the fourth lens unit G4 will become too significant to correct; it is thus unpreferred. For securely achieving the effect of the present invention, it is preferable to set the upper limit of Condition expression (18) to 25.00 or 19.00 and to set the lower limit thereof to 8.00 or 11.50.

In the zoom lens system ZL, the second lens unit G2 preferably has at least one aspherical surface. This enables good correction for curvature of field and distortion at the wide-angle end and thus permits increase in the angle of view at the wide-angle end. The fourth lens unit G4 preferably has at least one aspherical surface. This enables good correction for spherical aberration and coma aberration at the telephoto end. The fifth lens unit G5 preferably has at least one aspherical surface. This enables good correction for curvature of field and distortion at the wide-angle end. It is preferable that the second lens unit G2 and the fourth lens unit G4 have a composite aspherical lens. In the present specification, a composite aspherical lens is assumed to be one lens and the curvature thereof refers to a center curvature.

The zoom lens system ZL preferably has an aperture stop S on the object side with respect to the fourth lens unit G4. This structure makes it feasible to achieve both of decrease in the diameter of the front lens and good correction for various aberrations.

Figure 43A:
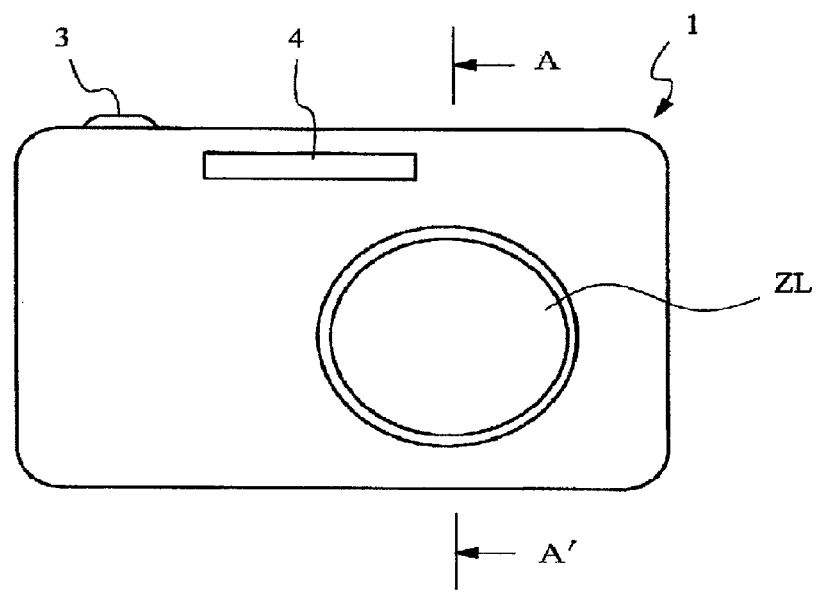
FIG. 43A shows an digital still camera equipped with a zoom lens system according to the present invention, and is a front view thereof.
Figure 43B:
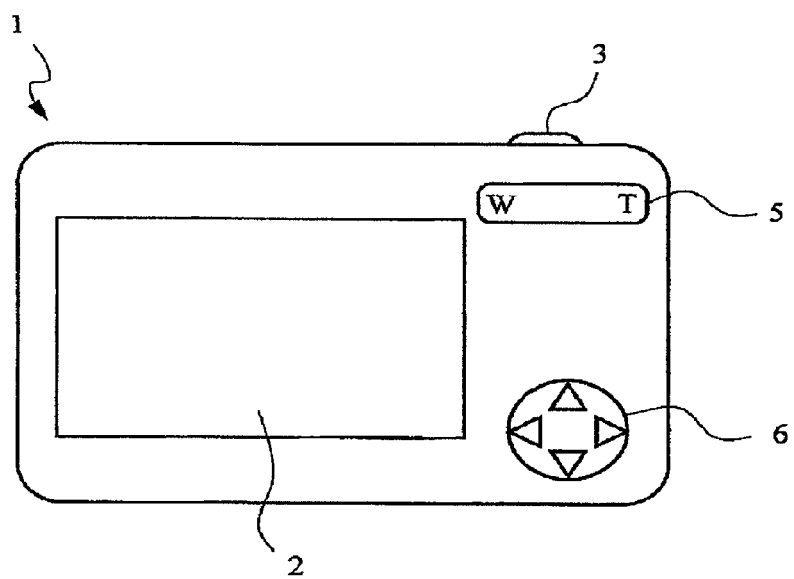
FIG. 43B shows the digital still camera equipped with the zoom lens system according to the present invention, and is a back view thereof.
Figure 44:
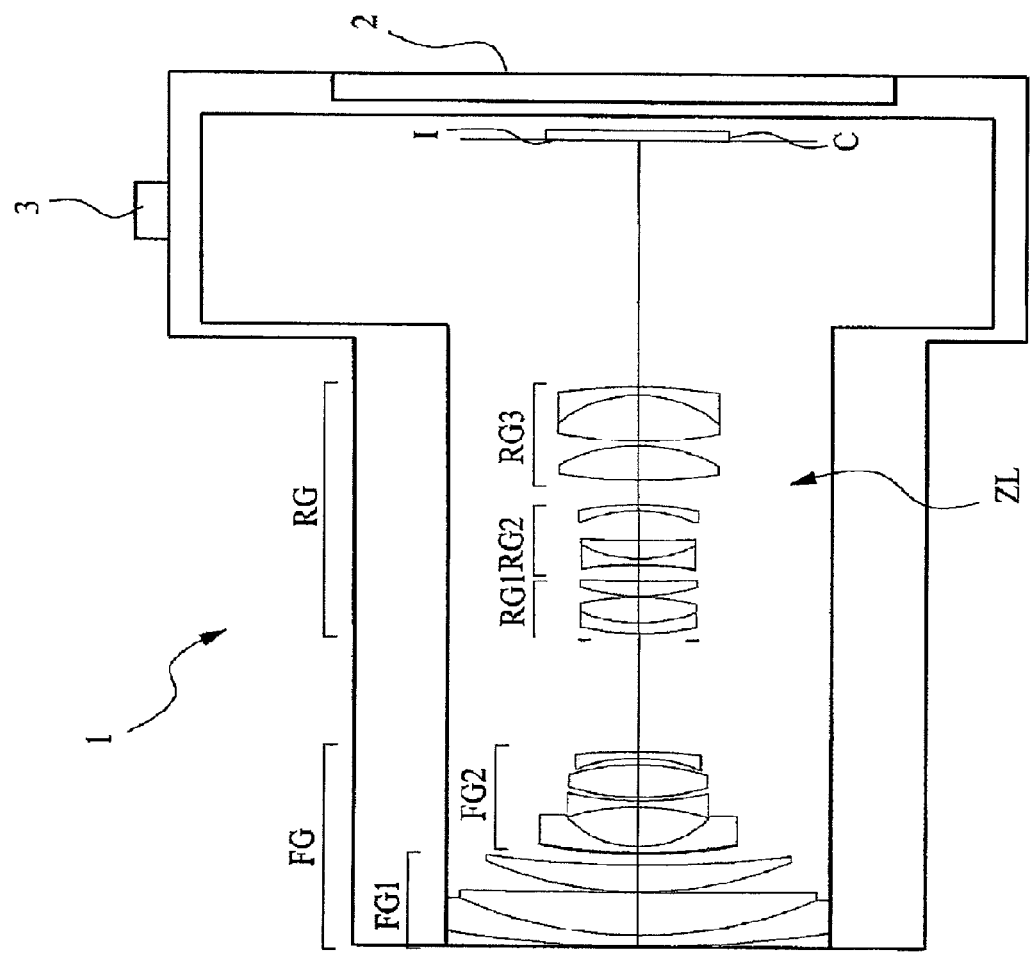
FIG. 44 is a sectional view along line A-A' in FIG. 43A.

FIGS. 43 and 44 show a configuration of an digital still camera 1 (which will be referred to simply as a camera), as an optical device with the above-described zoom lens system ZL. This camera 1 operates as follows. When a photographer pushes an unrepresented power button, an unrepresented shutter of a taking lens (zoom lens system ZL) is opened and the zoom lens system ZL collects light from a subject not shown, to form an image of the subject on an image pickup device C (e.g., a CCD, CMOS, or the like) arranged on the image plane I. The subject image formed on the image pickup device C is displayed on a liquid crystal monitor 2 arranged on the back of the camera 1. The photographer decides a composition of the subject image while viewing the liquid crystal monitor 2, and then depresses a shutter release button 3 to take the subject image by the image pickup device C to record and store it into an unrepresented memory.

This camera 1 is provided with an auxiliary light emitter 4 to emit auxiliary light to a dark subject, a wide (W)-tele (T) button 5 for zooming of the zoom lens system ZL from the wide-angle end state (W) to the telephoto end state (T), a function button 6 to be used, e.g., for setting various conditions of the camera 1, and so on. FIG. 44 shows the example of the compact type camera in which the camera 1 is integrally formed with the zoom lens system ZL, but the present invention is also applicable to such an optical device as a single-lens reflex camera in which the lens barrel with the zoom lens system ZL is detachably mounted on the camera main body.

The second embodiment described above and hereinafter shows the five-unit configuration, but the above constituent conditions and others are also applicable to other unit configurations: e.g., the first lens unit G1 and the second lens unit G2 of a one-unit configuration, and the entire lens system of a four-unit, five-unit, or other unit configuration. For example, the second embodiment may be modified as follows: in the lens system composed of the three movable lens units of the third lens unit G3, the fourth lens unit G4, and the fifth lens unit G5, another lens unit is added between the lens units; or another lens unit may be added adjacent to the image side or the object side of the lens system.

Furthermore, one or more lens units, or a partial lens unit may be configured as a focusing lens unit to move in the optical-axis direction to effect focusing from an infinity object to a short-range object. In this case, the focusing lens unit is also applicable to autofocus, and is also suitable for driving by a motor (e.g., an ultrasonic motor) for autofocus. Particularly, at least a part of the first lens unit G1 or the second lens unit G2 is preferably configured as a focusing lens unit.

In the second embodiment, the lens system may be configured as follows in order to prevent failure of photography due to image blur caused, e.g., by camera shake likely to occur in a high-zoom-ratio zoom lens: the lens system is combined with a vibration detector for detecting vibration of the lens system, and a driving device; the whole or a part of one lens unit among the lens units of the lens system is decentered as an anti-vibration lens unit so that the anti-vibration unit is vibrated to have a component in a direction perpendicular to the optical axis, by the driving device so as to correct for the image blur (variation in the position of the image plane)

caused by vibration of the lens system detected by the vibration detector; whereby the image is shifted to correct for the image blur. Particularly, it is preferable to configure at least a part of the fourth lens unit G4 as an anti-vibration lens unit. Furthermore, the third lens unit G3 may be constructed as an anti-vibration lens unit. In this manner, the zoom lens system ZL of the second embodiment can be made to function as a so-called anti-vibration optical system.

The above description showed the case where at least one aspherical lens was arranged in the second lens unit G2 or the fourth lens unit G4, or in the fifth lens unit G5, but a lens surface of any other lens unit may be formed as an aspherical surface. In this connection, the aspherical surface may be any one of an aspherical surface made by grinding, a glass mold aspherical surface made in an aspherical shape of glass by a mold, and a composite aspherical surface made in an aspherical shape of resin on a surface of glass.

The aperture stop S is preferably arranged on the object side with respect to the fourth lens unit G4 as described above, but it is also possible to use a lens frame functioning as an aperture stop, without providing any member as an aperture stop.

Furthermore, each lens surface may be coated with an anti-reflection coating having high transmittance over a wide wavelength region to reduce flares and ghosts, thereby achieving optical performance with high contrast.

The zoom lens system of the second embodiment is obtained in a compact structure and with a high zoom ratio and achieves excellent optical performance.

Figure 45:
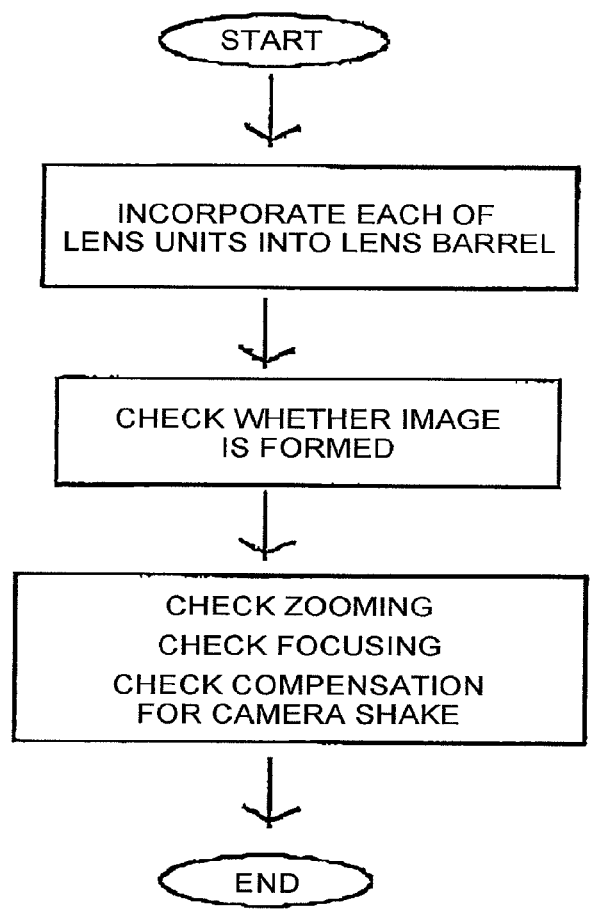
FIG. 45 is a flowchart of a manufacturing method of a zoom lens system according to the first embodiment.

A method of manufacturing the zoom lens system of the first embodiment will be briefly described below with reference to FIG. 45.

First, each of the lens units is incorporated into a cylindrical lens barrel. On the occasion of incorporating each of the lens units into the lens barrel, the lens units may be incorporated one by one in order along the optical axis into the lens barrel, or some or all of the lens units may be first held together by a holding member and then they are assembled with the lens barrel member. In the camera lens of the present embodiment, the lens units are arranged as follows in order from the object side: the first lens unit RG1 having the positive refracting power; the second lens unit RG2 having the negative refracting power; and the third lens unit RG3 having the positive refracting power. After the lens units are incorporated into the lens barrel, it is preferable to check whether an image of an object is formed in a state in which the lens units are incorporated in the lens barrel.

After completion of the assembly of the zoom lens system as described above, various operations of the zoom lens system are examined. Examples of the various operations include a zoom operation to move at least one or more of the lens units along the optical-axis direction during zooming, a focusing operation to move the lens unit for focus adjustment from infinity to a near object, along the optical-axis direction, a camera shake compensation operation to move at least one or more lenses so as to have a component in a direction orthogonal to the optical axis, and so on. An order of checking the various operations can be optionally determined.

The present invention was described above with the constituent features of the second embodiment for easier understanding thereof, but it is needless to mention that the present invention is not limited to it.

EXAMPLES

Each of examples (the first to fifth examples) of the first embodiment of the present invention will be explained below on the basis of the accompanying drawings. FIG. 1 is a sectional view showing a configuration of a zoom lens system ZL according to an example, which shows a refracting power layout and states of movement of respective lens units with change in the focal length state from the wide-angle end state (W) to the telephoto end state (T) indicated by arrows in the lower part of FIG. 1. As shown in this FIG. 1, the zoom lens system ZL of the present example has a front lens group FG1 and a rear lens group RG arranged along the optical axis and in order from the object side. The front lens group FG is composed of a front partial lens unit FG1 having a positive refracting power and a rear partial lens unit FG2 having a negative refracting power, which are arranged in order from the object side. The rear lens group RG is composed of a first lens unit RG1 having a positive refracting power, a second lens unit RG2 having a negative refracting power, and a third lens unit RG3 having a positive refracting power, which are arranged in order from the object side.

In each example, an aspherical surface is represented by formula (a) below, where y is a height in a direction perpendicular to the optical axis, S(y) a distance (sag) along the optical axis from a tangent plane to a top of each aspherical surface at height h to the aspherical surface, r a radius of curvature of a reference spherical surface (paraxial curvature radius), κ the conic constant, and An the nth-order aspherical coefficient. In the examples hereinafter, "E-n" represents "$\times 10^{-n}$".

$$S(y)=(y^2/r)/\{1+(1-\kappa \times y^2/r^2)^{1/2}\}+A4 \times y^4+A6 \times y^6+A8 \times y^8+A10 \times y^{10} \quad (a)$$

In each example, the second-order aspherical coefficient A2 is 0. In a table of each example, each aspherical surface is accompanied by mark * on the left of a surface number.

First Example

FIG. 1 is a drawing showing the configuration of the zoom lens system ZL1 according to the first example. This zoom lens system ZL1 of FIG. 1 is composed of the following units arranged in order from the object side: a front partial lens unit FG1 having a positive refracting power; a rear partial lens unit FG2 having a negative refracting power; a first lens unit RG1 having a positive refracting power; a 2a partial lens unit RG2a having a negative refracting power; a 2b partial lens unit RG2b having a negative refracting power; and a third lens unit RG3 having a positive refracting power. This zoom lens system ZL1 is configured as follows: the spaces between the lens units vary during change in the lens position state from the wide-angle end state to the telephoto end state in such a manner that the air space between the front partial lens unit FG1 and the rear partial lens unit FG2 varies, that the air space between the rear partial lens unit FG2 and the first lens unit RG1 decreases, that the air space between the first lens unit RG1 and the 2a partial lens unit RG2a varies (or increases) from d12w to d12t, and that the air space between the 2b partial lens unit RG2b and the third lens unit RG3 decreases to change from d23w to d23t; the 2a partial lens unit RG2a is moved so as to have a component in a direction orthogonal to the optical axis, thereby effecting correction for the image position with occurrence of camera shake. The space d12w or d12t between the first lens unit RG1 and the second lens unit RG2 in the wide-angle end state or in the telephoto end state corresponds to d3 in the table showing values of specifications in each example, and the space d23w or d23t between the second lens unit RG2 and the third lens unit RG3 in the wide-angle end state or in the telephoto end state corresponds to d4 in the table showing values of specifications in each example.

The front partial lens unit FG1 is composed of the following lenses arranged in order from the object side: a cemented lens of a negative meniscus lens FL11 with a convex surface on the object side and a positive meniscus lens FL12 with a convex surface on the object side; and a positive meniscus lens FL13 with a convex surface on the object side. The rear partial lens unit FG2 is composed of the following lenses arranged in order from the object side: a negative meniscus lens FL21 with a convex surface on the object side; a biconcave lens FL22; a biconvex lens FL23; and a negative meniscus lens FL24 with a concave surface on the object side; the negative meniscus lens FL21 located nearest to the object side in the rear partial lens unit FG2 is a composite aspherical lens in which an aspherical surface is formed by laying a resin layer on the object-side lens surface.

The first lens unit RG1 is composed of the following lenses arranged in order from the object side: a cemented lens of a negative meniscus lens RL11 with a convex surface on the object side and a biconvex lens RL12; and a positive meniscus lens RL13 with a convex surface on the object side. The 2a partial lens unit RG2a is composed of a cemented lens of a biconcave lens RL21 and a positive meniscus lens RL22 with a convex surface on the object side arranged in order from the object side; the biconcave lens RL21 located nearest to the object side in the 2a partial lens unit RG2a is a composite aspherical lens in which an aspherical surface is formed by laying a resin layer on the object-side lens surface. The 2b partial lens unit RG2b is composed of a negative meniscus lens RL23 with a concave surface on the object side. The third lens unit RG3 is composed of the following lenses arranged in order from the object side: a biconvex lens RL31; and a cemented lens of a biconvex lens RL32 and a negative meniscus lens RL33 with a concave surface on the object side; the negative meniscus lens RL33 located nearest to the image side in the third lens unit RG3 is a glass mold type aspherical lens in which the image-side lens surface is of an aspherical shape.

The aperture stop S is located between the rear partial lens unit FG2 and the first lens unit RG1 and moves together with the first lens unit RG1 during the zooming from the wide-angle end state to the telephoto end state. Focusing from a far range to a near range is implemented by moving the rear partial lens unit FG2 toward the object side.

In the case of a lens wherein the focal length of the overall system is f and wherein an anti-vibration compensation factor (a ratio of an image position movement amount on the image plane to a movement amount of a moving lens unit in shake compensation) is K, a rotational deviation of angle $\theta$ can be corrected by moving the moving lens unit for shake compensation by $(f \cdot \tan \theta)/K$ in the direction orthogonal to the optical axis. Since the anti-vibration compensation factor is 1.04 and the focal length is 18.4 (mm) in the wide-angle end state in the first example, the movement amount of the 2a partial lens unit RG2a for compensation for the rotational deviation of 1.50° is 0.46 (mm). Since the anti-vibration compensation factor is 1.85 and the focal length is 102.5 (mm) in the telephoto end state in the first example, the movement amount of the 2a partial lens unit RG2a for compensation for the rotational deviation of 0.60° is 0.58 (mm). It should be noted that in the present example the rotational deviation was assumed to be double that in the normal case (i.e., the range of 0° to 0.60°) and that the movement amount of the moving lens unit (2a partial lens unit RG2a) for compensation for the rotational deviation was examined by double that in the normal case. These also apply to the examples hereinafter.

Table 1 below provides values of specifications in the first example. In this Table 1, f represents the focal length, FNO the F number, $\omega$ a half angle of view, and Bf the back focus. Furthermore, the surface No. indicates an order of each lens surface from the object side along a ray travel direction, the surface separation a space on the optical axis from each optical surface to a next optical surface, and the refractive index and Abbe number values for the d line ($\lambda$=587.6 nm). It is noted herein that "mm" is used as the unit of length for the focal length f, the radius of curvature, the surface separation, and other lengths appearing in all the specifications below, but the unit of length does not always have to be limited to it because equivalent optical performance is achieved when an optical system is proportionally enlarged or reduced. The radius of curvature of 0.0000 indicates a plane and the refractive index of air of 1.00000 is omitted. The notation of these symbols and the description of the specification table also apply to the examples hereinafter. In the following tables, s, r, d, n, and $\nu$ denote the Surface No., Radius of curvature, Surface distance, Refractive index, and Abbe number, respectively. Also, in the following tables, WE, MFL, TE, IH, LLS, LU, SS, FL, and LG denote wide-angle end, middle focal length, telephoto end, image height, the length of zoom lens system, lens unit, starting surface, focal length, and lens group, respectively.

TABLE 1

| s | r | d | $\nu$ | n |
|---|---|---|---|---|
| 1 | 148.6804 | 1.8000 | 23.78 | 1.846660 |
| 2 | 53.5195 | 6.9847 | 56.45 | 1.672275 |
| 3 | 1203.8588 | 0.1000 | | |
| 4 | 45.7199 | 4.4150 | 48.95 | 1.770984 |
| 5 | 136.8162 | (d1) | | |
| *6 | 87.1098 | 0.2000 | 38.09 | 1.553890 |
| 7 | 65.0000 | 1.0000 | 50.73 | 1.764943 |
| 8 | 12.2656 | 6.3636 | | |
| 9 | −29.3430 | 1.0000 | 42.62 | 1.833873 |
| 10 | 36.0783 | 0.6211 | | |
| 11 | 29.3049 | 5.2003 | 23.07 | 1.847995 |
| 12 | −27.3230 | 1.0791 | | |
| 13 | −19.6728 | 1.0028 | 39.93 | 1.833079 |
| 14 | −72.9545 | (d2) | | |
| 15 | 0.0000 | 1.1000 | | |
| 16 | 31.0569 | 1.7500 | 23.78 | 1.846660 |
| 17 | 18.9160 | 4.1954 | 69.20 | 1.519000 |
| 18 | −28.5216 | 0.2000 | | |
| 19 | 22.7713 | 2.4518 | 82.49 | 1.498000 |
| 20 | 172.4901 | (d3) | | |
| *21 | −47.0722 | 0.1500 | 38.09 | 1.553890 |
| 22 | −44.0722 | 1.0000 | 37.16 | 1.834000 |
| 23 | 14.9882 | 3.0239 | 25.43 | 1.805181 |
| 24 | 182.1551 | 4.8081 | | |
| 25 | −16.4968 | 1.0000 | 43.03 | 1.818577 |
| 26 | −34.2785 | (d4) | | |
| 27 | 61.8619 | 5.5935 | 65.57 | 1.538373 |
| 28 | −19.6512 | 0.7000 | | |
| 29 | 50.3975 | 7.5000 | 70.41 | 1.487490 |
| 30 | −15.1843 | 1.4000 | 40.78 | 1.806100 |
| *31 | −55.8591 | (Bf) | | |

| | WE | MFL | TE |
|---|---|---|---|
| f = | 18.4~ | 55.0~ | 102.5 |
| FNO = | 3.5~ | 4.7~ | 5.8 |
| $\omega$ = | 38.7~ | 14.0~ | 7.7 |
| IH = | 14.0~ | 14.0~ | 14.0 |
| LLS = | 130.936~ | 161.050~ | 185.048 |
| Bf = | 40.000~ | 60.991~ | 82.306 |

[Focal Lengths of Respective Lens Units]

| LU | SS | FL |
|---|---|---|
| FG1 | 1 | 75.683 |
| FG2 | 6 | −12.500 |
| RG1 | 15 | 21.900 |

TABLE 1-continued

| | | |
|---|---|---|
| RG2 | 21 | −18.673 |
| RG3 | 27 | 25.435 |

[Focal Lengths of Front Lens Group FG and Rear Lens Group RG]

| LG | SS | WE | MFL | TE |
|---|---|---|---|---|
| FG | 1 | −17.447 | −28.905 | −38.479 |
| RG | 15 | 31.603 | 30.660 | 30.261 |

In the first example, each lens surface of the sixth surface, the twenty first surface, and the thirty first surface is formed in an aspherical shape. Table 2 below provides data of the aspherical surfaces, i.e., values of the conic constant K and the aspherical constants A4-A10 thereof.

TABLE 2

| | κ | A4 | A6 | A8 | A10 |
|---|---|---|---|---|---|
| 6th surface | −46.1784 | 2.75110E−05 | −7.34000E−08 | 1.31870E−10 | 5.44290E−14 |
| 21st surface | 10.3116 | 2.43420E−05 | 2.48240E−08 | 0.00000E+00 | 0.00000E+00 |
| 31st surface | 4.0858 | 1.21100E−05 | −3.67070E−09 | −4.27560E−11 | −2.41150E−13 |

In the first example, the following spaces vary during zooming: axial air space d1 between the front partial lens unit FG1 and the rear partial lens unit FG2; axial air space d2 between the rear partial lens unit FG2 and the first lens unit RG1; axial air space d3 between the first lens unit RG1 and the second lens unit RG2; axial air space d4 between the second lens unit RG2 and the third lens unit RG3. Table 3 below provides the varying spaces at respective focal lengths in the wide-angle end state, in an intermediate focal length state, and in the telephoto end state.

TABLE 3

| | WE | MFL | TE |
|---|---|---|---|
| d1 | 1.814 | 23.307 | 31.451 |
| d2 | 18.119 | 5.749 | 0.289 |
| d3 | 2.471 | 4.753 | 5.363 |
| d4 | 3.892 | 1.611 | 1.000 |

Table 4 below shows values corresponding to the respective condition expressions in this first example. In this Table 4, d12t represents the space between the first lens unit RG1 and the second lens unit RG2 in the telephoto end state; d12w the space between the first lens unit RG1 and the second lens unit RG2 in the wide-angle end state; d23t the space between the second lens unit RG2 and the third lens unit RG3 in the telephoto end state; d23w the space between the second lens unit RG2 and the third lens unit RG3 in the wide-angle end state; Bfw the distance from the lens surface nearest to the image side to the image plane in the wide-angle end state (provided that the value of Bfw used herein is an air-equivalent length excluding a prism without any refracting power, a filter, an optical low-pass filter, and so on); Δx1 the moving distance of the first lens unit RG1 relative to the image plane during change in the lens position state from the wide-angle end state to the telephoto end state; f2 the focal length of the second lens unit RG2; fR2a the focal length of the 2a partial lens unit RG2a; fR2b the focal length of the 2b partial lens unit RG2b; Rs the radius of curvature of cemented surfaces in the cemented lens of the 2a partial lens unit RG2a; Np the refractive index of the positive meniscus lens in the 2a partial lens unit RG2a for the d line; Nn the refractive index of the biconcave lens in the 2a partial lens unit RG2a for the d line; νp the Abbe number of the positive meniscus lens in the 2a partial lens unit RG2a; νn the Abbe number of the biconcave lens in the 2a partial lens unit RG2a. This notation of symbols also applies to the examples hereinafter.

TABLE 4

(1)(d12t − d12w)/Bfw = 0.072
(2)(d23w − d23t)/Bfw = 0.072
(3)(d12w/d13w) = 0.151
(4)(d23t/d13t) = 0.061
(5)|Δ × 1|/Bfw = 1.058
(6)(−f2)/Bfw = 0.467
(7)fR2a/fR2b = 1.016
(8)Rs/(−f2) = 0.803
(9)Np − Nn = −0.029

TABLE 4-continued (10)νn − νp = 11.730

Table 4a below shows values corresponding to the respective condition expressions in this first example. In this Table 4a, d12t represents the space between the first lens unit RG1 and the second lens unit RG2 in the telephoto end state; d12w the space between the first lens unit RG1 and the second lens unit RG2 in the wide-angle end state; d23t the space between the second lens unit RG2 and the third lens unit RG3 in the telephoto end state; d23w the space between the second lens unit RG2 and the third lens unit RG3 in the wide-angle end state; BL the value obtained from the composite focal length fw123 of the first lens unit RG1, the second lens unit RG2, and the third lens unit RG3 and the composite magnification βw123 of the first lens unit RG1, the second lens unit RG2, and the third lens unit RG3 in the wide-angle end state, as in Condition expressions (1-a), (2-a), (3), and (4); Δx1 the moving distance of the first lens unit RG1 relative to the image plane during change in the lens position state from the wide-angle end state to the telephoto end state; f2 the focal length of the second lens unit RG2; fR2a the focal length of the 2a partial lens unit RG2a; fR2b the focal length of the 2b partial lens unit RG2b; Rs the radius of curvature of cemented surfaces in the cemented lens of the 2a partial lens unit RG2a; Np the refractive index of the positive meniscus lens in the 2a partial lens unit RG2a for the d line; Nn the refractive index of the biconcave lens in the 2a partial lens unit RG2a for the d line; νp the Abbe number of the positive meniscus lens in the 2a partial lens unit RG2a; νn the Abbe number of the biconcave lens in the 2a partial lens unit RG2a. This notation of symbols also applies to the examples hereinafter.

TABLE 4a (1)(d12t − d12w)/BL = 0.045
(2)(d23w − d23t)/BL = 0.045
(3)(d12w/d13w) = 0.151
(4)(d23t/d13t) = 0.061
(5)|Δ × 1|/BL = 0.652
(6)(−f2)/BL = 0.288

TABLE 4a-continued (7)fR2a/fR2b = 1.016
(8)Rs/(−f2) = 0.803
(9)Np − Nn = −0.029
(10)νn − νp = 11.730

Figure 2A:
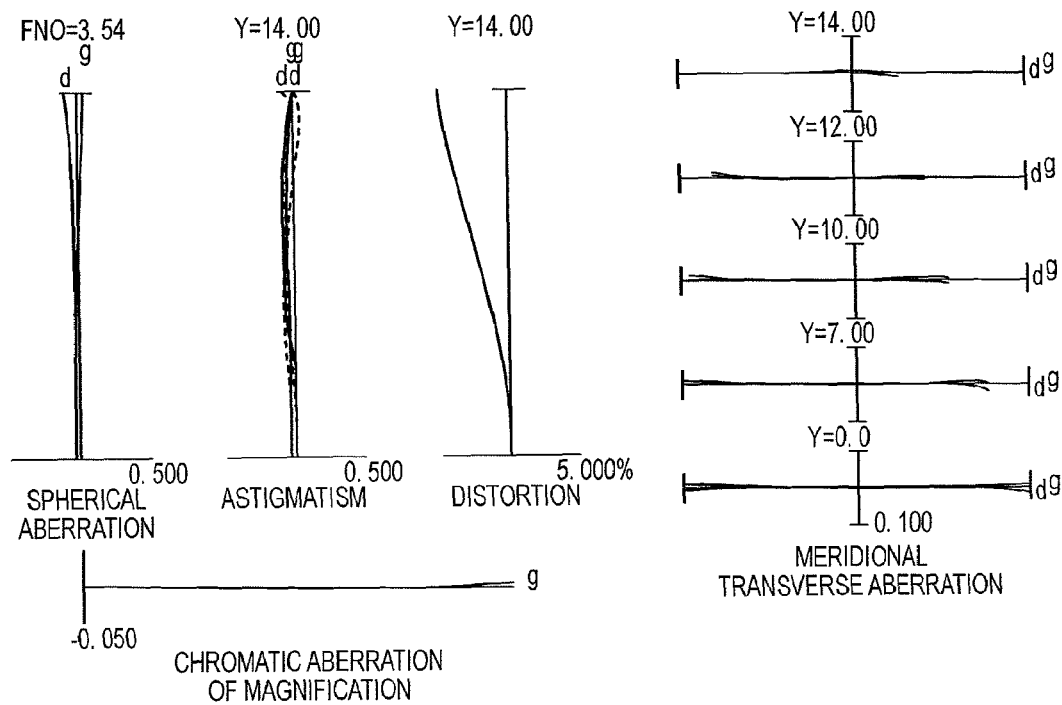
FIG. 2A is various aberration diagrams in an infinity in-focus state of the first example, which are those in the wide-angle end state.
Figure 2B:
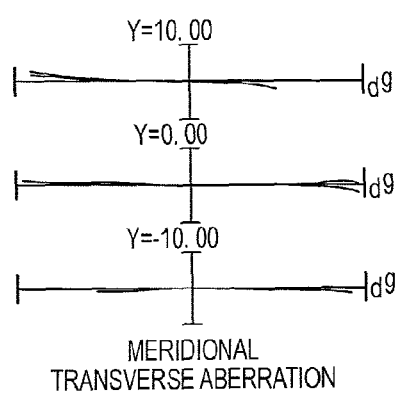
FIG. 2B is various aberration diagrams in the infinity in-focus state of the first example, which are meridional transverse aberration diagrams with shake compensation for rotational shake of 1.50° in an infinity photography state in the wide-angle end state.
Figure 3:
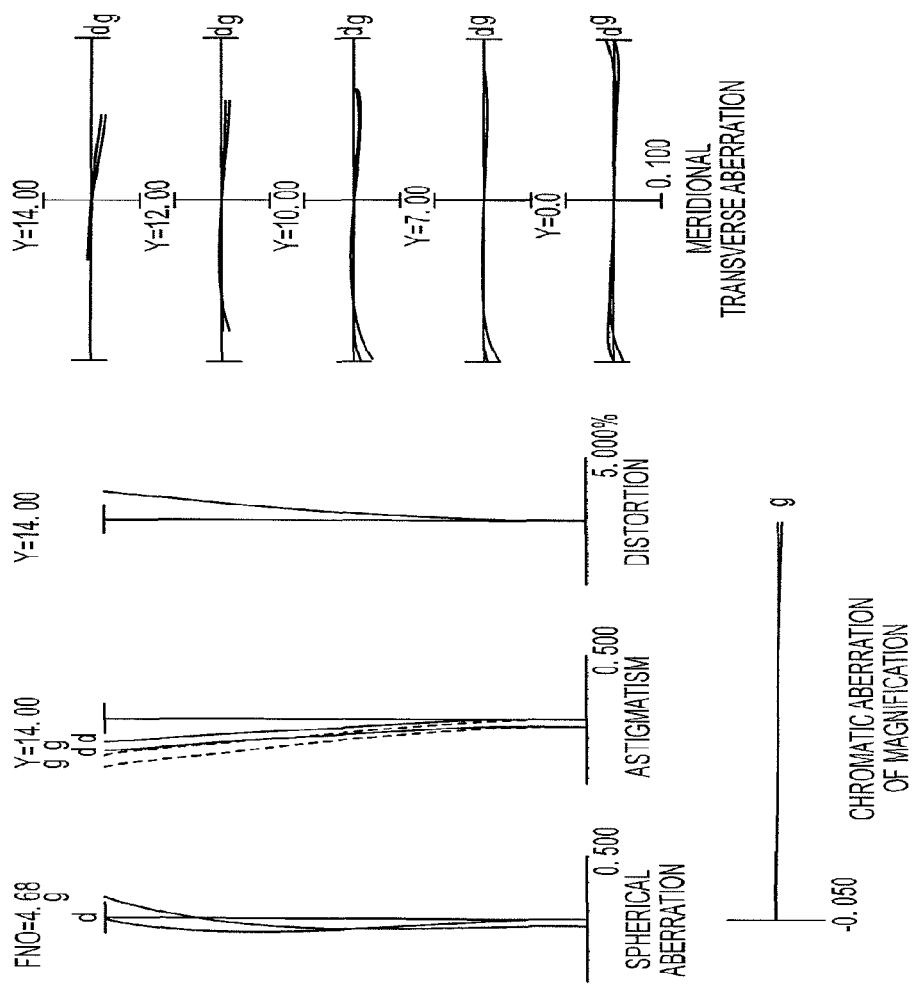
FIG. 3 is aberration diagrams in the infinity in-focus state in an intermediate focal length state of the first example.
Figure 4A:
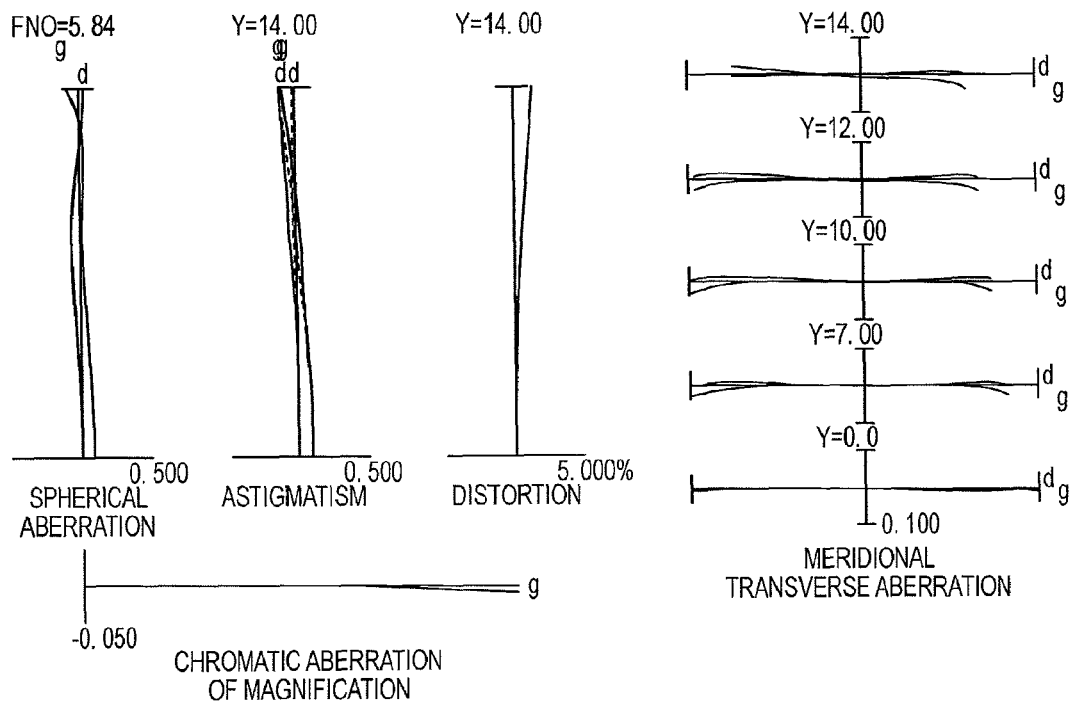
FIG. 4A is various aberration diagrams in the infinity in-focus state of the first example, which are those in the telephoto end state.
Figure 4B:
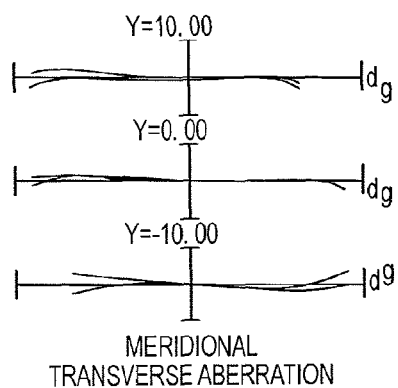
FIG. 4B is various aberration diagrams in the infinity in-focus state of the first example, which are meridional transverse aberration diagrams with shake compensation for rotational shake of 0.60° in the infinity photography state in the telephoto end state.

FIG. 2A shows aberration diagrams in the infinity in-focus state in the wide-angle end state of the first example, FIG. 3 aberration diagrams in the infinity in-focus state in the intermediate focal length state, and FIG. 4A aberration diagrams in the infinity in-focus state in the telephoto end state. FIG. 2B shows meridional transverse aberration diagrams with shake compensation for the rotational shake of 1.50° in the infinity photography state in the wide-angle end state of the first example, and FIG. 4B meridional transverse aberration diagrams with shake compensation for the rotational shake of 0.60° in the infinity photography state in the telephoto end state of the first example.

In each aberration diagram, FNO represents the F number, Y the image height, d the d line (λ=587.6 nm), and g the g line (λ=435.6 nm). In the aberration diagrams showing astigmatism, each solid line indicates a sagittal image surface and each dashed line a meridional image surface. This definition of aberration diagrams also applies to the examples hereinafter. It is clearly seen from the aberration diagrams that the zoom lens system ZL1 of the first example is well corrected for various aberrations in each of the focal length states from the wide-angle end state to the telephoto end state and has excellent imaging performance.

Second Example

Figure 5:
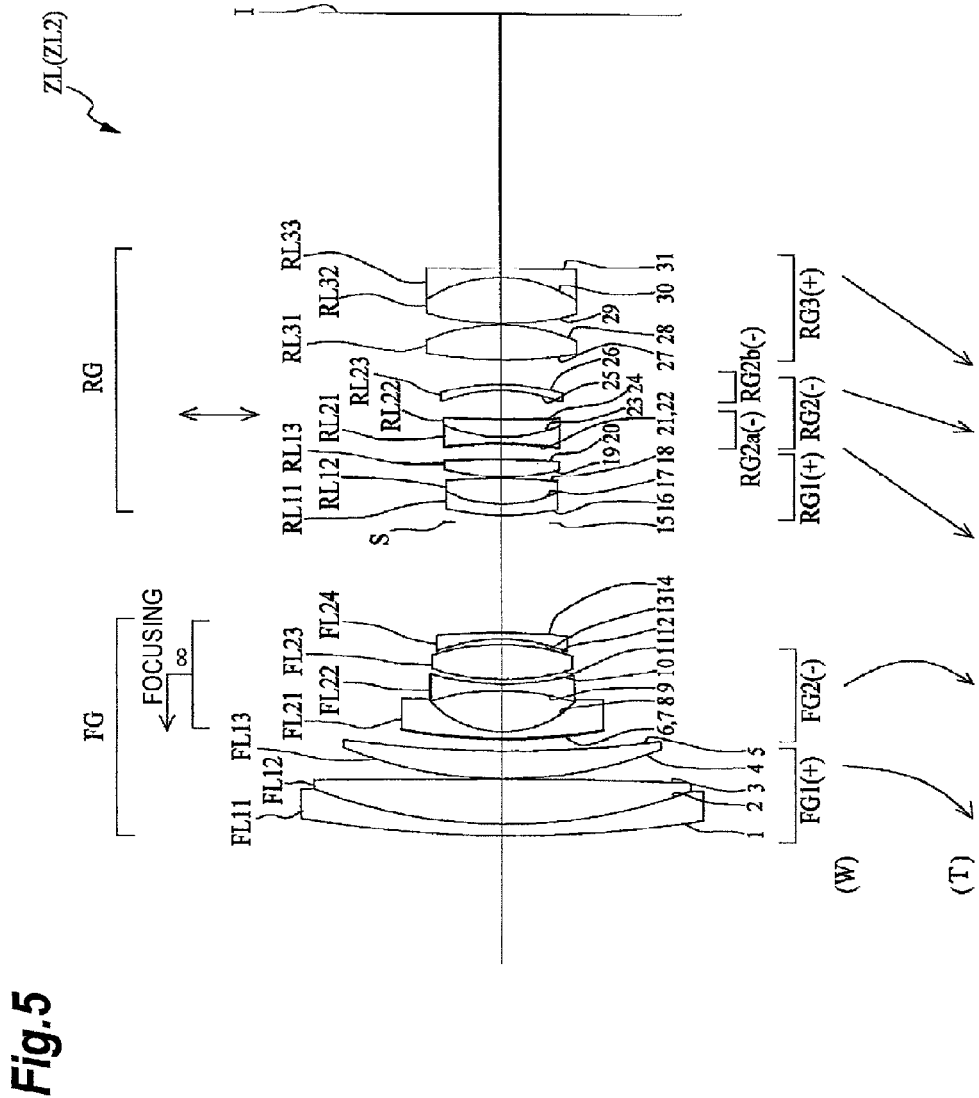
FIG. 5 is a sectional view showing a configuration of a zoom lens system according to the second example.

FIG. 5 is a drawing showing the configuration of the zoom lens system ZL2 according to the second example. This zoom lens system ZL2 of FIG. 5 is composed of the following units arranged in order from the object side: a front partial lens unit FG1 having a positive refracting power; a rear partial lens unit FG2 having a negative refracting power; a first lens unit RG1 having a positive refracting power; a 2a partial lens unit RG2a having a negative refracting power; a 2b partial lens unit RG2b having a negative refracting power; and a third lens unit RG3 having a positive refracting power. This zoom lens system ZL2 is configured as follows: the spaces between the lens units vary during change in the lens position state from the wide-angle end state to the telephoto end state in such a manner that the air space between the front partial lens unit FG1 and the rear partial lens unit FG2 varies, that the air space between the rear partial lens unit FG2 and the first lens unit RG1 decreases, that the air space between the first lens unit RG1 and the 2a partial lens unit RG2a increases from d12w to d12t, and that the air space between the 2b partial lens unit RG2b and the third lens unit RG3 decreases from d23w to d23t; the 2a partial lens unit RG2a is moved so as to have a component in a direction orthogonal to the optical axis, thereby effecting correction for the image position with occurrence of camera shake.

The front partial lens unit FG1 is composed of the following lenses arranged in order from the object side: a cemented lens of a negative meniscus lens FL11 with a convex surface on the object side and a biconvex lens FL12; and a positive meniscus lens FL13 with a convex surface on the object side. The rear partial lens unit FG2 is composed of the following lenses arranged in order from the object side: a negative meniscus lens FL21 with a convex surface on the object side; a biconcave lens FL22; a biconvex lens FL23; and a negative meniscus lens FL24 with a concave surface on the object side; the negative meniscus lens FL21 located nearest to the object side in the rear partial lens unit FG2 is a composite aspherical lens in which an aspherical surface is formed by laying a resin layer on the object-side lens surface.

The first lens unit RG1 is composed of the following lenses arranged in order from the object side: a cemented lens of a negative meniscus lens RL11 with a convex surface on the object side and a biconvex lens RL12; and a biconvex lens RL13. The 2a partial lens unit RG2a is composed of a cemented lens of a biconcave lens RL21 and a positive meniscus lens RL22 with a convex surface on the object side arranged in order from the object side; the biconcave lens RL21 located nearest to the object side in the 2a partial lens unit RG2a is a composite aspherical lens in which an aspherical surface is formed by laying a resin layer on the object-side lens surface. The 2b partial lens unit RG2b is composed of a negative meniscus lens RL23 with a concave surface on the object side. The third lens unit RG3 is composed of the following lenses arranged in order from the object side: a biconvex lens RL31; and a cemented lens of a biconvex lens RL32 and a negative meniscus lens RL33 with a concave surface on the object side; the negative meniscus lens RL33 located nearest to the image side in the third lens unit RG3 is a glass mold type aspherical lens in which the image-side lens surface is of an aspherical shape.

The aperture stop S is located between the rear partial lens unit FG2 and the first lens unit RG1 and moves together with the first lens unit RG1 during the zooming from the wide-angle end state to the telephoto end state. Focusing from a far range to a near range is implemented by moving the rear partial lens unit FG2 toward the object side.

Since the anti-vibration compensation factor is 1.09 and the focal length is 18.4 (mm) in the wide-angle end state in the second example, the movement amount of the 2a partial lens unit RG2a for compensation for the rotational deviation of 1.50° is 0.44 (mm). Since the anti-vibration compensation factor is 1.81 and the focal length is 102.5 (mm) in the telephoto end state in the second example, the movement amount of the 2a partial lens unit RG2a for compensation for the rotational deviation of 0.60° is 0.59 (mm).

Table 5 below provides values of specifications in the second example.

TABLE 5

| s | r | d | ν | n |
|---|---|---|---|---|
| 1 | 141.9672 | 1.8000 | 23.78 | 1.846660 |
| 2 | 59.7282 | 7.1441 | 63.88 | 1.612832 |
| 3 | −804.2555 | 0.1000 | | |
| 4 | 48.3636 | 4.4150 | 49.99 | 1.753624 |
| 5 | 134.2879 | (d1) | | |
| *6 | 82.4998 | 0.2000 | 38.09 | 1.553890 |
| 7 | 67.3309 | 1.0000 | 50.68 | 1.765402 |
| 8 | 12.0115 | 6.3636 | | |
| 9 | −27.7455 | 1.0000 | 37.22 | 1.832009 |
| 10 | 30.1271 | 0.7433 | | |
| 11 | 27.3964 | 5.4311 | 23.01 | 1.848138 |
| 12 | −24.9508 | 0.8224 | | |
| 13 | −20.1588 | 1.0028 | 37.28 | 1.831988 |
| 14 | −77.9331 | (d2) | | |
| 15 | 0.0000 | 1.1000 | | |
| 16 | 25.6704 | 1.7500 | 23.78 | 1.846660 |
| 17 | 14.9708 | 4.0262 | 53.27 | 1.519000 |
| 18 | −77.3730 | 0.2000 | | |
| 19 | 26.5715 | 2.6614 | 80.31 | 1.507189 |
| 20 | −108.7086 | (d3) | | |
| *21 | −48.1707 | 0.1500 | 38.09 | 1.553890 |
| 22 | −50.0223 | 1.0000 | 37.16 | 1.834000 |
| 23 | 16.6138 | 2.8272 | 25.43 | 1.805181 |
| 24 | 142.9395 | 4.6000 | | |

TABLE 5-continued

| | | | | |
|---|---|---|---|---|
| 25 | −17.7429 | 1.0000 | 54.65 | 1.729242 |
| 26 | −23.9790 | (d4) | | |
| 27 | 49.0756 | 5.5104 | 66.05 | 1.494951 |
| 28 | −20.6592 | 0.2115 | | |
| 29 | 32.8049 | 7.1815 | 70.41 | 1.487490 |
| 30 | −15.5785 | 1.4000 | 40.78 | 1.806100 |
| *31 | −656.8808 | (Bf) | | |

| | WE | MFL | TE |
|---|---|---|---|
| f = | 18.4~ | 55.0~ | 102.5 |
| FNO = | 3.6~ | 5.1~ | 5.8 |
| ω = | 38.7~ | 13.9~ | 7.6 |
| IH = | 14.0~ | 14.0~ | 14.0 |
| LLS = | 128.696~ | 160.617~ | 179.982 |
| Bf = | 39.591~ | 61.928~ | 74.550 |

[Focal Lengths of Respective Lens Units]

| LU | SS | FL |
|---|---|---|
| FG1 | 1 | 77.537 |
| FG2 | 6 | −12.500 |
| RG1 | 15 | 25.028 |
| RG2 | 21 | −27.950 |
| RG3 | 27 | 29.989 |

[Focal Lengths of Front Lens Group FG and Rear Lens Group RG]

| LG | SS | WE | MFL | TE |
|---|---|---|---|---|
| FG | 1 | −17.198 | −28.191 | −42.380 |
| RG | 15 | 29.655 | 29.105 | 28.925 |

In the second example, each lens surface of the sixth surface, the twenty first surface, and the thirty first surface is formed in an aspherical shape. Table 6 below provides data of the aspherical surfaces, i.e., values of the conic constant κ and the aspherical constants A4-A10 thereof.

TABLE 6

| | κ | A4 | A6 | A8 | A10 |
|---|---|---|---|---|---|
| 6th surface | 14.0947 | 1.46960E−05 | −6.48040E−08 | 1.01710E−10 | −3.11160E−14 |
| 21st surface | 0.9876 | 1.37770E−05 | −2.43220E−08 | 0.00000E+00 | 0.00000E+00 |
| 31st surface | 674.6493 | 1.01750E−05 | −3.17940E−08 | 4.90920E−11 | −9.15600E−13 |

In the second example, the following spaces vary during zooming: axial air space d1 between the front partial lens unit FG1 and the rear partial lens unit FG2; axial air space d2 between the rear partial lens unit FG2 and the first lens unit RG1; axial air space d3 between the first lens unit RG1 and the second lens unit RG2; axial air space d4 between the second lens unit RG2 and the third lens unit RG3. Table 7 below provides the varying spaces at respective focal lengths in the wide-angle end state, in an intermediate focal length state, and in the telephoto end state.

TABLE 7

| | WE | MFL | TE |
|---|---|---|---|
| d1 | 1.805 | 23.781 | 35.292 |
| d2 | 17.359 | 4.967 | 0.200 |
| d3 | 2.400 | 4.774 | 5.300 |
| d4 | 3.900 | 1.526 | 1.000 |

Table 8 below shows values corresponding to the respective condition expressions in this second example.

TABLE 8

| |
|---|
| (1)(d12t − d12w)/Bfw = 0.073 |
| (2)(d23w − d23t)/Bfw = 0.073 |
| (3)(d12w/d13w) = 0.151 |
| (4)(d23t/d13t) = 0.063 |
| (5)|Δ × 1|/Bfw = 0.883 |
| (6)(−f2)/Bfw = 0.706 |
| (7)fR2a/fR2b = 0.403 |
| (8)Rs/(−f2) = 0.594 |
| (9)Np − Nn = −0.029 |
| (10)νn − νp = 11.730 |

Table 8a below shows values corresponding to the respective condition expressions in this second example.

TABLE 8a

| |
|---|
| (1)(d12t − d12w)/BL = 0.047 |
| (2)(d23w − d23t)/BL = 0.047 |
| (3)(d12w/d13w) = 0.151 |
| (4)(d23t/d13t) = 0.063 |
| (5)|Δ × 1|/BL = 0.570 |
| (6)(−f2)/BL = 0.455 |
| (7)fR2a/fR2b = 0.403 |
| (8)Rs/(−f2) = 0.594 |
| (9)Np − Nn = −0.029 |
| (10)νn − νp = 11.730 |

Figure 6A:
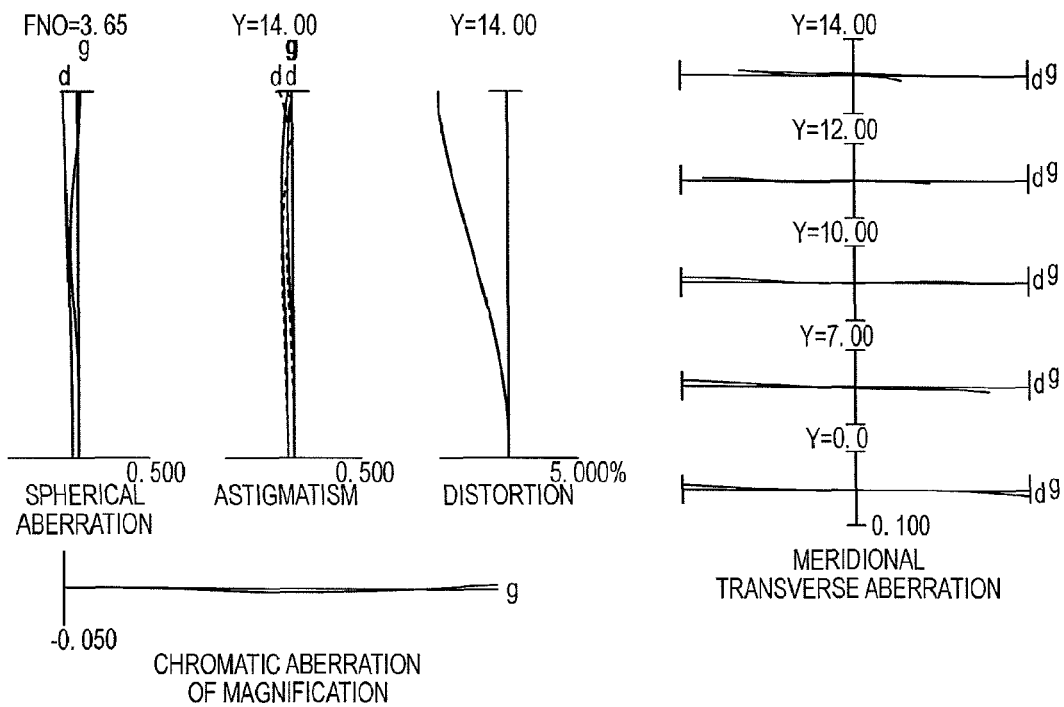
FIG. 6A is various aberration diagrams in the infinity in-focus state of the second example, which are those in the wide-angle end state.
Figure 6B:
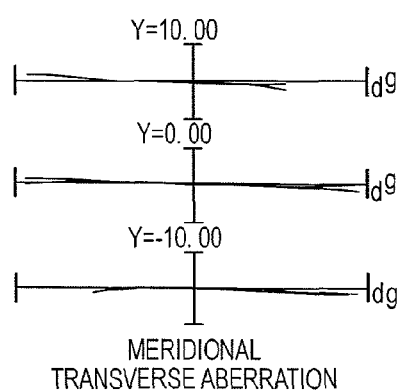
FIG. 6B is various aberration diagrams in the infinity in-focus state of the second example, which are meridional transverse aberration diagrams with shake compensation for rotational shake of 1.50° in the infinity photography state in the wide-angle end state.
Figure 7:
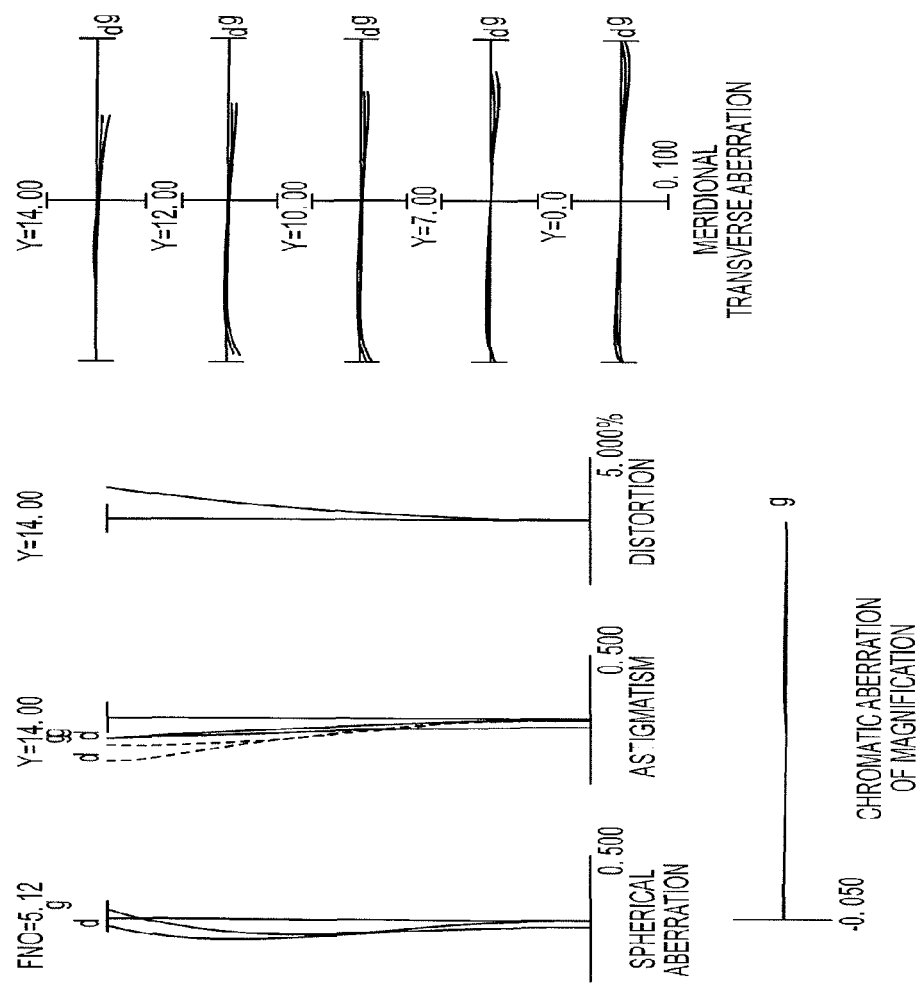
FIG. 7 is aberration diagrams in the infinity in-focus state in an intermediate focal length state of the second example.
Figure 8A:
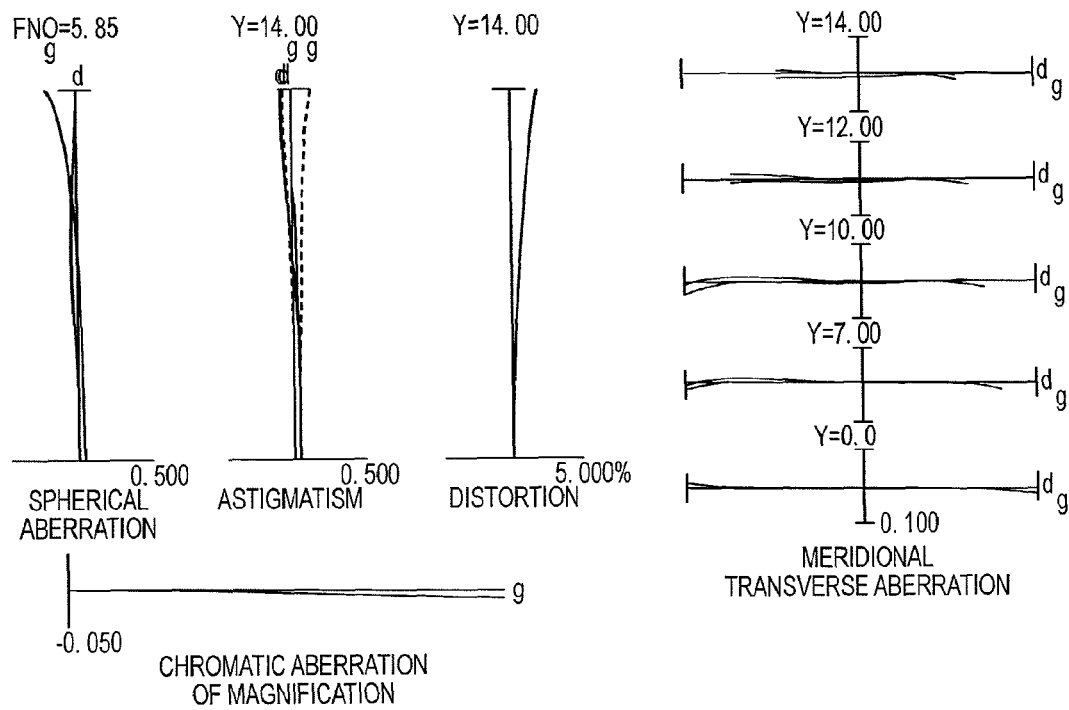
FIG. 8A is various aberration diagrams in the infinity in-focus state of the second example, which are those in the telephoto end state.
Figure 8B:
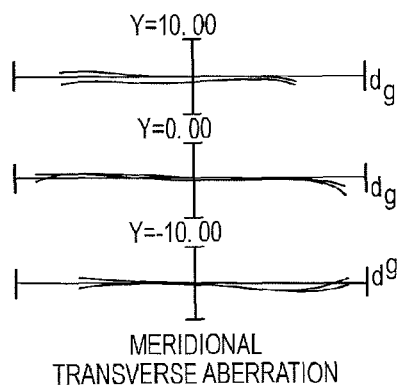
FIG. 8B is various aberration diagrams in the infinity in-focus state of the second example, which are meridional transverse aberration diagrams with shake compensation for rotational shake of 0.60° in the infinity photography state in the telephoto end state.

FIG. 6A shows aberration diagrams in the infinity in-focus state in the wide-angle end state of the second example, FIG. 7 aberration diagrams in the infinity in-focus state in the intermediate focal length state, and FIG. 8A aberration diagrams in the infinity in-focus state in the telephoto end state. FIG. 6B shows meridional transverse aberration diagrams with shake compensation for the rotational shake of 1.50° in the infinity photography state in the wide-angle end state of the second example, and FIG. 8B meridional transverse aberration diagrams with shake compensation for the rotational shake of 0.60° in the infinity photography state in the telephoto end state of the second example. It is clearly seen from the aberration diagrams that the zoom lens system ZL2 of the second example is well corrected for various aberrations in each of the focal length states from the wide-angle end state to the telephoto end state and has excellent imaging performance.

Third Example

Figure 9:
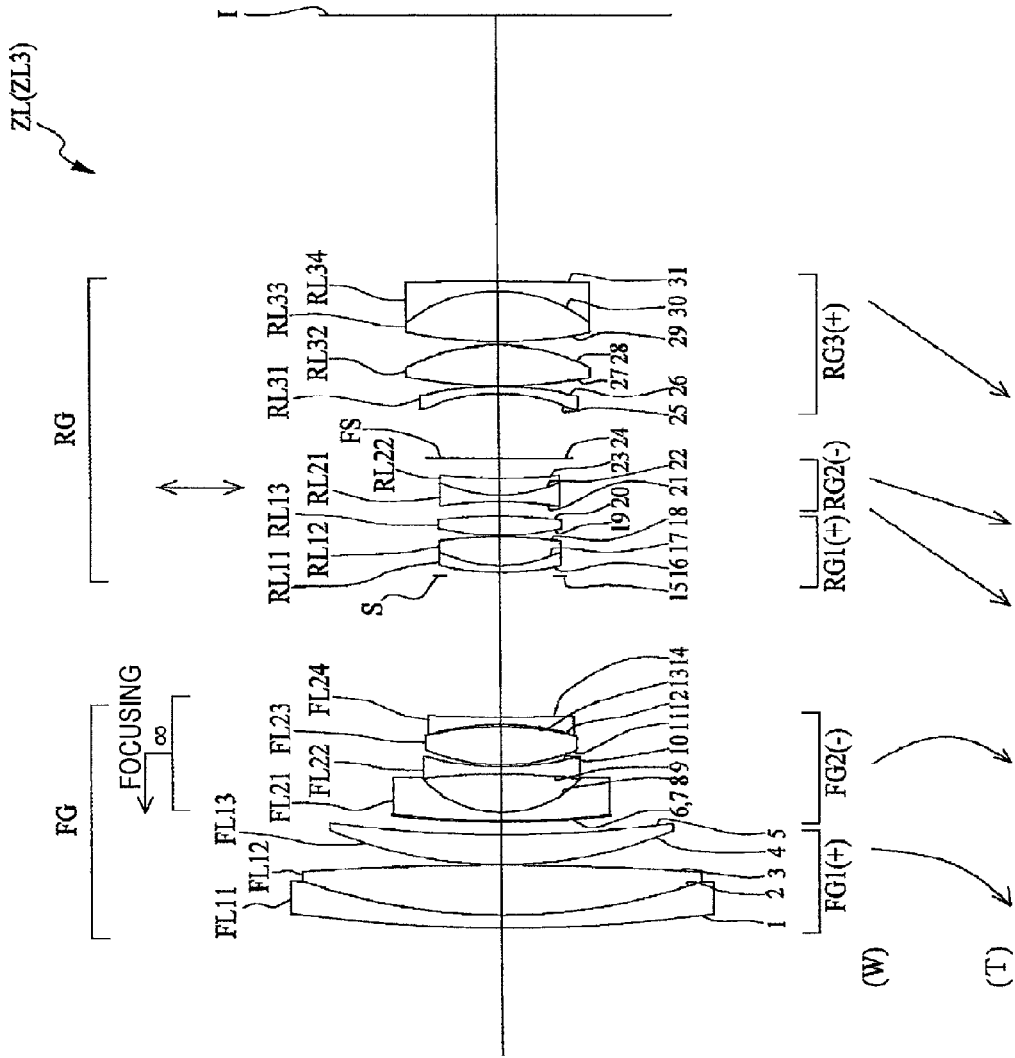
FIG. 9 is a sectional view showing a configuration of a zoom lens system according to the third example.

FIG. 9 is a drawing showing the configuration of the zoom lens system ZL3 according to the third example. This zoom lens system ZL3 of FIG. 9 is composed of the following units arranged in order from the object side: a front partial lens unit FG1 having a positive refracting power; a rear partial lens unit FG2 having a negative refracting power; a first lens unit RG1 having a positive refracting power; a second lens unit RG2 having a negative refracting power; and a third lens unit RG3 having a positive refracting power. This zoom lens system ZL3 is configured as follows: the spaces between the lens units vary during change in the lens position state from the wide-angle end state to the telephoto end state in such a manner that the air space between the front partial lens unit FG1 and the rear partial lens unit FG2 increases, that the air space between the rear partial lens unit FG2 and the first lens unit RG1 decreases, that the air space between the first lens unit RG1 and the second lens unit RG2 increases from d12w to d12t, and that the air space between the second lens unit RG2 and the third lens unit RG3 decreases from d23w to d23t; the second lens unit RG2 is moved so as to have a component in a direction orthogonal to the optical axis, thereby effecting correction for the image position with occurrence of camera shake.

The front partial lens unit FG1 is composed of the following lenses arranged in order from the object side: a cemented lens of a negative meniscus lens FL11 with a convex surface on the object side and a biconvex lens FL12; and a positive meniscus lens FL13 with a convex surface on the object side. The rear partial lens unit FG2 is composed of the following lenses arranged in order from the object side: a negative meniscus lens FL21 with a convex surface on the object side; a biconcave lens FL22; a biconvex lens FL23; and a biconcave lens FL24; the negative meniscus lens FL21 located nearest to the object side in the rear partial lens unit FG2 is a composite aspherical lens in which an aspherical surface is formed by laying a resin layer on the object-side lens surface.

The first lens unit RG1 is composed of the following lenses arranged in order from the object side: a cemented lens of a negative meniscus lens RL11 with a convex surface on the object side and a biconvex lens RL12; and a biconvex lens RL13. The second lens unit RG2 is composed of a cemented lens of a biconcave lens RL21 and a positive meniscus lens RL22 with a convex surface on the object side arranged in order from the object side; the biconcave lens RL21 located nearest to the object side in the second lens unit RG2 is a glass mold type aspherical lens in which the object-side lens surface is formed in an aspherical shape. The third lens unit RG3 is composed of the following lenses arranged in order from the object side: a negative meniscus lens RL31 with a concave surface on the object side; a biconvex lens RL32; and a cemented lens of a biconvex lens RL33 and a negative meniscus lens RL34 with a concave surface on the object side; the biconvex lens RL32 at the second position from the object side in the third lens unit RG3 is a glass mold type aspherical lens in which the image-side lens surface is of an aspherical shape.

The aperture stop S is located between the rear partial lens unit FG2 and the first lens unit RG1 and moves together with the first lens unit RG1 during the zooming from the wide-angle end state to the telephoto end state. A flare stop FS is located between the second lens unit RG2 and the third lens unit RG3 and moves together with the second lens unit RG2 during the zooming from the wide-angle end state to the telephoto end state. Focusing from a far range to a near range is implemented by moving the rear partial lens unit FG2 toward the object side.

Since the anti-vibration compensation factor is 1.36 and the focal length is 18.4 (mm) in the wide-angle end state in the third example, the movement amount of the second lens unit RG2 for compensation for the rotational deviation of 1.50° is 0.35 (mm). Since the anti-vibration compensation factor is 2.07 and the focal length is 102.5 (mm) in the telephoto end state in the third example, the movement amount of the second lens unit RG2 for compensation for the rotational deviation of 0.60° is 0.52 (mm).

Table 9 below provides values of specifications in the third example.

In the third example, each lens surface of the sixth surface, the twenty first surface, and the twenty eighth surface is formed in an aspherical shape. Table 10 below provides data of the aspherical surfaces, i.e., values of the conic constant κ and the aspherical constants A4-A10 thereof.

TABLE 9

| s | r | d | ν | n |
|---|---|---|---|---|
| 1 | 168.5241 | 1.8000 | 23.78 | 1.846660 |
| 2 | 63.9191 | 7.2344 | 60.67 | 1.603110 |
| 3 | −300.0632 | 0.1000 | | |
| 4 | 46.7411 | 4.4000 | 55.52 | 1.696800 |
| 5 | 136.3067 | (d1) | | |
| *6 | 103.2719 | 0.2000 | 38.09 | 1.553890 |
| 7 | 90.0000 | 1.2500 | 42.72 | 1.834810 |
| 8 | 11.9191 | 5.6078 | | |
| 9 | −56.6965 | 1.0000 | 42.72 | 1.834810 |
| 10 | 30.5436 | 0.3053 | | |
| 11 | 21.3769 | 5.4731 | 23.78 | 1.846660 |
| 12 | −30.9544 | 0.3000 | | |
| 13 | −25.6945 | 1.0000 | 42.72 | 1.834810 |
| 14 | 127.3435 | (d2) | | |
| 15 | 0.0000 | 0.4000 | | |
| 16 | 26.9094 | 1.0000 | 25.43 | 1.805180 |
| 17 | 14.3402 | 4.1000 | 64.11 | 1.516800 |
| 18 | −54.4001 | 0.2000 | | |
| 19 | 28.1865 | 2.7770 | 82.56 | 1.497820 |
| 20 | −48.6011 | (d3) | | |
| *21 | −42.8743 | 1.0000 | 40.94 | 1.806100 |
| 22 | 15.6173 | 2.4000 | 23.78 | 1.846660 |
| 23 | 61.0904 | 3.0000 | | 1.000000 |
| 24 | 0.0000 | (d4) | | |
| 25 | −18.2298 | 1.0000 | 70.40 | 1.487490 |
| 26 | −33.1351 | 0.1000 | | |
| 27 | 53.1321 | 5.8599 | 61.18 | 1.589130 |
| *28 | −19.8760 | 0.5000 | | |
| 29 | 49.8623 | 7.2500 | 70.44 | 1.487490 |
| 30 | −15.8905 | 1.4000 | 34.96 | 1.801000 |
| 31 | −831.5220 | (Bf) | | |

| | WE | MFL | TE |
|---|---|---|---|
| f = | 18.4~ | 54.0~ | 102.5 |
| FNO = | 3.7~ | 5.1~ | 5.9 |
| ω = | 38.6~ | 14.0~ | 7.6 |
| IH = | 14.0~ | 14.0~ | 14.0 |
| LLS = | 131.999~ | 158.787~ | 176.078 |
| Bf = | 38.400~ | 56.889~ | 67.200 |

[Focal Lengths of Respective Lens Units]

| LU | SS | FL |
|---|---|---|
| FG1 | 1 | 76.048 |
| FG2 | 6 | −12.255 |
| RG1 | 15 | 22.167 |
| RG2 | 21 | −32.817 |
| RG3 | 25 | 41.054 |

[Focal Lengths of Front Lens Group FG and Rear Lens Group RG]

| LG | SS | WE | MFL | TE |
|---|---|---|---|---|
| FG | 1 | −16.844 | −27.345 | −41.734 |
| RG | 15 | 30.713 | 29.022 | 28.174 |

TABLE 10

|  | κ | A4 | A6 | A8 | A10 |
|---|---|---|---|---|---|
| 6th surface | 24.2949 | 2.55426E−06 | −2.76351E−08 | 2.37730E−11 | −3.74852E−14 |
| 21st surface | −4.6845 | −3.66407E−06 | 2.99667E−08 | 0.00000E+00 | 0.00000E+00 |
| 28th surface | 0.9199 | 1.18820E−05 | 1.03377E−08 | 1.69107E−11 | −4.18115E−13 |

In the third example, the following spaces vary during zooming: axial air space d1 between the front partial lens unit FG1 and the rear partial lens unit FG2; axial air space d2 between the rear partial lens unit FG2 and the first lens unit RG1; axial air space d3 between the first lens unit RG1 and the second lens unit RG2; axial air space d4 between the second lens unit RG2 and the third lens unit RG3. Table 11 below provides the varying spaces at respective focal lengths in the wide-angle end state, in an intermediate focal length state, and in the telephoto end state.

TABLE 11

|  | WE | MFL | TE |
|---|---|---|---|
| d1 | 1.790 | 23.037 | 34.787 |
| d2 | 20.718 | 7.770 | 3.000 |
| d3 | 2.032 | 6.185 | 7.782 |
| d4 | 9.402 | 5.249 | 3.652 |

Table 12 below shows values corresponding to the respective condition expressions in this third example. In this third example, the 2a partial lens unit RG2a in Condition expressions (8)-(10) corresponds to the second lens unit RG2; Rs represents the radius of curvature of the cemented surfaces in the cemented lens of the second lens unit RG2; Np the refractive index of the positive meniscus lens in the second lens unit RG2 for the d line; Nn the refractive index of the biconcave lens in the second lens unit RG2 for the d line; νp the Abbe number of the positive meniscus lens in the second lens unit RG2; νn the Abbe number of the biconcave lens in the second lens unit RG2.

TABLE 12

(1)(d12t − d12w)/Bfw = 0.150
(2)(d23w − d23t)/Bfw = 0.150
(3)(d12w/d13w) = 0.114
(4)(d23t/d13t) = 0.205
(5)|Δ × 1|/Bfw = 0.750
(6)(−f2)/Bfw = 0.855
(7)fR2a/fR2b = (none)
(8)Rs/(−f2) = 0.476
(9)Np − Nn = 0.041
(10)νn − νp = 17.160

Table 12a below shows values corresponding to the respective condition expressions in this third example. In this third example, the 2a partial lens unit RG2a in Condition expressions (8)-(10) corresponds to the second lens unit RG2; Rs represents the radius of curvature of the cemented surfaces in the cemented lens in the second lens unit RG2; Np the refractive index of the positive meniscus lens in the second lens unit RG2 for the d line; Nn the refractive index of the biconcave lens in the second lens unit RG2 for the d line; νp the Abbe number of the positive meniscus lens in the second lens unit RG2; νn the Abbe number of the biconcave lens in the second lens unit RG2.

TABLE 12a (1)(d12t − d12w)/BL = 0.089
(2)(d23w − d23t)/BL = 0.089
(3)(d12w/d13w) = 0.114
(4)(d23t/d13t) = 0.205
(5)|Δ × 1|/BL = 0.448
(6)(−f2)/BL = 0.511
(7)fR2a/fR2b = (none)
(8)Rs/(−f2) = 0.476
(9)Np − Nn = 0.041
(10)νn − νp = 17.160

Figure 10A:
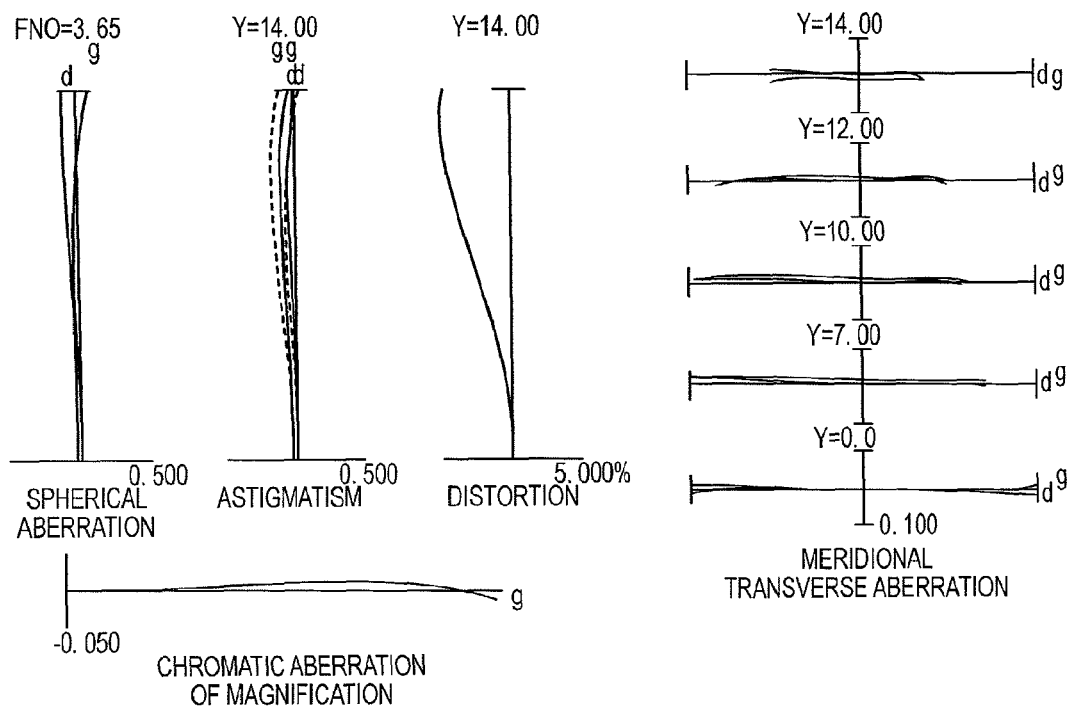
FIG. 10A is various aberration diagrams in the infinity in-focus state of the third example, which are those in the wide-angle end state.
Figure 10B:
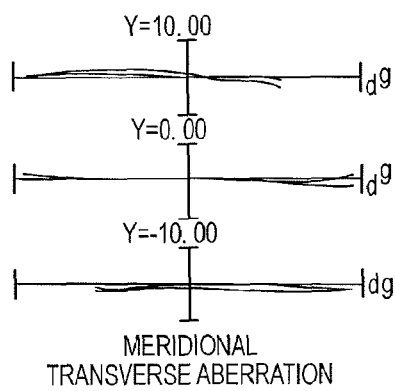
FIG. 10B is various aberration diagrams in the infinity in-focus state of the third example, which are meridional transverse aberration diagrams with shake compensation for rotational shake of 1.50° in the infinity photography state in the wide-angle end state.
Figure 12A:
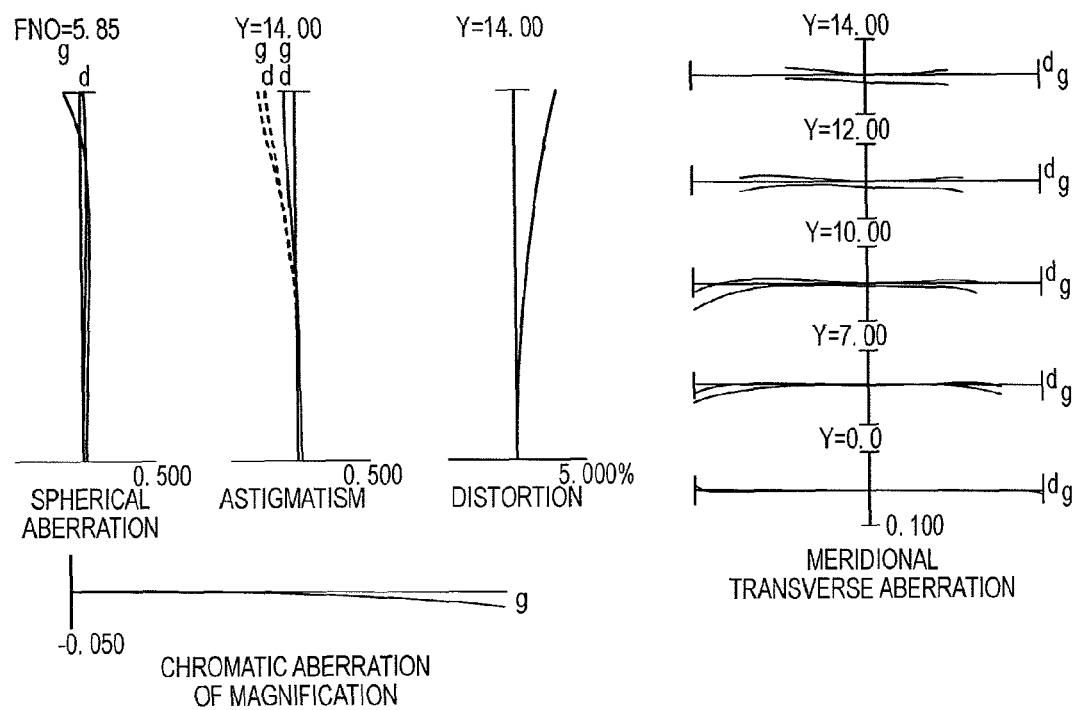
FIG. 12A is various aberration diagrams in the infinity in-focus state of the third example, which are those in the telephoto end state.
Figure 12B:
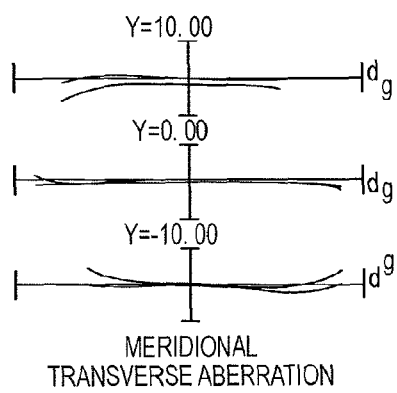
FIG. 12B is various aberration diagrams in the infinity in-focus state of the third example, which are meridional transverse aberration diagrams with shake compensation for rotational shake of 0.60° in the infinity photography state in the telephoto end state.

FIG. 10A shows aberration diagrams in the infinity in-focus state in the wide-angle end state of the third example, FIG. 11 aberration diagrams in the infinity in-focus state in the intermediate focal length state, and FIG. 12A aberration diagrams in the infinity in-focus state in the telephoto end state. FIG. 10B shows meridional transverse aberration diagrams with shake compensation for the rotational shake of 1.50° in the infinity photography state in the wide-angle end state of the third example, and FIG. 12B meridional transverse aberration diagrams with shake compensation for the rotational shake of 0.60° in the infinity photography state in the telephoto end state of the third example. It is clearly seen from the aberration diagrams that the zoom lens system ZL3 of the third example is well corrected for various aberrations in each of the focal length states from the wide-angle end state to the telephoto end state and has excellent imaging performance.

Fourth Example

Figure 13:
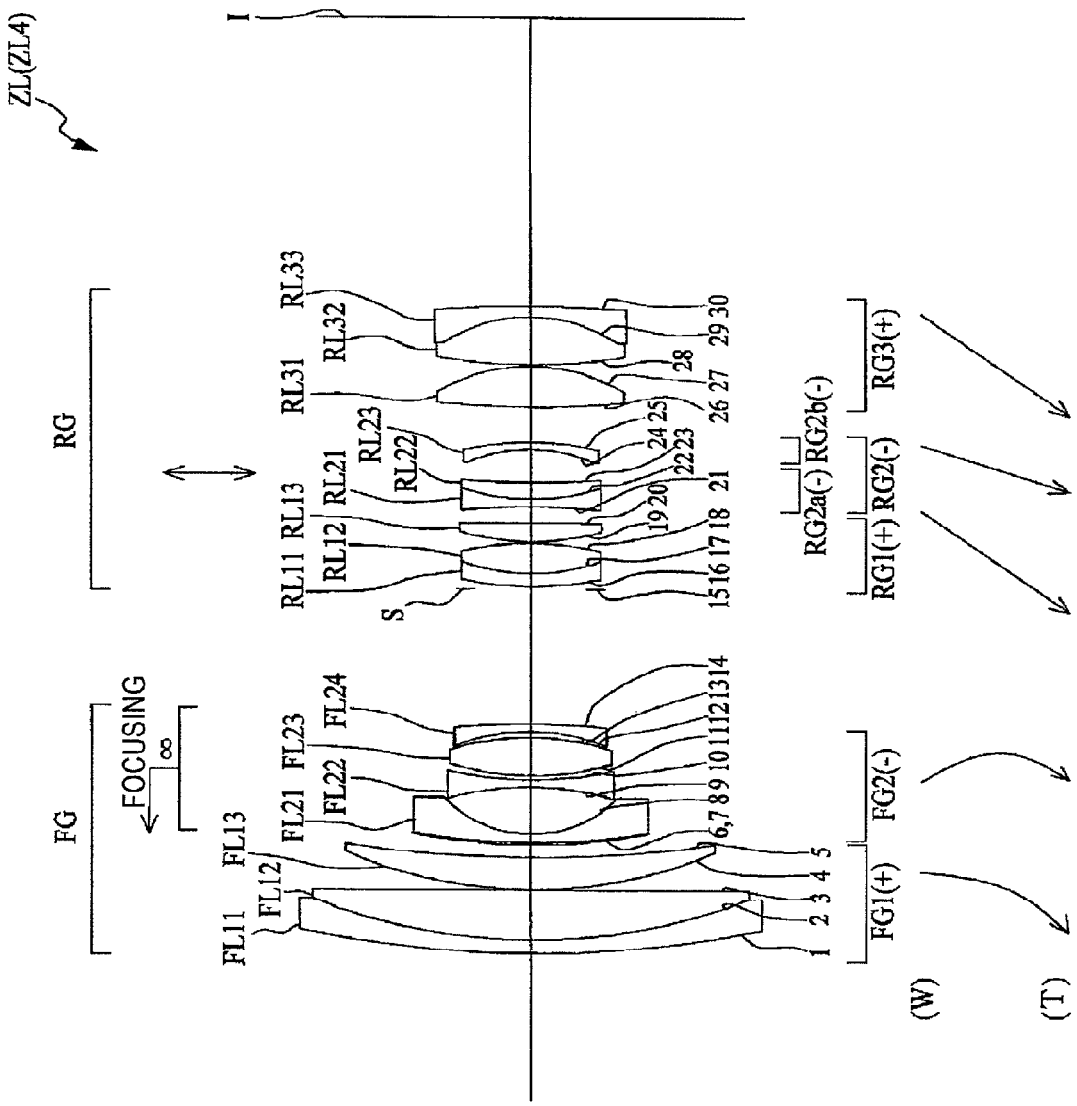
FIG. 13 is a sectional view showing a configuration of a zoom lens system according to the fourth example.

FIG. 13 is a drawing showing the configuration of the zoom lens system ZL4 according to the fourth example. This zoom lens system ZL4 of FIG. 13 is composed of the following units arranged in order from the object side: a front partial lens unit FG1 having a positive refracting power; a rear partial lens unit FG2 having a negative refracting power; a first lens unit RG1 having a positive refracting power; a 2a partial lens unit RG2a having a negative refracting power; a 2b partial lens unit RG2b having a negative refracting power; and a third lens unit RG3 having a positive refracting power. This zoom lens system ZL4 is configured as follows: the spaces between the lens units vary during change in the lens position state from the wide-angle end state to the telephoto end state in such a manner that the air space between the front partial lens unit FG1 and the rear partial lens unit FG2 varies, that the air space between the rear partial lens unit FG2 and the first lens unit RG1 decreases, that the air space between the first lens unit RG1 and the 2a partial lens unit RG2a increases from d12w to d12t, and that the air space between the 2b partial lens unit RG2b and the third lens unit RG3 decreases from d23w to d23t; the 2a partial lens unit RG2a is moved so as to have a component in a direction orthogonal to the optical axis, thereby effecting correction for the image position with occurrence of camera shake.

The front partial lens unit FG1 is composed of the following lenses arranged in order from the object side: a cemented lens of a negative meniscus lens FL11 with a convex surface on the object side and a positive meniscus lens FL12 with a convex surface on the object side; and a positive meniscus lens FL13 with a convex surface on the object side. The rear partial lens unit FG2 is composed of the following lenses arranged in order from the object side: a negative meniscus lens FL21 with a convex surface on the object side; a biconcave lens FL22; a biconvex lens FL23; and a negative meniscus lens FL24 with a concave surface on the object side; the negative meniscus lens FL21 located nearest to the object side in the rear partial lens unit FG2 is a composite aspherical lens in which an aspherical surface is formed by laying a resin layer on the object-side lens surface.

The first lens unit RG1 is composed of the following lenses arranged in order from the object side: a cemented lens of a negative meniscus lens RL11 with a convex surface on the object side and a biconvex lens RL12; and a biconvex lens RL13. The 2a partial lens unit RG2a is composed of a cemented lens of a biconcave lens RL21 and a positive meniscus lens RL22 with a convex surface on the object side arranged in order from the object side; the biconcave lens RL21 located nearest to the object side in the 2a partial lens unit RG2a is a glass mold type aspherical lens in which the object-side lens surface is of an aspherical shape. The 2b partial lens unit RG2b is composed of a negative meniscus lens RL23 with a concave surface on the object side. The third lens unit RG3 is composed of the following lenses arranged in order from the object side: a biconvex lens RL31; and a cemented lens of a biconvex lens RL32 and a negative meniscus lens RL33 with a concave surface on the object side; the biconvex lens RL31 located nearest to the object side in the third lens unit RG3 is a glass mold type aspherical lens in which the image-side lens surface is of an aspherical shape.

The aperture stop S is located between the rear partial lens unit FG2 and the first lens unit RG1 and moves together with the first lens unit RG1 during the zooming from the wide-angle end state to the telephoto end state. Focusing from a far range to a near range is implemented by moving the rear partial lens unit FG2 toward the object side.

Since the anti-vibration compensation factor is 0.96 and the focal length is 18.4 (mm) in the wide-angle end state in the fourth example, the movement amount of the 2a partial lens unit RG2a for compensation for the rotational deviation of 1.50° is 0.50 (mm). Since the anti-vibration compensation factor is 1.69 and the focal length is 131.2 (mm) in the telephoto end state in the fourth example, the movement amount of the 2a partial lens unit RG2a for compensation for the rotational deviation of 0.60° is 0.81 (mm).

Table 13 below provides values of specifications in the fourth example.

TABLE 13

| s | r | d | ν | n |
|---|---|---|---|---|
| 1 | 112.1569 | 1.8000 | 23.78 | 1.846660 |
| 2 | 58.9628 | 6.8193 | 65.36 | 1.603576 |
| 3 | 134933.2300 | 0.1000 | | |
| 4 | 46.6226 | 4.4150 | 58.17 | 1.656160 |
| 5 | 126.2737 | (d1) | | |
| *6 | 79.1072 | 0.2000 | 38.09 | 1.553890 |
| 7 | 65.0000 | 1.2500 | 41.28 | 1.833557 |
| 8 | 12.4412 | 6.3645 | | |
| 9 | −30.7007 | 1.0000 | 37.30 | 1.832041 |
| 10 | 37.1726 | 0.5656 | | |
| 11 | 28.6372 | 5.0654 | 21.89 | 1.851566 |
| 12 | −27.5478 | 0.8229 | | |
| 13 | −19.8405 | 1.0028 | 42.62 | 1.833884 |
| 14 | −83.9641 | (d2) | | |
| 15 | 0.0000 | 0.4000 | | |
| 16 | 33.4879 | 1.7500 | 23.78 | 1.846660 |
| 17 | 19.6805 | 4.1226 | 69.81 | 1.520350 |
| 18 | −30.3359 | 0.2000 | | |
| 19 | 24.3031 | 2.5692 | 82.50 | 1.498000 |
| 20 | −507.4183 | (d3) | | |
| *21 | −63.2689 | 1.0600 | 42.51 | 1.834032 |
| 22 | 21.8379 | 2.3208 | 23.80 | 1.846000 |
| 23 | 90.2702 | 4.6000 | | |
| 24 | −15.3335 | 1.0000 | 54.66 | 1.729157 |
| 25 | −27.1645 | (d4) | | |
| 26 | 97.9379 | 5.6102 | 63.18 | 1.536981 |
| *27 | −16.7260 | 0.2000 | | |
| 28 | 54.2066 | 6.4592 | 64.41 | 1.513811 |
| 29 | −15.9610 | 1.4000 | 35.86 | 1.837905 |
| 30 | −160.0000 | (Bf) | | |

| | WE | MFL | TE |
|---|---|---|---|
| f = | 18.4~ | 56.3~ | 131.2 |
| FNO = | 3.7~ | 5.1~ | 5.8 |
| ω = | 38.7~ | 13.7~ | 6.0 |
| IH = | 14.0~ | 14.0~ | 14.0 |
| LLS = | 127.748~ | 159.282~ | 185.685 |
| Bf = | 39.272~ | 60.150~ | 77.217 |

[Focal Lengths of Respective Lens Units]

| LU | SS | FL |
|---|---|---|
| FG1 | 1 | 80.846 |
| FG2 | 6 | −12.289 |
| RG1 | 15 | 21.900 |
| RG2 | 21 | −22.542 |
| RG3 | 26 | 29.108 |

[Focal Lengths of Front Lens Group FG and Rear Lens Group RG]

| LG | SS | WE | MFL | TE |
|---|---|---|---|---|
| FG | 1 | −16.892 | −27.528 | −47.980 |
| RG | 15 | 30.011 | 28.413 | 27.845 |

In the fourth example, each lens surface of the sixth surface, the twenty first surface, and the twenty seventh surface is formed in an aspherical shape. Table 14 below provides data of the aspherical surfaces, i.e., values of the conic constant κ and the aspherical constants A4-A10 thereof

TABLE 14

|  | κ | A4 | A6 | A8 | A10 |
|---|---|---|---|---|---|
| 6th surface | 24.8303 | 9.11840E−06 | −6.69300E−08 | 1.74540E−10 | −5.56370E−13 |
| 21st surface | −0.4549 | 4.72520E−06 | −8.61830E−09 | 0.00000E+00 | 0.00000E+00 |
| 27th surface | 0.3588 | −4.67110E−07 | −1.27860E−09 | −1.10550E−10 | −8.78330E−14 |

In the fourth example, the following spaces vary during zooming: axial air space d1 between the front partial lens unit FG1 and the rear partial lens unit FG2; axial air space d2 between the rear partial lens unit FG2 and the first lens unit RG1; axial air space d3 between the first lens unit RG1 and the second lens unit RG2; axial air space d4 between the second lens unit RG2 and the third lens unit RG3. Table 15 below provides the varying spaces at respective focal lengths in the wide-angle end state, in an intermediate focal length state, and in the telephoto end state.

TABLE 15

|  | WE | MFL | TE |
|---|---|---|---|
| d1 | 1.749 | 24.474 | 39.858 |
| d2 | 18.616 | 6.547 | 0.500 |
| d3 | 2.200 | 5.386 | 6.213 |
| d4 | 4.813 | 1.627 | 0.800 |

Table 16 below shows values corresponding to the respective condition expressions in this fourth example.

TABLE 16

(1)(d21t − d21w)/Bfw = 0.102
(2)(d23w − d23t)/Bfw = 0.102
(3)(d12w/d13w) = 0.138
(4)(d23t/d13t) = 0.050
(5)|Δ × 1|/Bfw = 0.966
(6)(−f2)/Bfw = 0.574
(7)fR2a/fR2b = 0.899
(8)Rs/(−f2) = 0.969
(9)Np − Nn = 0.012
(10)νn − νp = 18.710

Table 16a below shows values corresponding to the respective condition expressions in this fourth example.

TABLE 16a (1)(d21t − d21w)/BL = 0.064
(2)(d23w − d23t)/BL = 0.064
(3)(d12w/d13w) = 0.138
(4)(d23t/d13t) = 0.050
(5)|Δ × 1|/BL = 0.605
(6)(−f2)/BL = 0.360
(7)fR2a/fR2b = 0.899
(8)Rs/(−f2) = 0.969
(9)Np − Nn = 0.012
(10)νn − νp = 18.710

Figure 14A:
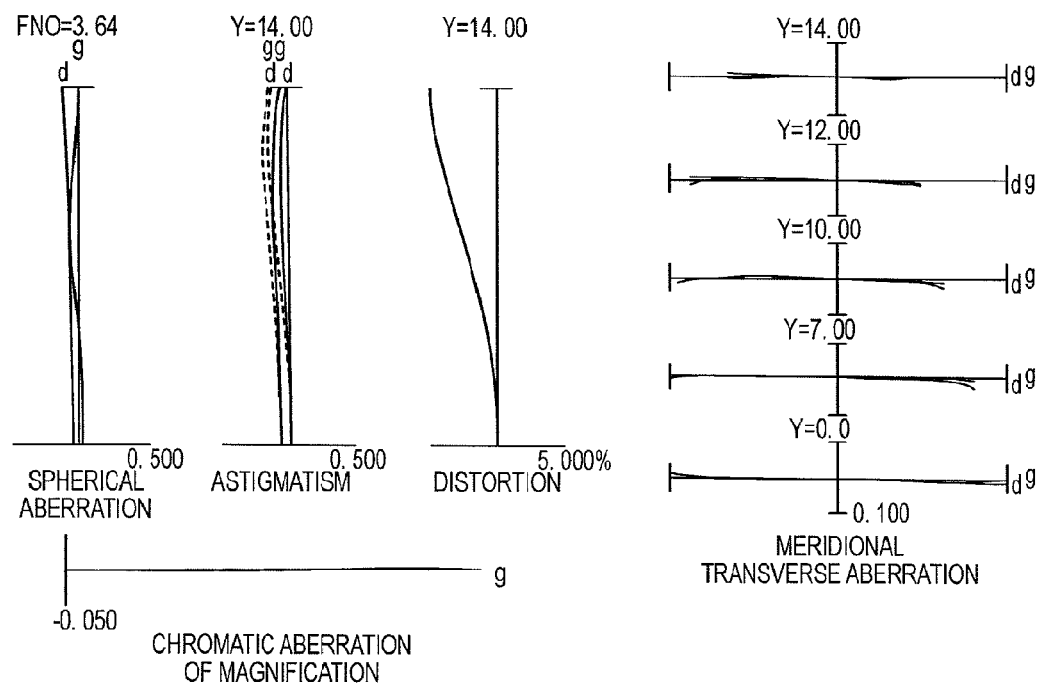
FIG. 14A is various aberration diagrams in the infinity in-focus state of the fourth example, which are those in the wide-angle end state.
Figure 14B:
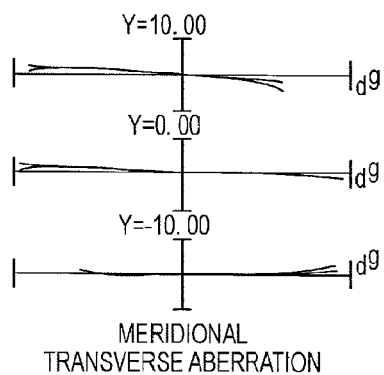
FIG. 14B is various aberration diagrams in the infinity in-focus state of the fourth example, which are meridional transverse aberration diagrams with shake compensation for rotational shake of 1.50° in the infinity photography state in the wide-angle end state.
Figure 15:
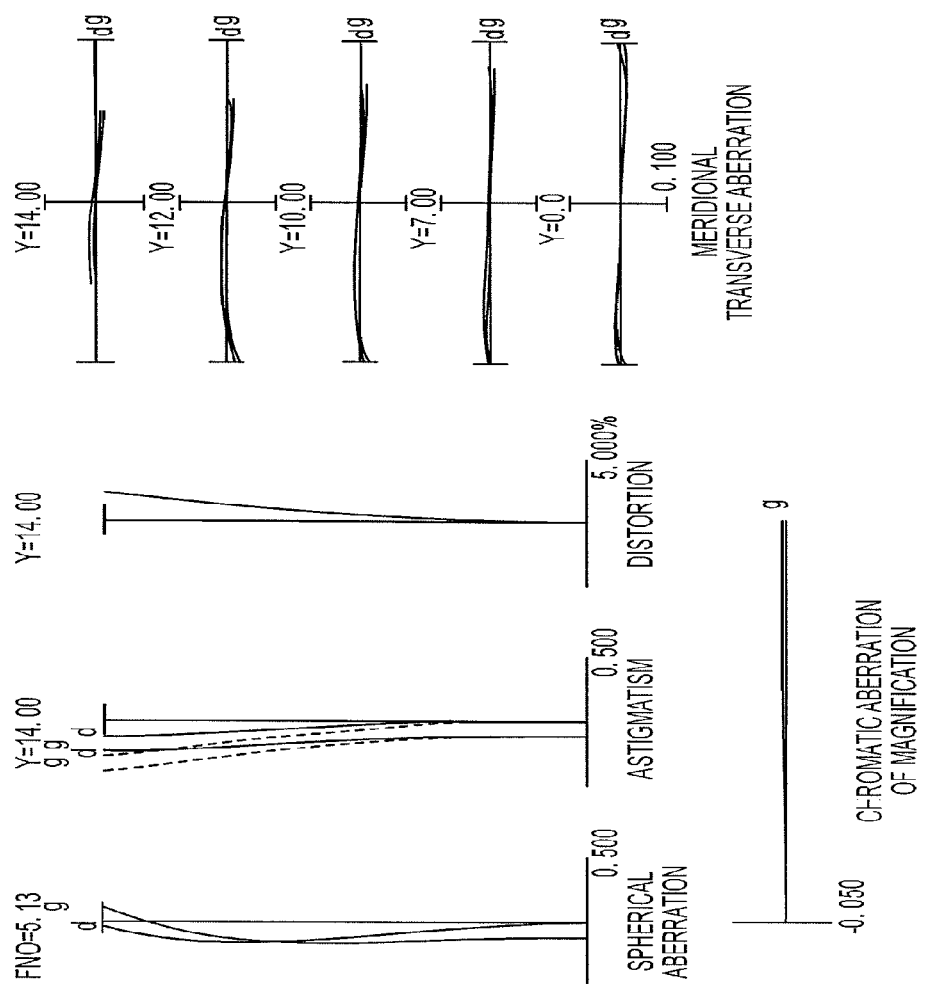
FIG. 15 is aberration diagrams in the infinity in-focus state in an intermediate focal length state of the fourth example.
Figure 16A:
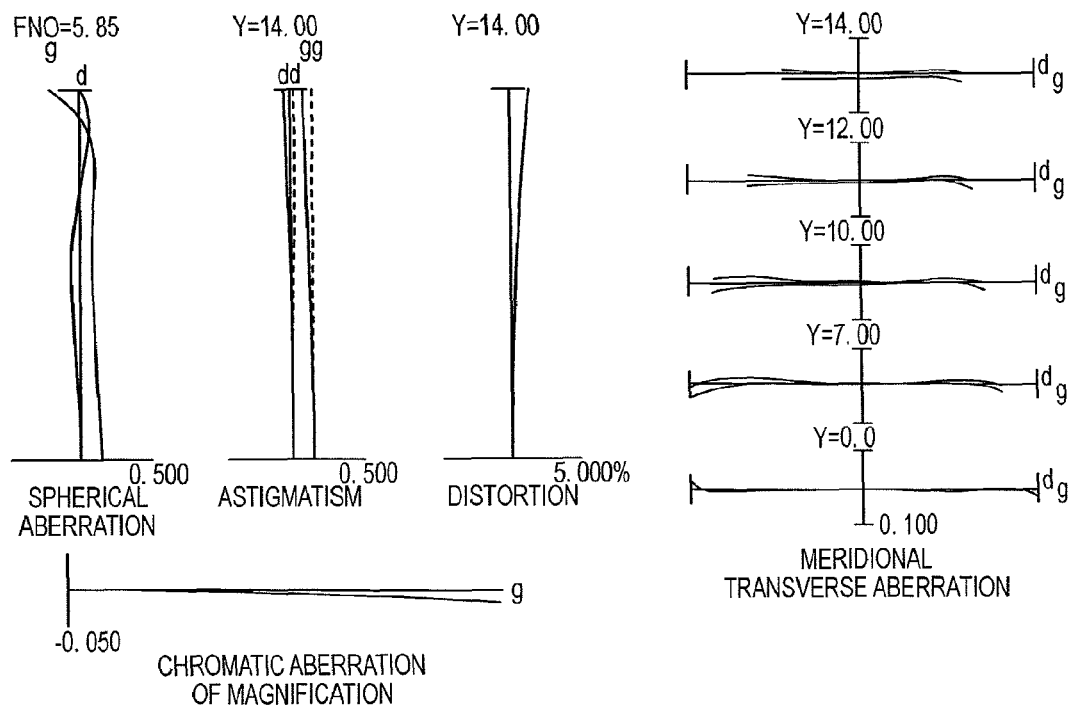
FIG. 16A is various aberration diagrams in the infinity in-focus state of the fourth example, which are those in the telephoto end state.
Figure 16B:
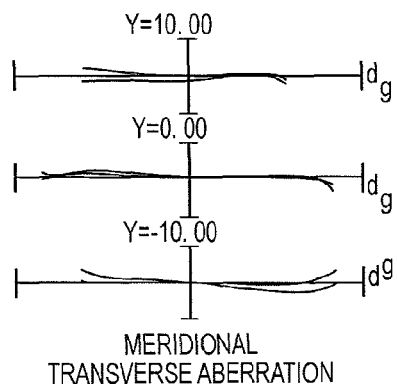
FIG. 16B is various aberration diagrams in the infinity in-focus state of the fourth example, which are meridional transverse aberration diagrams with shake compensation for rotational shake of 0.60° in the infinity photography state in the telephoto end state.

FIG. 14A shows aberration diagrams in the infinity in-focus state in the wide-angle end state of the fourth example, FIG. 15 aberration diagrams in the infinity in-focus state in the intermediate focal length state, and FIG. 16A aberration diagrams in the infinity in-focus state in the telephoto end state. FIG. 14B shows meridional transverse aberration diagrams with shake compensation for the rotational shake of 1.50° in the infinity photography state in the wide-angle end state of the fourth example, and FIG. 16B meridional transverse aberration diagrams with shake compensation for the rotational shake of 0.60° in the infinity photography state in the telephoto end state of the fourth example. It is clearly seen from the aberration diagrams that the zoom lens system ZL4 of the fourth example is well corrected for various aberrations in each of the focal length states from the wide-angle end state to the telephoto end state and has excellent imaging performance.

Fifth Example

Figure 17:
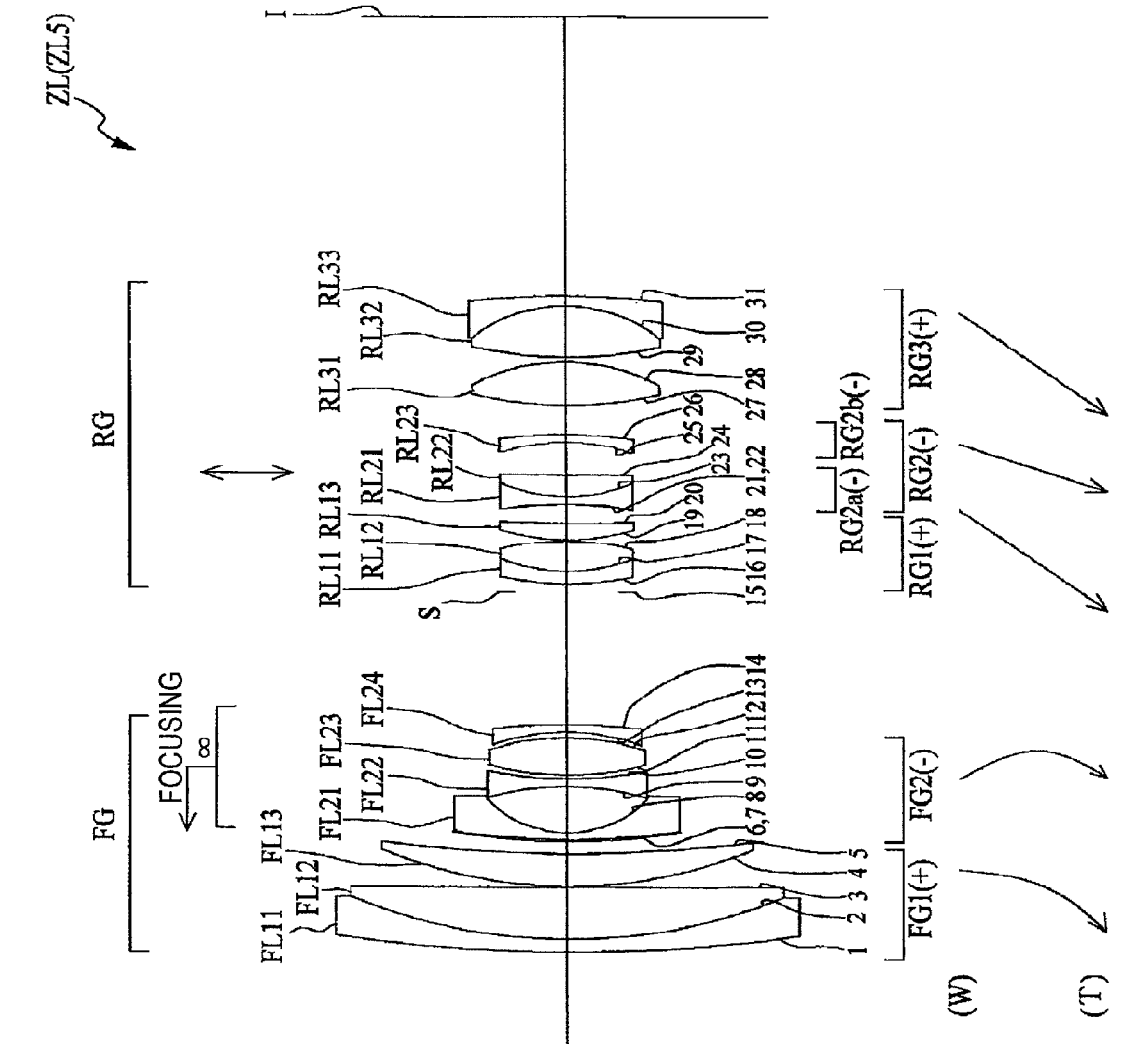
FIG. 17 is a sectional view showing a configuration of a zoom lens system according to the fifth example.

FIG. 17 is a drawing showing the configuration of the zoom lens system ZL5 according to the fifth example. This zoom lens system ZL5 of FIG. 17 is composed of the following units arranged in order from the object side: a front partial lens unit FG1 having a positive refracting power; a rear partial lens unit FG2 having a negative refracting power; a first lens unit RG1 having a positive refracting power; a 2a partial lens unit RG2a having a negative refracting power; a 2b partial lens unit RG2b having a negative refracting power; and a third lens unit RG3 having a positive refracting power. This zoom lens system ZL5 is configured as follows: the spaces between the lens units vary during change in the lens position state from the wide-angle end state to the telephoto end state in such a manner that the air space between the front partial lens unit FG1 and the rear partial lens unit FG2 varies, that the air space between the rear partial lens unit FG2 and the first lens unit RG1 decreases, that the air space between the first lens unit RG1 and the 2a partial lens unit RG2a increases from d12w to d12t, and that the air space between the 2b partial lens unit RG2b and the third lens unit RG3 decreases from d23w to d23t; the 2a partial lens unit RG2a is moved so as to have a component in a direction orthogonal to the optical axis, thereby effecting correction for the image position with occurrence of camera shake.

The front partial lens unit FG1 is composed of the following lenses arranged in order from the object side: a cemented lens of a negative meniscus lens FL11 with a convex surface on the object side and a positive meniscus lens FL12 with a convex surface on the object side; and a positive meniscus lens FL13 with a convex surface on the object side. The rear partial lens unit FG2 is composed of the following lenses arranged in order from the object side: a negative meniscus lens FL21 with a convex surface on the object side; a biconcave lens FL22; a biconvex lens FL23; and a negative meniscus lens FL24 with a concave surface on the object side; the negative meniscus lens FL21 located nearest to the object side in the rear partial lens unit FG2 is a composite aspherical lens in which an aspherical surface is formed by laying a resin layer on the object-side lens surface.

The first lens unit RG1 is composed of the following lenses arranged in order from the object side: a cemented lens of a negative meniscus lens RL11 with a convex surface on the object side and a biconvex lens RL12; and a positive meniscus lens RL13 with a convex surface on the object side. The 2a partial lens unit RG2a is composed of a cemented lens of a biconcave lens RL21 and a positive meniscus lens RL22 with a convex surface on the object side arranged in order from the object side; the biconcave lens RL21 located nearest to the object side in the 2a partial lens unit RG2a is a composite aspherical lens in which an aspherical surface is formed by laying a resin layer on the object-side lens surface. The 2b partial lens unit RG2b is composed of a negative meniscus lens RL23 with a concave surface on the object side. The third lens unit RG3 is composed of the following lenses arranged in order from the object side: a biconvex lens RL31; and a cemented lens of a biconvex lens RL32 and a negative meniscus lens RL33 with a concave surface on the object side; the negative meniscus lens RL33 located nearest to the image side in the third lens unit RG3 is a glass mold type aspherical lens in which the image-side lens surface is of an aspherical shape.

The aperture stop S is located between the rear partial lens unit FG2 and the first lens unit RG1 and moves together with the first lens unit RG1 during the zooming from the wide-angle end state to the telephoto end state. Focusing from a far range to a near range is implemented by moving the rear partial lens unit FG2 toward the object side.

Since the anti-vibration compensation factor is 1.01 and the focal length is 16.4 (mm) in the wide-angle end state in the fifth example, the movement amount of the 2a partial lens unit RG2a for compensation for the rotational deviation of 1.50° is 0.43 (mm). Since the anti-vibration compensation factor is 1.81 and the focal length isTT 102.0 (mm) in the telephoto end state in the fifth example, the movement amount of the 2a partial lens unit RG2a for compensation for the rotational deviation of 0.60° is 0.59 (mm).

Table 17 below provides values of specifications in the fifth example.

TABLE 17

| s | r | d | ν | n |
|---|---|---|---|---|
| 1 | 153.8859 | 1.8000 | 23.78 | 1.846660 |
| 2 | 57.0964 | 7.0870 | 61.28 | 1.630009 |
| 3 | 3646.5256 | 0.1000 | | |
| 4 | 48.8123 | 4.4150 | 46.65 | 1.815470 |
| 5 | 138.1872 | (d1) | | |
| *6 | 99.0907 | 0.2000 | 38.09 | 1.553890 |
| 7 | 69.8084 | 1.0000 | 44.24 | 1.825495 |
| 8 | 11.3523 | 6.3636 | | |
| 9 | −26.7608 | 1.0000 | 42.60 | 1.834000 |

TABLE 17-continued

| 10 | 37.8660 | 0.5309 | | |
| 11 | 29.7415 | 5.0776 | 22.93 | 1.848386 |
| 12 | −24.9665 | 0.8398 | | |
| 13 | −20.4861 | 1.0028 | 37.93 | 1.832305 |
| 14 | −62.1035 | (d2) | | |
| 15 | 0.0000 | 1.1000 | | |
| 16 | 28.8737 | 1.7500 | 23.78 | 1.846660 |
| 17 | 17.2050 | 4.1402 | 59.42 | 1.519000 |
| 18 | −28.5208 | 0.2000 | | |
| 19 | 22.7031 | 2.3510 | 82.49 | 1.498000 |
| 20 | 150.0469 | (d3) | | |
| *21 | −41.4874 | 0.1500 | 38.09 | 1.553890 |
| 22 | −36.4874 | 1.0000 | 37.16 | 1.834000 |
| 23 | 15.4285 | 3.0254 | 25.43 | 1.805181 |
| 24 | 480.3477 | 4.5000 | | |
| 25 | −19.6899 | 1.0000 | 40.29 | 1.820865 |
| 26 | −51.7953 | (d4) | | |
| 27 | 39.2092 | 5.9232 | 69.65 | 1.494313 |
| 28 | −19.8633 | 0.6672 | | |
| 29 | 41.5729 | 7.0735 | 70.41 | 1.487490 |
| 30 | −15.2714 | 1.4000 | 40.78 | 1.806100 |
| *31 | −67.9910 | (Bf) | | |

| | WE | MFL | TE |
|---|---|---|---|
| f = | 16.4~ | 55.0~ | 102.0 |
| FNO = | 3.6~ | 5.1~ | 5.8 |
| ω = | 42.0~ | 13.9~ | 7.7 |
| IH = | 14.0~ | 14.0~ | 14.0 |
| LLS = | 128.338~ | 164.176~ | 186.292 |
| Bf = | 38.199~ | 62.873~ | 78.620 |

[Focal Lengths of Respective Lens Units]

| LU | SS | FL |
|---|---|---|
| FG1 | 1 | 80.125 |
| FG2 | 6 | −12.100 |
| RG1 | 15 | 21.900 |
| RG2 | 21 | −18.488 |
| RG3 | 27 | 24.700 |

[Focal Lengths of Front Lens Group FG and Rear Lens Group RG]

| LG | SS | WE | MFL | TE |
|---|---|---|---|---|
| FG | 1 | −16.109 | −27.263 | −39.344 |
| RG | 15 | 31.004 | 30.007 | 29.700 |

In the fifth example, each lens surface of the sixth surface, the twenty first surface, and the thirty first surface is formed in an aspherical shape. Table 18 below provides data of the aspherical surfaces, i.e., values of the conic constant κ and the aspherical constants A4-A10 thereof.

TABLE 18

| | κ | A4 | A6 | A8 | A10 |
|---|---|---|---|---|---|
| 6th surface | −157.1928 | 4.52590E−05 | −2.08030E−07 | 7.04390E−10 | −1.27000E−12 |
| 21st surface | 9.3216 | 3.11160E−05 | 3.26730E−08 | 0.00000E+00 | 0.00000E+00 |
| 31st surface | −1.2227 | 1.38530E−05 | 6.33000E−09 | −1.41840E−10 | 1.56520E−13 |

In the fifth example, the following spaces vary during zooming: axial air space d1 between the front partial lens unit FG1 and the rear partial lens unit FG2; axial air space d2 between the rear partial lens unit FG2 and the first lens unit RG1; axial air space d3 between the first lens unit RG1 and the second lens unit RG2; axial air space d4 between the second lens unit RG2 and the third lens unit RG3. Table 19 below provides the varying spaces at respective focal lengths in the wide-angle end state, in an intermediate focal length state, and in the telephoto end state.

TABLE 19

| | WE | MFL | TE |
|---|---|---|---|
| d1 | 1.709 | 26.331 | 37.251 |
| d2 | 18.207 | 4.749 | 0.200 |

TABLE 19-continued

|  | WE | MFL | TE |
|---|---|---|---|
| d3 | 2.525 | 5.050 | 5.525 |
| d4 | 4.000 | 1.475 | 1.000 |

Table 20 below shows values corresponding to the respective condition expressions in this fifth example.

TABLE 20

| (1)(d12t − d12w)/Bfw = 0.079 |
|---|
| (2)(d23w − d23t)/Bfw = 0.079 |
| (3)(d12w/d13w) = 0.156 |
| (4)(d23t/d13t) = 0.062 |
| (5)\|Δ × 1\|/Bfw = 1.058 |
| (6)(−f2)/Bfw = 0.484 |
| (7)fR2a/fR2b = 1.032 |
| (8)Rs/(−f2) = 0.835 |
| (9)Np − Nn = −0.029 |
| (10)νn − νp = 11.730 |

Table 20a below shows values corresponding to the respective condition expressions in this fifth example.

TABLE 20a

| (1)(d12t − d12w)/BL = 0.048 |
|---|
| (2)(d23w − d23t)/BL = 0.048 |
| (3)(d12w/d13w) = 0.156 |
| (4)(d23t/d13t) = 0.062 |
| (5)\|Δ × 1\|/BL = 0.646 |
| (6)(−f2)/BL = 0.295 |
| (7)fR2a/fR2b = 1.032 |
| (8)Rs/(−f2) = 0.835 |
| (9)Np − Nn = −0.029 |
| (10)νn − νp = 11.730 |

Figure 18A:
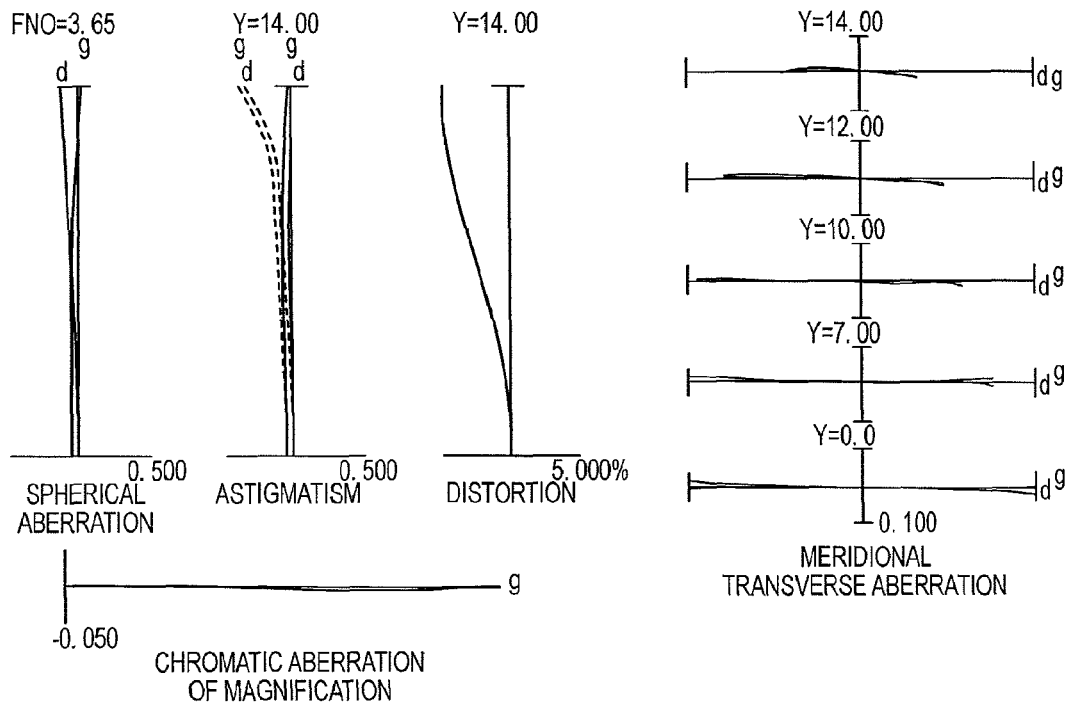
FIG. 18A is various aberration diagrams in the infinity in-focus state of the fifth example, which are those in the wide-angle end state.
Figure 18B:
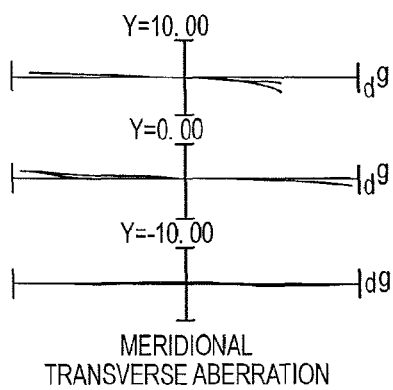
FIG. 18B is various aberration diagrams in the infinity in-focus state of the fifth example, which are meridional transverse aberration diagrams with shake compensation for rotational shake of 1.50° in the infinity photography state in the wide-angle end state.
Figure 19:
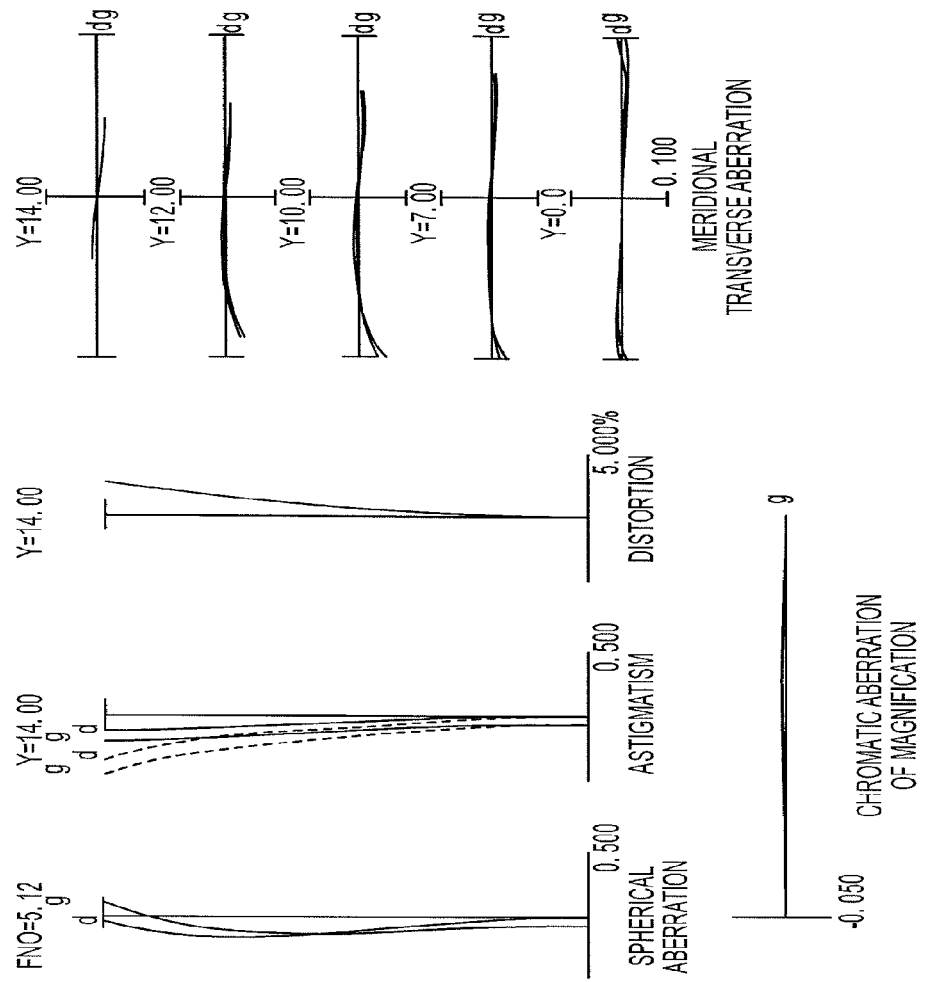
FIG. 19 is aberration diagrams in the infinity in-focus state in an intermediate focal length state of the fifth example.
Figure 20A:
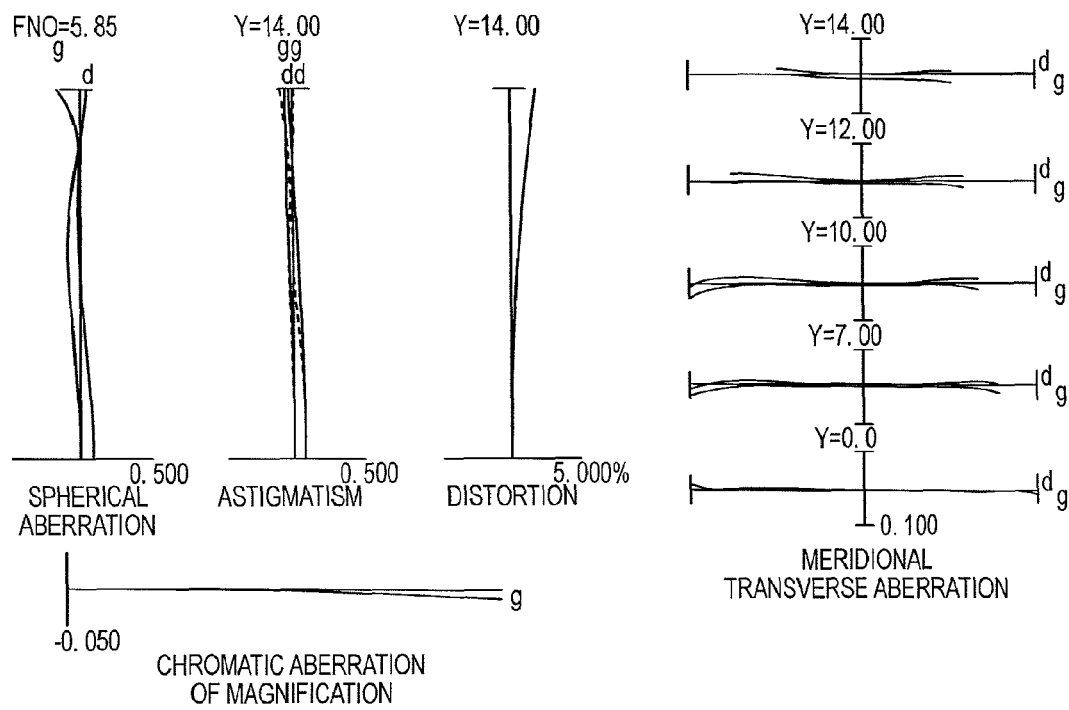
FIG. 20A is various aberration diagrams in the infinity in-focus state of the fifth example, which are those in the telephoto end state.
Figure 20B:
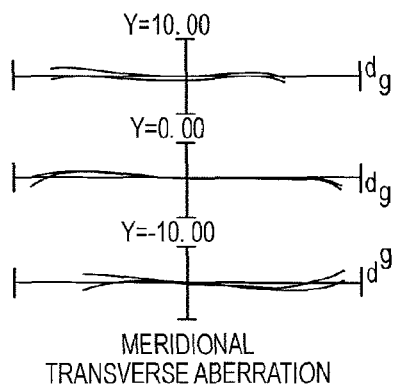
FIG. 20B is various aberration diagrams in the infinity in-focus state of the fifth example, which are meridional transverse aberration diagrams with shake compensation for rotational shake of 0.60° in the infinity photography state in the telephoto end state.

FIG. 18A shows aberration diagrams in the infinity in-focus state in the wide-angle end state of the fifth example, FIG. 19 aberration diagrams in the infinity in-focus state in the intermediate focal length state, and FIG. 20A aberration diagrams in the infinity in-focus state in the telephoto end state. FIG. 18B shows meridional transverse aberration diagrams with shake compensation for the rotational shake of 1.50° in the infinity photography state in the wide-angle end state of the fifth example, and FIG. 20B meridional transverse aberration diagrams with shake compensation for the rotational shake of 0.60° in the infinity photography state in the telephoto end state of the fifth example. It is clearly seen from the aberration diagrams that the zoom lens system ZL5 of the fifth example is well corrected for various aberrations in each of the focal length states from the wide-angle end state to the telephoto end state and has excellent imaging performance.

Next, each of examples (the sixth to tenth examples) of the second embodiment of the present invention will be explained below on the basis of the accompanying drawings. FIG. 23 is a sectional view showing a configuration of a zoom lens system ZL according to an example, which shows a refracting power layout and states of movement of respective lens units with change in a focal length state from the wide-angle end state (W) to the telephoto end state (T) indicated by arrows in the lower part of FIG. 23. As shown in this FIG. 23, the zoom lens system ZL of the present example has the following lens units arranged along the optical axis and in order from the object side: a first lens unit G1 having a positive refracting power; a second lens unit G2 having a negative refracting power; a third lens unit G3 having a positive refracting power; a fourth lens unit G4 having a negative refracting power; and a fifth lens unit G5 having a positive refracting power. The fourth lens unit G4 is composed of the following lenses arranged in order from the object side: a 4a lens G4a having a negative refracting power; a 4b lens G4b having a positive refracting power; and a 4c lens G4c having a negative refracting power. This zoom lens system ZL is configured as follows: the spaces between the lens units vary during zooming from the wide-angle end state to the telephoto end state in such a manner that the air space between the first lens unit G1 and the second lens unit G2 increases, that the air space between the second lens unit G2 and the third lens unit G3 decreases, that the air space between the third lens unit G3 and the fourth lens unit G4 increases from d34w to d34t, and that the air space between the fourth lens unit G4 and the fifth lens unit G5 decreases from d45w to d45t; at least a part of the fourth lens unit G4 is moved so as to have a component in a direction perpendicular to the optical axis, thereby effecting correction for the image position with occurrence of camera shake. The space d34w or d34t between the third lens unit G3 and the fourth lens unit G4 in the wide-angle end state or in the telephoto end state corresponds to d3 in the table showing values of specifications in each example, and the space d45w or d45t between the fourth lens unit G4 and the fifth lens unit G5 in the wide-angle end state or in the telephoto end state corresponds to d4 in the table showing values of specifications in each example.

The aperture stop S is located between the second lens unit G2 and the third lens unit G3 and moves together with the third lens unit G3 during the zooming from the wide-angle end state to the telephoto end state. Focusing from a far range to a near range is implemented by moving the second lens unit G2 toward the object side.

In each example, an aspherical surface is represented by formula (a) below, where y is a height in a direction perpendicular to the optical axis, S(y) a distance (sag) along the optical axis from a tangent plane to a top of each aspherical surface at height h to the aspherical surface, r a radius of curvature of a reference spherical surface (paraxial curvature radius), κ the conic constant, and An the nth-order aspherical coefficient. In the examples hereinafter, "E−n" represents "×10$^{-n}$".

$$S(y)=(y^2/r)/\{1+(1-\kappa\times y^2/r^2)^{1/2}\}+A4\times y^4+A6\times y^6+A8\times y^8+A10\times y^{10} \quad (a)$$

In each example, the second-order aspherical coefficient A2 is 0. In the table of each example, each aspherical surface is accompanied by mark * on the left of a surface number.

Sixth Example

FIG. 23 is a drawing showing the configuration of the zoom lens system ZL6 according to the sixth example. In this zoom lens system ZL6 of FIG. 23, the first lens unit G1 is composed of the following lenses arranged in order from the object side: a cemented lens of a negative meniscus lens L11 with a convex surface on the object side and a positive meniscus lens L12 with a convex surface on the object side; and a positive meniscus lens L13 with a convex surface on the object side. The second lens unit G2 is composed of the following lenses arranged in order from the object side: a negative meniscus lens L21 with a convex surface on the object side; a biconcave lens L22; a biconvex lens L23; and a negative meniscus lens L24 with a concave surface on the object side; the negative meniscus lens L21 located nearest to the object side in the second lens unit G2 is a composite aspherical lens in which an aspherical surface is formed by laying a resin layer on the object-side glass lens surface.

The third lens unit G3 is composed of the following lenses arranged in order from the object side: a cemented lens of a negative meniscus lens L31 with a convex surface on the object side and a biconvex lens L32; and a positive meniscus lens L33 with a convex surface on the object side. The fourth lens unit G4 is composed of the following lenses arranged in order from the object side: a cemented lens of a biconcave lens L41 (4a lens G4a) and a positive meniscus lens L42 (4b lens G4b) with a convex surface on the object side; and a negative meniscus lens L43 (4c lens G4c) with a concave surface on the object side; the biconcave lens L41 (4a lens G4a) located nearest to the object side in the fourth lens unit G4 is a composite aspherical lens in which an aspherical surface is formed by laying a resin layer on the object-side glass lens surface. The fifth lens unit G5 is composed of the following lenses arranged in order from the object side: a biconvex lens L51; and a cemented lens of a biconvex lens L52 and a negative meniscus lens L53 with a concave surface on the object side; the negative meniscus lens L53 located nearest to the image side in the fifth lens unit G5 is a glass mold type aspherical lens in which the image-side glass lens surface is of an aspherical shape.

In the sixth example, the fourth lens unit G4 is so configured that the cemented lens of the biconcave lens L41 (4a lens G4a) and the positive meniscus lens L42 (4b lens G4b) with the convex surface on the object side is moved so as to have a component in a direction orthogonal to the optical axis, thereby effecting compensation for the image position with occurrence of camera shake.

In the case of a lens wherein the focal length of the overall system is f and wherein an anti-vibration compensation factor (a ratio of an image position movement amount on the image plane to a movement amount of a moving lens unit in shake compensation) is K, a rotational deviation of angle θ can be corrected by moving the moving lens unit for shake compensation by (f·tan θ)/K in the direction orthogonal to the optical axis. Since the anti-vibration compensation factor is 1.04 and the focal length is 18.4 (mm) in the wide-angle end state in the sixth example, the movement amount of the 4a lens G4a and the 4b lens G4b for compensation for the rotational deviation of 1.50° is 0.46 (mm). Since the anti-vibration compensation factor is 1.85 and the focal length is 102.5 (mm) in the telephoto end state in the sixth example, the movement amount of the 4a lens G4a and the 4b lens G4b for compensation for the rotational deviation of 0.60° is 0.58 (mm). It should be noted that in the present example the rotational deviation was assumed to be double that in the normal case (i.e., the range of 0° to) 0.60° and that the movement amount of the moving lens unit (4a lens G4a and 4b lens G4b) for compensation for the rotational deviation was examined by double that in the normal case. These also apply to the examples hereinafter.

Table 21 below provides values of specifications in the sixth example. In this Table 21, f represents the focal length, FNO the F number, ω a half angle of view, and Bf the back focus. Furthermore, the surface No. indicates an order of each lens surface from the object side along a ray travel direction, the surface separation a space on the optical axis from each optical surface to a next optical surface, and the refractive index and Abbe number values for the d line (λ=587.6 nm). It is noted herein that "mm" is used as the unit of length for the focal length f, the radius of curvature, the surface separation, and other lengths appearing in all the specifications below, but the unit of length does not always have to be limited to it because equivalent optical performance is achieved when an optical system is proportionally enlarged or reduced. The radius of curvature of 0.0000 indicates a plane and the refractive index of air of 1.00000 is omitted. The notation of these symbols and the description of the specification table also apply to the examples hereinafter.

TABLE 21

| s | r | d | ν | n |
|---|---|---|---|---|
| 1 | 148.6804 | 1.8000 | 23.78 | 1.846660 |
| 2 | 53.5195 | 6.9847 | 56.45 | 1.672275 |
| 3 | 1203.8588 | 0.1000 | | |
| 4 | 45.7199 | 4.4150 | 48.95 | 1.770984 |
| 5 | 136.8162 | (d1) | | |
| *6 | 87.1098 | 0.2000 | 38.09 | 1.553890 |
| 7 | 65.0000 | 1.0000 | 50.73 | 1.764943 |
| 8 | 12.2656 | 6.3636 | | |
| 9 | −29.3430 | 1.0000 | 42.62 | 1.833873 |
| 10 | 36.0783 | 0.6211 | | |
| 11 | 29.3049 | 5.2003 | 23.07 | 1.847995 |
| 12 | −27.3230 | 1.0791 | | |
| 13 | −19.6728 | 1.0028 | 39.93 | 1.833079 |
| 14 | −72.9545 | (d2) | | |
| 15 | 0.0000 | 1.1000 | | |
| 16 | 31.0569 | 1.7500 | 23.78 | 1.846660 |
| 17 | 18.9160 | 4.1954 | 69.20 | 1.519000 |
| 18 | −28.5216 | 0.2000 | | |
| 19 | 22.7713 | 2.4518 | 82.49 | 1.498000 |
| 20 | 172.4901 | (d3) | | |
| *21 | −47.0722 | 0.1500 | 38.09 | 1.553890 |
| 22 | −44.0722 | 1.0000 | 37.16 | 1.834000 |
| 23 | 14.9882 | 3.0239 | 25.43 | 1.805181 |
| 24 | 182.1551 | 4.8081 | | |
| 25 | −16.4968 | 1.0000 | 43.03 | 1.818577 |
| 26 | −34.2785 | (d4) | | |
| 27 | 61.8619 | 5.5935 | 65.57 | 1.538373 |
| 28 | −19.6512 | 0.7000 | | |
| 29 | 50.3975 | 7.5000 | 70.41 | 1.487490 |
| 30 | −15.1843 | 1.4000 | 40.78 | 1.806100 |
| *31 | −55.8591 | (Bf) | | |

| | WE | MFL | TE |
|---|---|---|---|
| f = | 18.4~ | 55.0~ | 102.5 |
| FNO = | 3.5~ | 4.7~ | 5.8 |
| ω = | 38.7~ | 14.0~ | 7.7 |
| IH = | 14.0~ | 14.0~ | 14.0 |
| LLS = | 130.936~ | 161.050~ | 185.048 |
| Bf = | 40.000~ | 60.991~ | 82.306 |

[Focal Lengths of Respective Lens Units]

| LU | SS | FL |
|---|---|---|
| G1 | 1 | 75.683 |
| G2 | 6 | −12.500 |
| G3 | 15 | 21.900 |
| G4 | 21 | −18.673 |
| G5 | 27 | 25.435 |

In the sixth example, each lens surface of the sixth surface, the twenty first surface, and the thirty first surface is formed in an aspherical shape. Table 22 below provides data of the aspherical surfaces, i.e., values of the conic constant κ and the aspherical constants A4-A10 thereof.

TABLE 22

| | κ | A4 | A6 | A8 | A10 |
|---|---|---|---|---|---|
| 6th surface | −46.1784 | 2.75110E−05 | −7.34000E−08 | 1.31870E−10 | 5.44290E−14 |
| 21st surface | 10.3116 | 2.43420E−05 | 2.48240E−08 | 0.00000E+00 | 0.00000E+00 |
| 31st surface | 4.0858 | 1.21100E−05 | −3.67070E−09 | −4.27560E−11 | −2.41150E−13 |

In the sixth example, the following spaces vary during zooming: axial air space d1 between the first lens unit G1 and the second lens unit G2; axial air space d2 between the second lens unit G2 and the third lens unit G3; axial air space d3 between the third lens unit G3 and the fourth lens unit G4; axial air space d4 between the fourth lens unit G4 and the fifth lens unit G5. Table 23 below provides the varying spaces at respective focal lengths in the wide-angle end state, in an intermediate focal length state, and in the telephoto end state.

TABLE 23

|    | WE     | MFL    | TE     |
|----|--------|--------|--------|
| d1 | 1.814  | 23.307 | 31.451 |
| d2 | 18.119 | 5.749  | 0.289  |
| d3 | 2.471  | 4.753  | 5.363  |
| d4 | 3.892  | 1.611  | 1.000  |

Table 24 below shows values corresponding to the respective condition expressions in this sixth example. In this Table 24, r4AR2 represents the radius of curvature of the image-side lens surface of the 4a lens G4a; r4BR1 the radius of curvature of the object-side lens surface of the 4b lens G4b; r4BR2 the radius of curvature of the image-side lens surface of the 4b lens G4b; ν4A the Abbe number of the 4a lens G4a; ν4B the Abbe number of the 4b lens G2b; N4A the refractive index of the 4a lens G4a for the d line; N4B the refractive index of the 4b lens G4b for the d line; f4 the focal length of the fourth lens unit G4; fw345 the composite focal length of the third lens unit G3, the fourth lens unit G4, and the fifth lens unit G5; d34w and d34t the space between the third lens unit G3 and the fourth lens unit G4 with change in the lens position state from the wide-angle end state to the telephoto end state; d45w and d45t the space between the fourth lens unit G4 and the fifth lens unit G5 with change in the lens position state from the wide-angle end state to the telephoto end state. This notation of symbols also applies to the examples hereinafter.

TABLE 24

| (1)((1/r4BR2) × (−f4)) = 0.103 |
| (2)(−f4/fw345) = 0.591 |
| (3)(d34t − d34w)/fw345 = 0.092 |
| (4)(d45w − d45t)/fw345 = 0.092 |
| (5)((1/r4AR2) × (−f4)) = 1.246 |
| (6)((1/r4BR1) × (−f4)) = 1.246 |
| (7)(N4B − N4A) = −0.029 |
| (8)(ν4A − ν4B) = 11.730 |

Figure 24A:
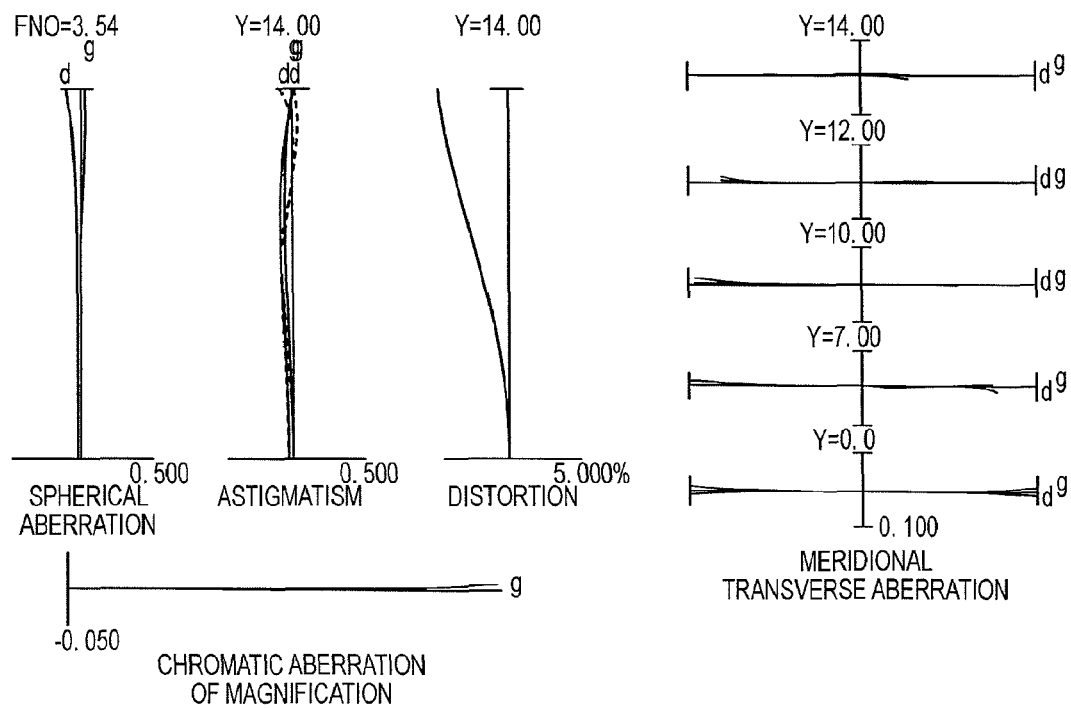
FIG. 24A is various aberration diagrams in the infinity in-focus state of the sixth example, which are those in the wide-angle end state.
Figure 24B:
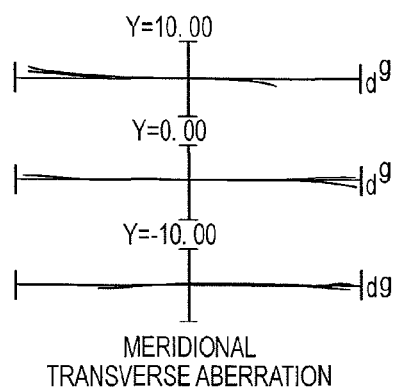
FIG. 24B is various aberration diagrams in the infinity in-focus state of the sixth example, which are meridional transverse aberration diagrams with shake compensation for rotational shake of 1.50° in the infinity photography state in the wide-angle end state.
Figure 25:
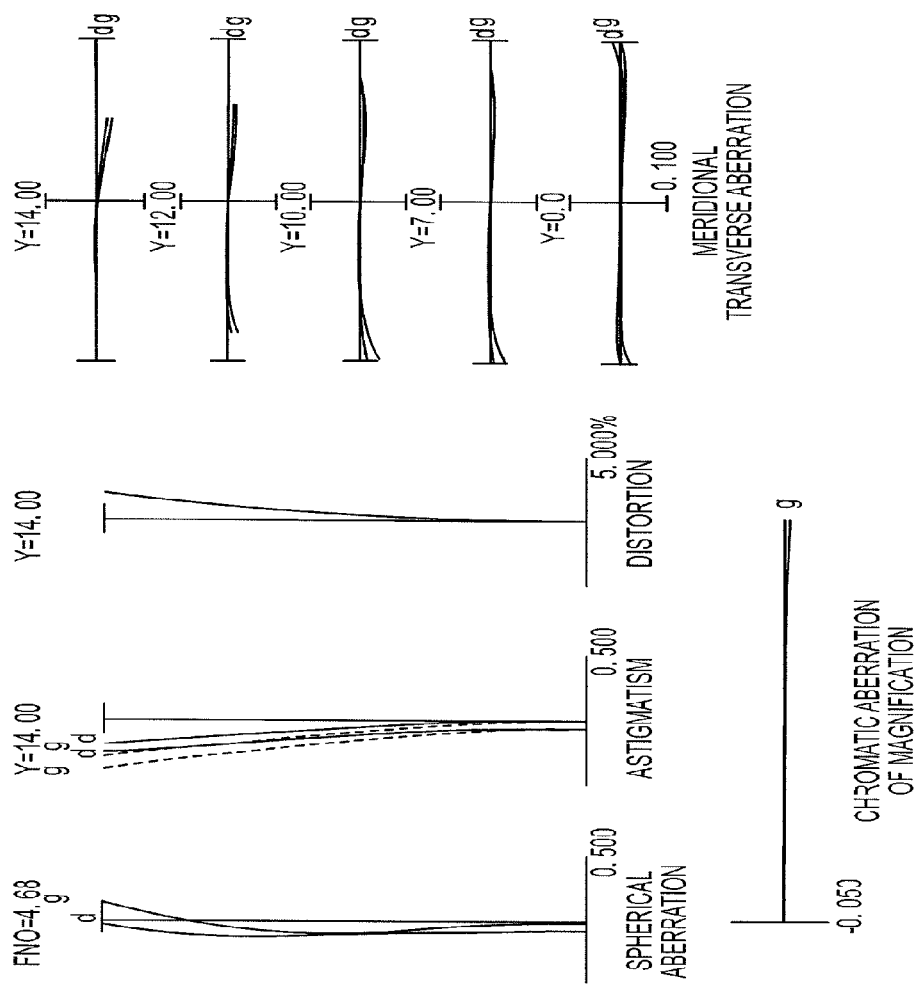
FIG. 25 is aberration diagrams in the infinity in-focus state in an intermediate focal length state of the sixth example.
Figure 26A:
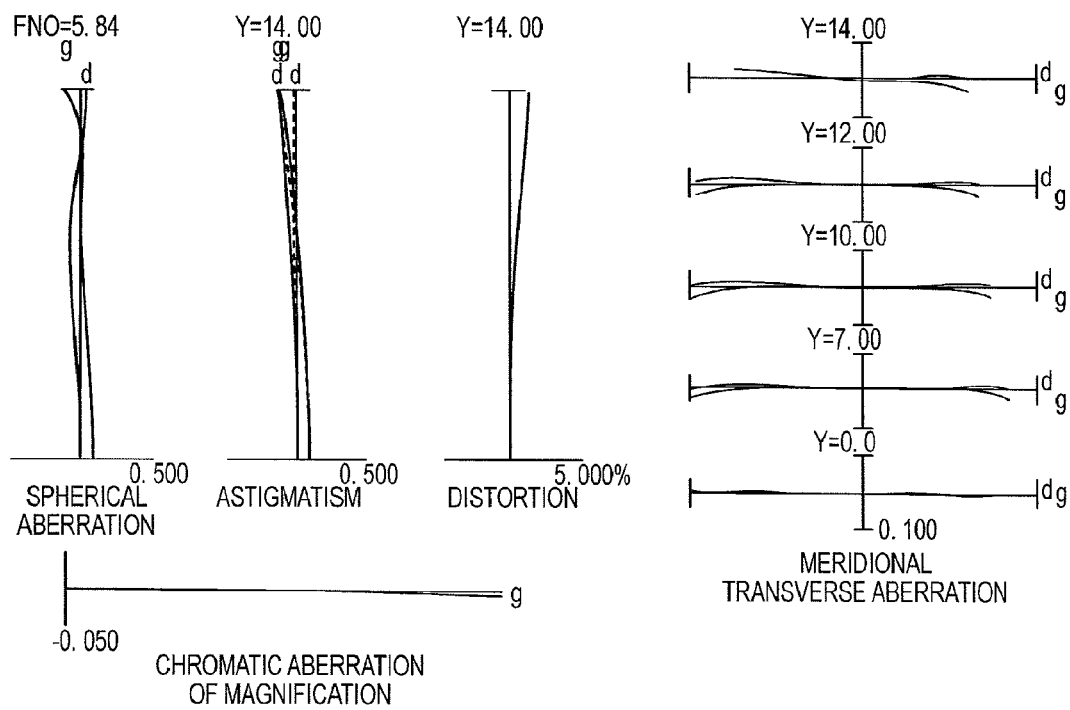
FIG. 26A is various aberration diagrams in the infinity in-focus state of the sixth example, which are those in the telephoto end state.
Figure 26B:
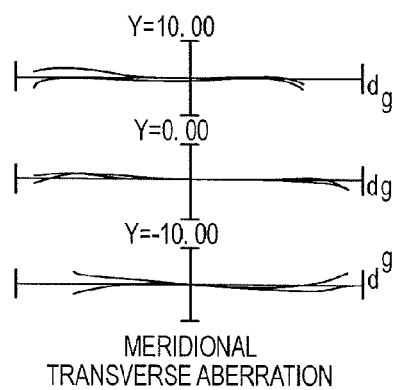
FIG. 26B is various aberration diagrams in the infinity in-focus state of the sixth example, which are meridional transverse aberration diagrams with shake compensation for rotational shake of 0.60° in the infinity photography state in the telephoto end state.

FIG. 24A shows aberration diagrams in the infinity in-focus state in the wide-angle end state of the sixth example, FIG. 25 aberration diagrams in the infinity in-focus state in the intermediate focal length state, and FIG. 26A aberration diagrams in the infinity in-focus state in the telephoto end state. FIG. 24B shows meridional transverse aberration diagrams with shake compensation for the rotational shake of 1.50° in the infinity photography state in the wide-angle end state of the sixth example, and FIG. 26B meridional transverse aberration diagrams with shake compensation for the rotational shake of 0.60° in the infinity photography state in the telephoto end state of the sixth example.

In each aberration diagram, FNO represents the F number, Y the image height, d the d line (λ=587.6 nm), and g the g line (λ=435.6 nm). In the aberration diagrams showing astigmatism, each solid line indicates a sagittal image surface and each dashed line a meridional image surface. This definition of aberration diagrams also applies to the examples hereinafter. It is clearly seen from the aberration diagrams that the zoom lens system ZL6 of the sixth example is well corrected for various aberrations in each of the focal length states from the wide-angle end state to the telephoto end state and has excellent imaging performance.

Seventh Example

Figure 27:
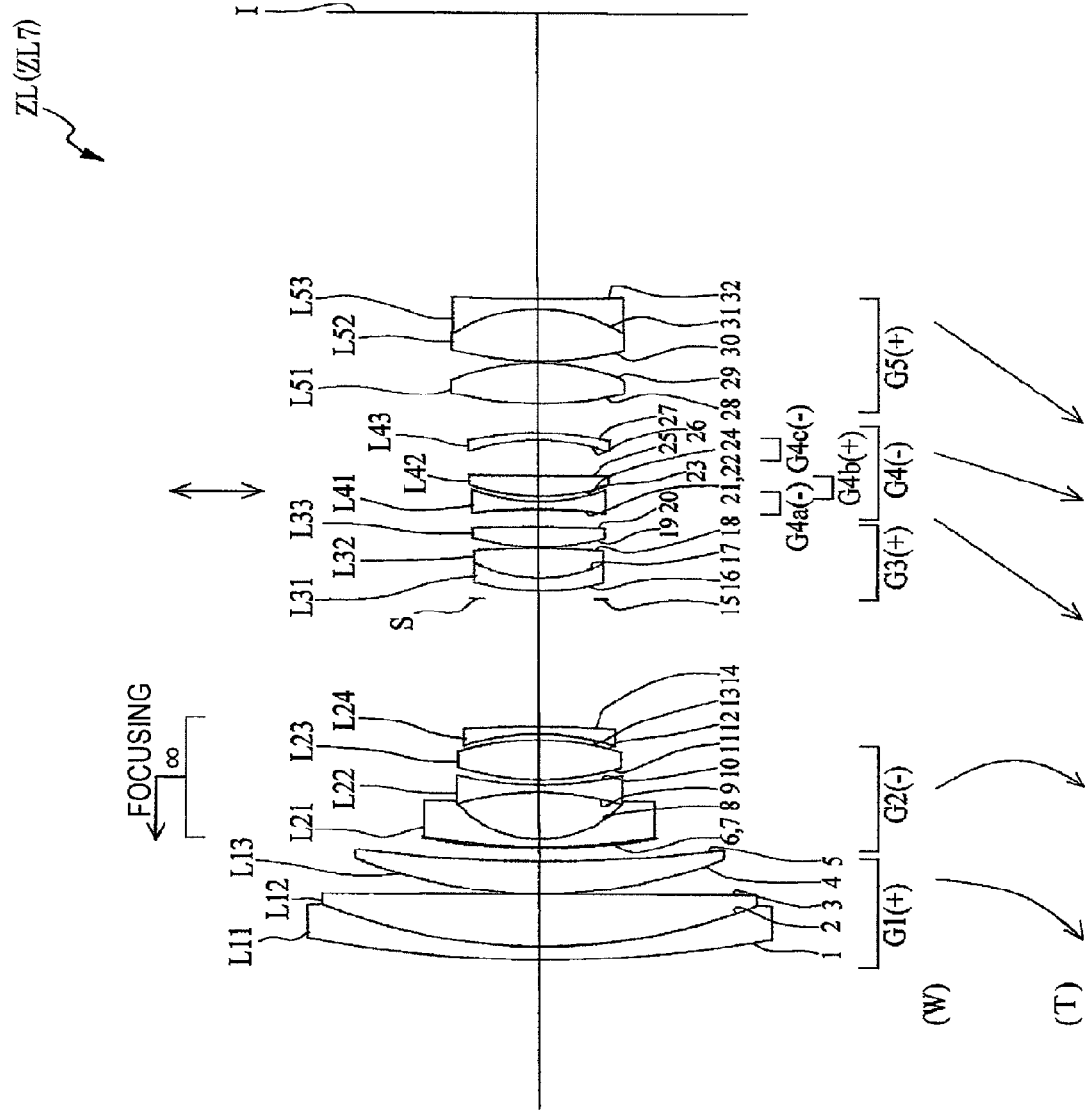
FIG. 27 is a sectional view showing a configuration of a zoom lens system according to the seventh example.

FIG. 27 is a drawing showing the configuration of the zoom lens system ZL7 according to the seventh example. In this zoom lens system ZL7 of FIG. 27, the first lens unit G1 is composed of the following lenses arranged in order from the object side: a cemented lens of a negative meniscus lens L11 with a convex surface on the object side and a biconvex positive lens L12; and a positive meniscus lens L13 with a convex surface on the object side. The second lens unit G2 is composed of the following lenses arranged in order from the object side: a negative meniscus lens L21 with a convex surface on the object side; a biconcave lens L22; a biconvex lens L23; and a negative meniscus lens L24 with a concave surface on the object side; the negative meniscus lens L21 located nearest to the object side in the second lens unit G2 is a composite aspherical lens in which an aspherical surface is formed by laying a resin layer on the object-side glass lens surface.

The third lens unit G3 is composed of the following lenses arranged in order from the object side: a cemented lens of a negative meniscus lens L31 with a convex surface on the object side and a biconvex lens L32; and a biconvex lens L33. The fourth lens unit G4 is composed of the following lenses arranged in order from the object side: a biconcave lens L41 (4a lens G4a), a biconvex lens L42 (4b lens G4b), and a negative meniscus lens L43 (4c lens G4c) with a concave surface on the object side; the biconcave lens L41 (4a lens G4a) located nearest to the object side in the fourth lens unit G4 is a composite aspherical lens in which an aspherical surface is formed by laying a resin layer on the object-side glass lens surface. The fifth lens unit G5 is composed of the following lenses arranged in order from the object side: a biconvex lens L51; and a cemented lens of a biconvex lens L52 and a biconcave lens L53; the biconcave lens L53 located nearest to the image side in the fifth lens unit G5 is a glass mold type aspherical lens in which the image-side glass lens surface is of an aspherical shape.

In the seventh example, the fourth lens unit G4 is so configured that the biconcave lens L41 (4a lens G4a) and the biconvex lens L42 (4b lens G4b) are moved so as to have a component in a direction orthogonal to the optical axis, thereby effecting compensation for the image position with occurrence of camera shake.

Since the anti-vibration compensation factor is 0.98 and the focal length is 18.4 (mm) in the wide-angle end state in the seventh example, the movement amount of the 4a lens G4a and the 4b lens G4b for compensation for the rotational deviation of 1.50° is 0.49 (mm). Since the anti-vibration compensation factor is 1.61 and the focal length is 102.5 (mm) in the telephoto end state in the seventh example, the movement amount of the 4a lens G4a and the 4b lens G4b for compensation for the rotational deviation of 0.60° is 0.67 (mm).

Table 25 below provides values of specifications in the seventh example.

TABLE 25

| s | r | d | ν | n |
|---|---|---|---|---|
| 1 | 124.9637 | 1.8000 | 23.78 | 1.846660 |
| 2 | 56.8830 | 7.1441 | 63.88 | 1.612832 |

TABLE 25-continued

| | | | | |
|---|---|---|---|---|
| 3 | −7734.1185 | 0.1000 | | |
| 4 | 49.2404 | 4.4150 | 49.99 | 1.753624 |
| 5 | 144.3285 | (d1) | | |
| *6 | 82.4998 | 0.2000 | 38.09 | 1.553890 |
| 7 | 67.3309 | 1.0000 | 50.68 | 1.765402 |
| 8 | 11.5199 | 6.3636 | | |
| 9 | −27.5207 | 1.0000 | 37.22 | 1.832009 |
| 10 | 33.8876 | 0.74330 | | |
| 11 | 28.4691 | 5.4311 | 23.01 | 1.848138 |
| 12 | −26.0659 | 0.8224 | | |
| 13 | −22.5881 | 1.0028 | 37.28 | 1.831988 |
| 14 | −100.4879 | (d2) | | |
| 15 | 0.0000 | 1.1000 | | |
| 16 | 23.7667 | 1.7500 | 23.78 | 1.846660 |
| 17 | 14.2775 | 4.0262 | 53.27 | 1.519000 |
| 18 | −84.0994 | 0.2000 | | |
| 19 | 25.2960 | 2.6614 | 80.31 | 1.507189 |
| 20 | −199.9118 | (d3) | | |
| *21 | −48.1707 | 0.1500 | 38.09 | 1.553890 |
| 22 | −50.0223 | 1.0000 | 37.16 | 1.834000 |
| 23 | 19.0552 | 0.7200 | | |
| 24 | 21.6558 | 2.8272 | 25.43 | 1.805181 |
| 25 | −1722.7441 | 4.8673 | | |
| 26 | −20.2262 | 1.0000 | 54.65 | 1.729242 |
| 27 | −31.0886 | (d4) | | |
| 28 | 37.4227 | 5.5104 | 66.05 | 1.494951 |
| 29 | −21.3225 | 0.2115 | | |
| 30 | 32.6832 | 7.1815 | 70.41 | 1.487490 |
| 31 | −15.2216 | 1.4000 | 40.78 | 1.806100 |
| *32 | 429.2340 | (BF) | | |

| | WE | MFL | TE |
|---|---|---|---|
| f = | 18.4~ | 55.0~ | 102.5 |
| FNO = | 3.7~ | 5.2~ | 5.9 |
| ω = | 38.7~ | 13.9~ | 7.6 |
| IH = | 14.0~ | 14.0~ | 14.0 |
| LLS = | 129.039~ | 160.882~ | 180.265 |
| Bf = | 38.850~ | 61.185~ | 73.846 |

[Focal Lengths of Respective Lens Units]

| LU | SS | FL |
|---|---|---|
| G1 | 1 | 77.537 |
| G2 | 6 | −12.500 |
| G1 | 15 | 25.028 |
| G2 | 21 | −27.950 |
| G3 | 28 | 29.989 |

In the seventh example, each lens surface of the sixth surface, the twenty first surface, and the thirty second surface is formed in an aspherical shape. Table 26 below provides data of the aspherical surfaces, i.e., values of the conic constant κ and the aspherical constants A4-A10 thereof.

TABLE 26

| | κ | A4 | A6 | A8 | A10 |
|---|---|---|---|---|---|
| 6th surface | 10.4276 | 1.44360E−05 | −8.21560E−08 | 1.82050E−10 | −2.58450E−13 |
| 21st surface | −2.4536 | 1.67080E−05 | −8.08760E−09 | 0.00000E+00 | 0.00000E+00 |
| 32nd surface | 687.4144 | 1.28060E−05 | −2.80800E−08 | 2.48990E−11 | −1.03610E−12 |

In the seventh example, the following spaces vary during zooming: axial air space d1 between the first lens unit G1 and the second lens unit G2; axial air space d2 between the second lens unit G2 and the third lens unit G3; axial air space d3 between the third lens unit G3 and the fourth lens unit G4; axial air space d4 between the fourth lens unit G4 and the fifth lens unit G5. Table 27 below provides the varying spaces at respective focal lengths in the wide-angle end state, in an intermediate focal length state, and in the telephoto end state.

TABLE 27

| | WE | MFL | TE |
|---|---|---|---|
| d1 | 1.805 | 23.781 | 35.291 |
| d2 | 17.359 | 4.967 | 0.200 |
| d3 | 2.400 | 4.774 | 5.300 |
| d4 | 3.997 | 1.547 | 1.000 |

Table 28 below shows values corresponding to the respective condition expressions in this seventh example.

TABLE 28

| |
|---|
| (1)((1/r4BR2) × (−f4)) = −0.016 |
| (2)(−f4/fw345) = 0.941 |
| (3)(d34t − d34w)/fw345 = 0.098 |
| (4)(d45w − d45t)/fw345 = 0.101 |
| (5)((1/r4AR2) × (−f4)) = 1.467 |
| (6)((1/r4BR1) × (−f4)) = 1.291 |
| (7)(N4B − N4A) = −0.029 |
| (8)(ν4A − ν4B) = 11.730 |

Figure 28A:
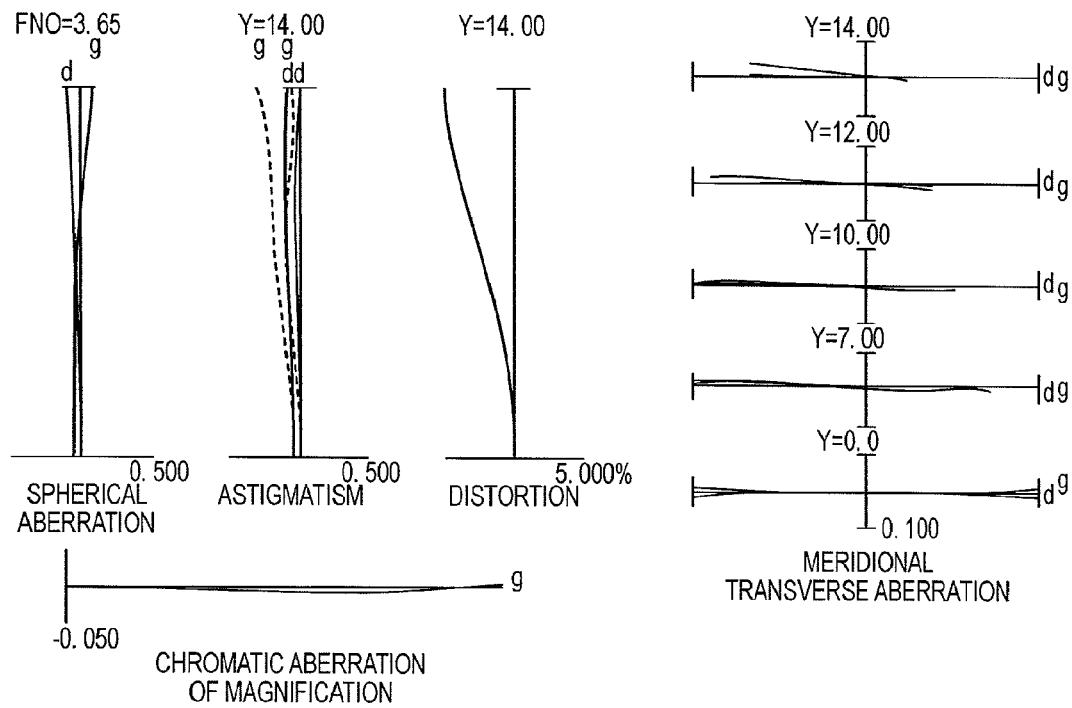
FIG. 28A is various aberration diagrams in the infinity in-focus state of the seventh example, which are those in the wide-angle end state.
Figure 28B:
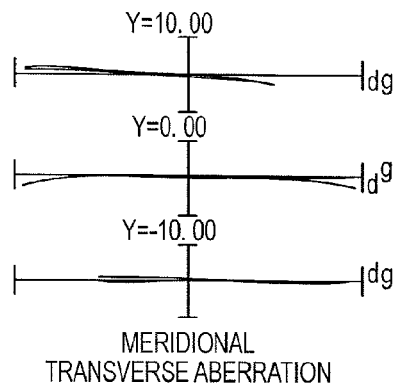
FIG. 28B is various aberration diagrams in the infinity in-focus state of the seventh example, which are meridional transverse aberration diagrams with shake compensation for rotational shake of 1.50° in the infinity photography state in the wide-angle end state.
Figure 29:
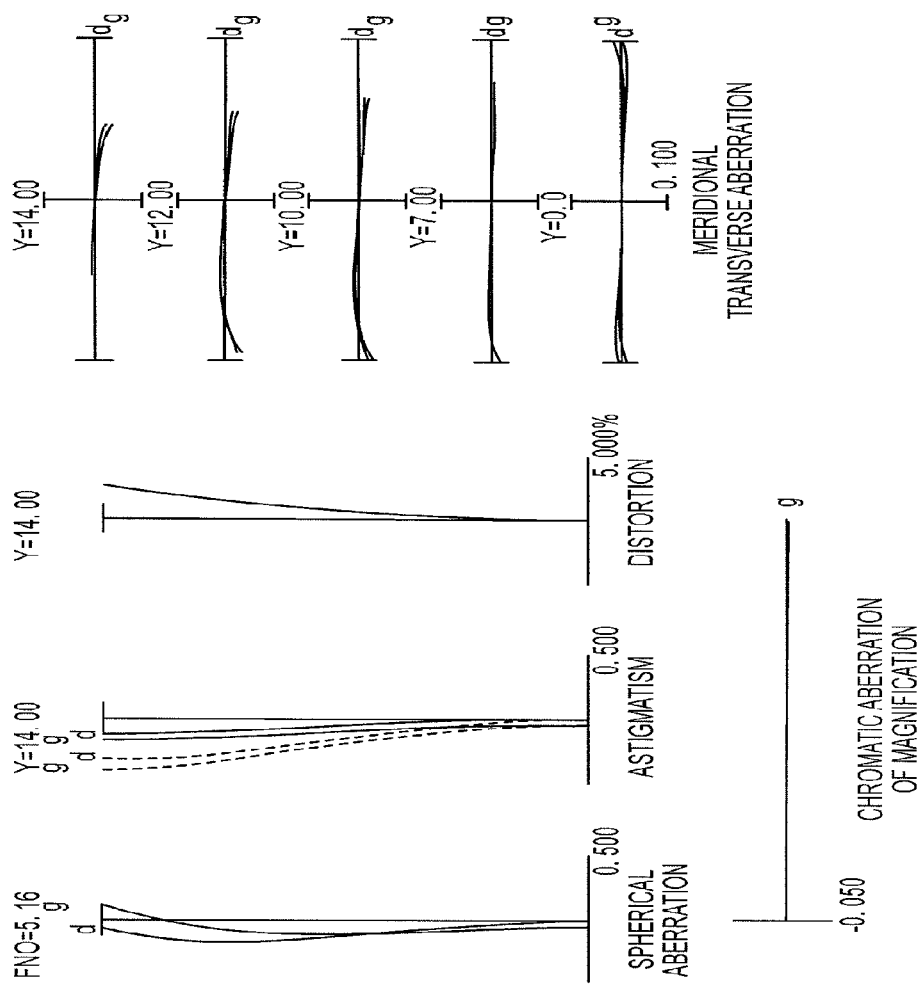
FIG. 29 is aberration diagrams in the infinity in-focus state in an intermediate focal length state of the seventh example.
Figure 30A:
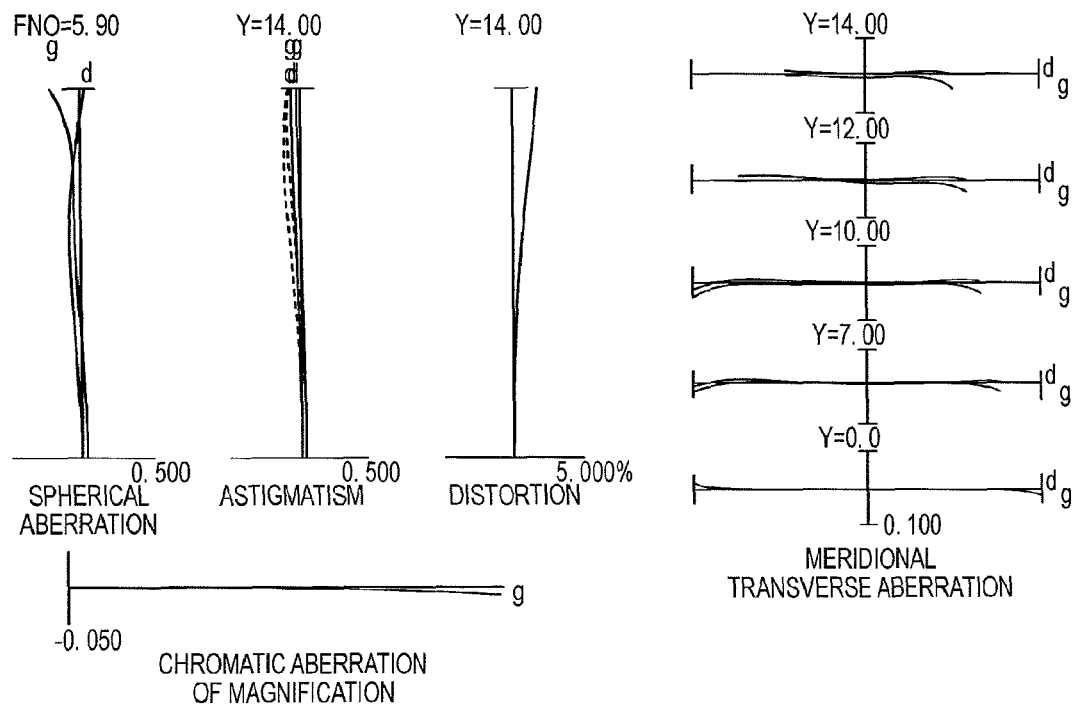
FIG. 30A is various aberration diagrams in the infinity in-focus state of the seventh example, which are those in the telephoto end state.
Figure 30B:
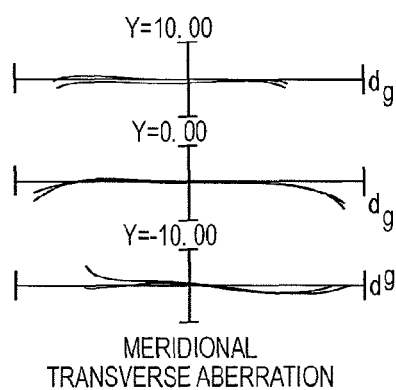
FIG. 30B is various aberration diagrams in the infinity in-focus state of the seventh example, which are meridional transverse aberration diagrams with shake compensation for rotational shake of 0.60° in the infinity photography state in the telephoto end state.

FIG. 28A shows aberration diagrams in the infinity in-focus state in the wide-angle end state of the seventh example, FIG. 29 aberration diagrams in the infinity in-focus state in the intermediate focal length state, and FIG. 30A aberration diagrams in the infinity in-focus state in the telephoto end state. FIG. 28B shows meridional transverse aberration diagrams with shake compensation for the rotational shake of 1.50° in the infinity photography state in the wide-angle end state of the seventh example, and FIG. 30B meridional transverse aberration diagrams with shake compensation for the rotational shake of 0.60° in the infinity photography state in the telephoto end state of the seventh example. It is clearly seen from the aberration diagrams that the zoom lens system ZL7 of the seventh example is well corrected for various aberrations in each of the focal length states from the wide-angle end state to the telephoto end state and has excellent imaging performance.

Eighth Example

Figure 31:
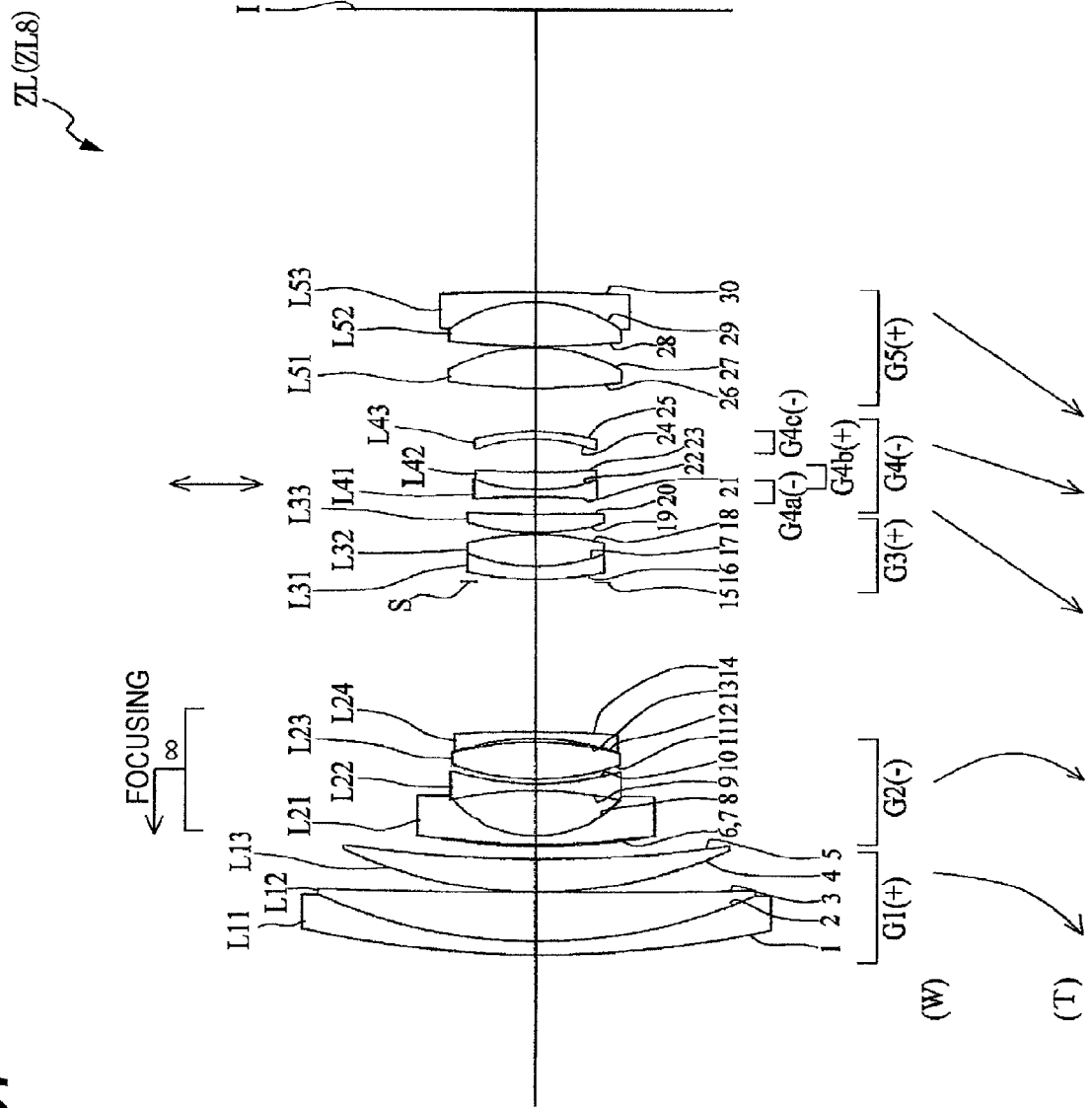
FIG. 31 is a sectional view showing a configuration of a zoom lens system according to the eighth example.

FIG. 31 is a drawing showing the configuration of the zoom lens system ZL8 according to the eighth example. In this zoom lens system ZL8 of FIG. 31, the first lens unit G1 is composed of the following lenses arranged in order from the object side: a cemented lens of a negative meniscus lens L11 with a convex surface on the object side and a positive meniscus lens L12 with a convex surface on the object side; and a positive meniscus lens L13 with a convex surface on the object side. The second lens unit G2 is composed of the following lenses arranged in order from the object side: a negative meniscus lens L21 with a convex surface on the object side; a biconcave lens L22; a biconvex lens L23; and a negative meniscus lens L24 with a concave surface on the object side; the negative meniscus lens L21 located nearest to the object side in the second lens unit G2 is a composite aspherical lens in which an aspherical surface is formed by laying a resin layer on the object-side lens surface.

The third lens unit G3 is composed of the following lenses arranged in order from the object side: a cemented lens of a negative meniscus lens L31 with a convex surface on the object side and a biconvex lens L32; and a positive meniscus lens L33 with a convex surface on the object side. The fourth lens unit G4 is composed of the following lenses arranged in order from the object side: a cemented lens of a biconcave lens L41 (4a lens G4a) and a positive meniscus lens L42 (4b lens G4b) with a convex surface on the object side; and a negative meniscus lens L43 (4c lens G4c) with a concave surface on the object side; the biconcave lens L41 (4a lens G4a) located nearest to the object side in the fourth lens unit G4 is a glass mold type aspherical lens in which the object-side glass lens surface is of an aspherical shape. The fifth lens unit G5 is composed of the following lenses arranged in order from the object side: a biconvex lens L51; and a cemented lens of a biconvex lens L52 and a negative meniscus lens L53 with a concave surface on the object side; the negative meniscus lens L53 located nearest to the image side in the fifth lens unit G5 is a glass mold type aspherical lens in which the image-side glass lens surface is of an aspherical shape.

In the eighth example, the fourth lens unit G4 is so configured that the cemented lens of the biconcave lens L41 (4a lens G4a) and the positive meniscus lens L42 (4b lens G4b) with the convex surface on the object side is moved so as to have a component in a direction orthogonal to the optical axis, thereby effecting compensation for the image position with occurrence of camera shake.

Since the anti-vibration compensation factor is 0.96 and the focal length is 18.4 (mm) in the wide-angle end state in the eighth example, the movement amount of the 4a lens G4a and the 4b lens G4b for compensation for the rotational deviation of 1.50° is 0.50 (mm). Since the anti-vibration compensation factor is 1.52 and the focal length is 102.5 (mm) in the telephoto end state in the eighth example, the movement amount of the 4a lens G4a and the 4b lens G4b for compensation for the rotational deviation of 0.60° is 0.71 (mm).

Table 29 below provides values of specifications in the eighth example.

TABLE 29

| s | r | d | ν | n |
|---|---|---|---|---|
| 1 | 106.5447 | 1.8000 | 23.78 | 1.846660 |
| 2 | 53.1328 | 6.6073 | 60.67 | 1.603112 |
| 3 | 929.6811 | 0.1000 | | |
| 4 | 45.1672 | 4.4150 | 55.52 | 1.696797 |
| 5 | 130.4132 | (d1) | | |
| *6 | 73.2062 | 0.2000 | 38.09 | 1.553890 |
| 7 | 69.9141 | 1.2500 | 42.72 | 1.834807 |
| 8 | 11.7817 | 6.0844 | | |
| 9 | −36.2230 | 1.0000 | 42.72 | 1.834807 |
| 10 | 29.7784 | 0.5926 | | |
| 11 | 24.7279 | 4.9966 | 23.78 | 1.846660 |
| 12 | −32.4638 | 0.4768 | | |
| 13 | −24.7636 | 1.0028 | 42.72 | 1.834807 |
| 14 | −123.4621 | (d2) | | |
| 15 | 0.0000 | 0.4000 | | |
| 16 | 35.2418 | 1.7500 | 23.78 | 1.846660 |

TABLE 29-continued

| 17 | 19.6378 | 4.3631 | 64.10 | 1.516800 |
|---|---|---|---|---|
| 18 | −26.4692 | 0.2000 | | |
| 19 | 22.6241 | 2.5093 | 82.52 | 1.497820 |
| 20 | 207.8965 | (d3) | | |
| *21 | −63.2652 | 1.0600 | 40.78 | 1.806100 |
| 22 | 20.6257 | 2.2933 | 23.78 | 1.846660 |
| 23 | 77.0490 | 4.6000 | | |
| 24 | −15.7754 | 1.0000 | 49.61 | 1.772500 |
| 25 | −24.3844 | (d4) | | |
| 26 | 69.9562 | 5.4301 | 64.03 | 1.516120 |
| 27 | −16.7732 | 0.2000 | | |
| 28 | 82.3696 | 5.9867 | 82.52 | 1.497820 |
| 29 | −14.7499 | 1.4000 | 40.94 | 1.806100 |
| *30 | −160.0000 | (BF) | | |

| | WE | MFL | TE |
|---|---|---|---|
| f = | 18.4~ | 60.6~ | 102.5 |
| FNO = | 3.6~ | 5.0~ | 5.8 |
| ω = | 38.7~ | 12.7~ | 7.6 |
| IH = | 14.0~ | 14.0~ | 14.0 |
| LLS = | 128.754~ | 157.913~ | 172.473 |
| Bf = | 38.400~ | 57.190~ | 66.380 |

[Focal Lengths of Respective Lens Units]

| LU | SS | FL |
|---|---|---|
| G1 | 1 | 77.677 |
| G2 | 6 | −12.500 |
| G3 | 15 | 22.182 |
| G4 | 21 | −25.000 |
| G5 | 26 | 32.805 |

In the eighth example, each lens surface of the sixth surface, the twenty first surface, and the thirtieth surface is formed in an aspherical shape. Table 30 below provides data of the aspherical surfaces, i.e., values of the conic constant κ and the aspherical constants A4-A10 thereof.

TABLE 30

| | κ | A4 | A6 | A8 | A10 |
|---|---|---|---|---|---|
| 6th surface | −38.5232 | 2.34900E−05 | −9.72290E−08 | 2.52500E−10 | −3.95910E−13 |
| 21st surface | −2.3286 | 3.73530E−06 | −1.34160E−08 | 0.00000E+00 | 0.00000E+00 |
| 30th surface | 0.3410 | 7.31970E−07 | 5.79300E−09 | −2.89660E−10 | 4.51210E−13 |

In the eighth example, the following spaces vary during zooming: axial air space d1 between the first lens unit G1 and the second lens unit G2; axial air space d2 between the second lens unit G2 and the third lens unit G3; axial air space d3 between the third lens unit G3 and the fourth lens unit G4; axial air space d4 between the fourth lens unit G4 and the fifth lens unit G5. Table 31 below provides the varying spaces at respective focal lengths in the wide-angle end state, in an intermediate focal length state, and in the telephoto end state.

TABLE 31

| | WE | MFL | TE |
|---|---|---|---|
| d1 | 1.797 | 25.651 | 35.025 |
| d2 | 20.489 | 7.005 | 3.000 |
| d3 | 2.400 | 6.587 | 7.350 |
| d4 | 5.950 | 1.763 | 1.000 |

Table 32 below shows values corresponding to the respective condition expressions in this eighth example.

TABLE 32

(1) ((1/r4BR2) × (−f4)) = 0.324
(2) (−f4/fw345) = 0.814
(3) (d34t − d34w)/fw345 = 0.161
(4) (d45w − d45t)/fw345 = 0.161
(5) ((1/r4AR2) × (−f4)) = 1.212
(6) ((1/r4BR1) × (−f4)) = 1.212
(7) (N4B − N4A) = 0.041
(8) (v4A − v4B) = 17.000

Figure 32A:
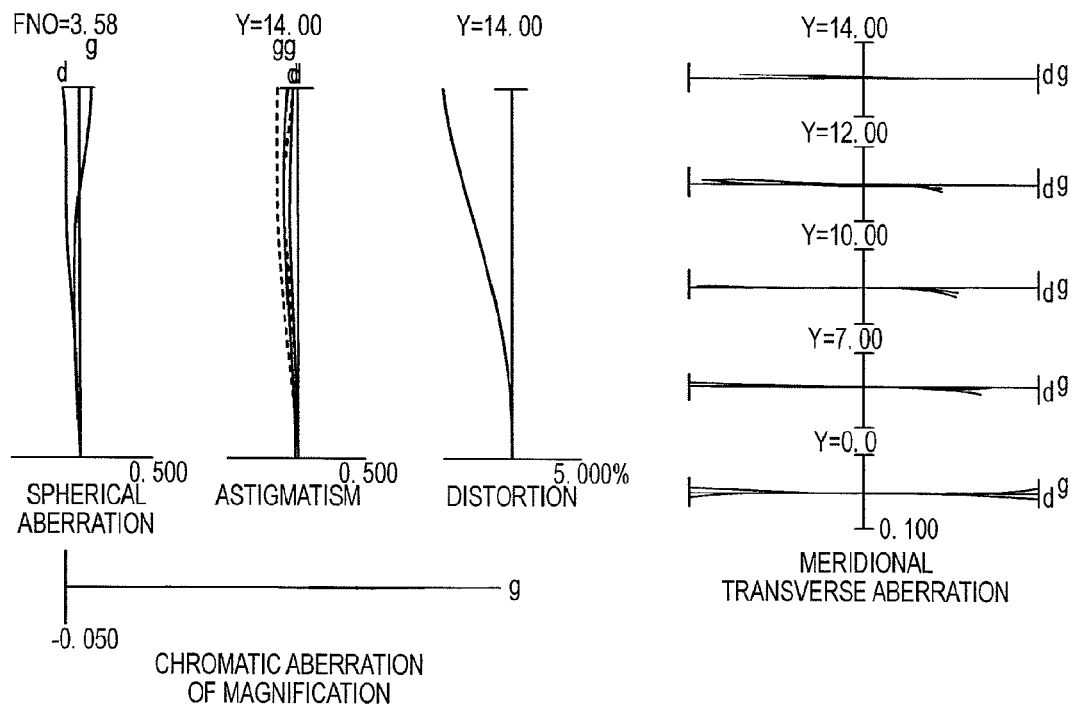
FIG. 32A is various aberration diagrams in the infinity in-focus state of the eighth example, which are those in the wide-angle end state.
Figure 32B:
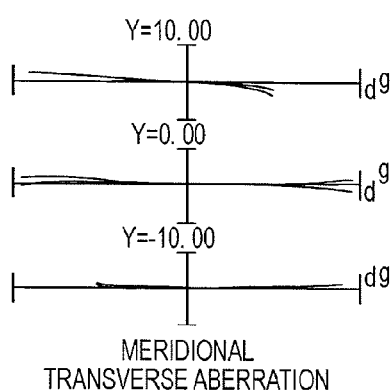
FIG. 32B is various aberration diagrams in the infinity in-focus state of the eighth example, which are meridional transverse aberration diagrams with shake compensation for rotational shake of 1.50° in the infinity photography state in the wide-angle end state.
Figure 33:
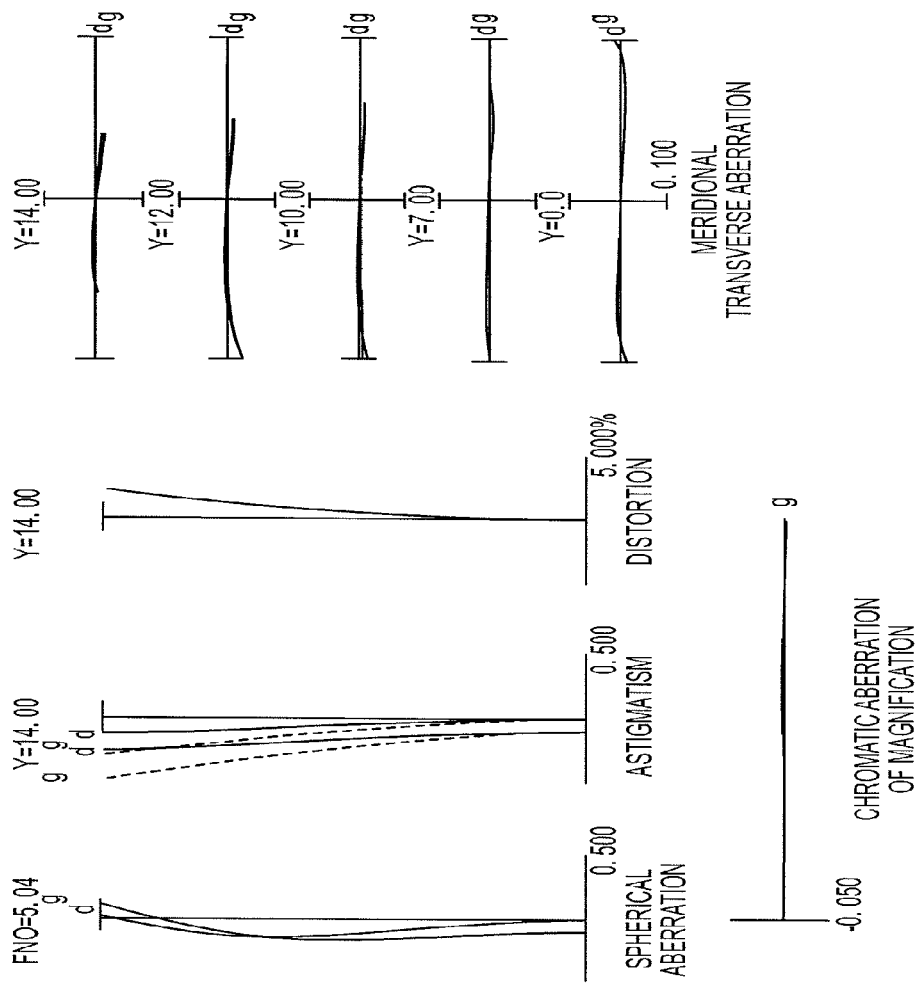
FIG. 33 is aberration diagrams in the infinity in-focus state in an intermediate focal length state of the eighth example.
Figure 34A:
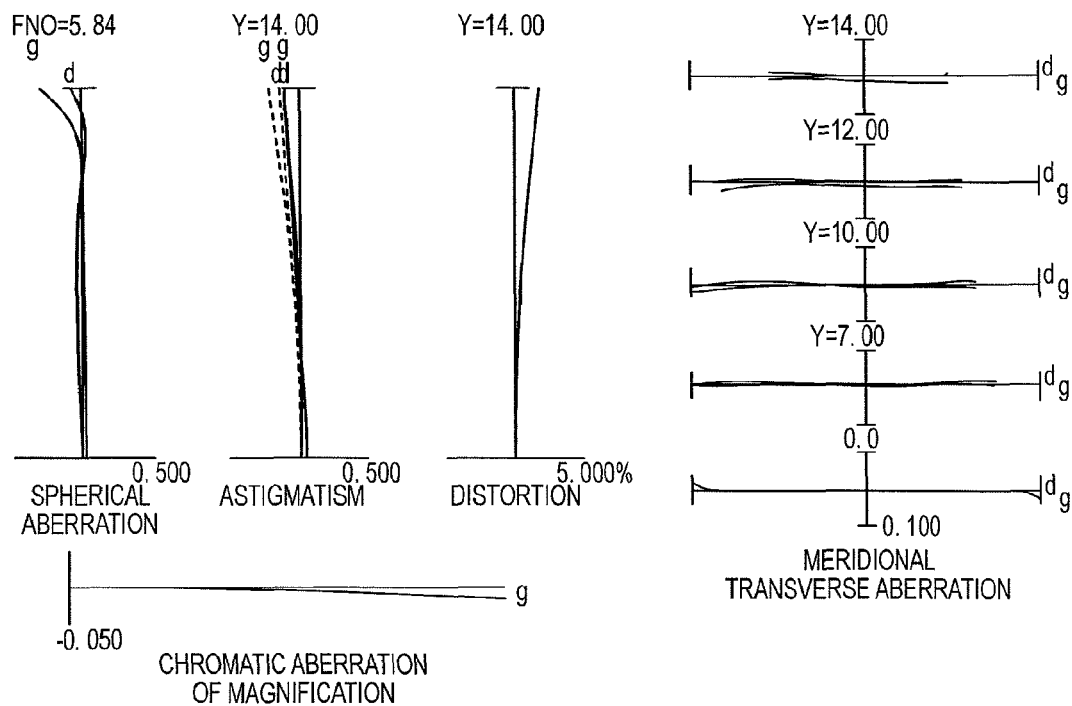
FIG. 34A is various aberration diagrams in the infinity in-focus state of the eighth example, which are those in the telephoto end state.
Figure 34B:
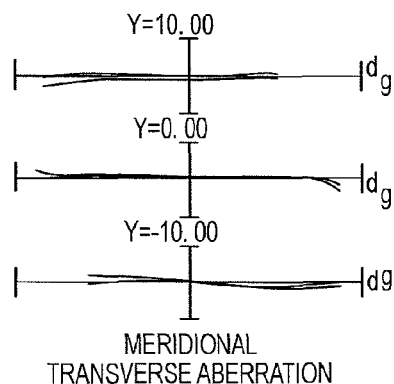
FIG. 34B is various aberration diagrams in the infinity in-focus state of the eighth example, which are meridional transverse aberration diagrams with shake compensation for rotational shake of 0.60° in the infinity photography state in the telephoto end state.

FIG. 32A shows aberration diagrams in the infinity in-focus state in the wide-angle end state of the eighth example, FIG. 33 aberration diagrams in the infinity in-focus state in the intermediate focal length state, and FIG. 34A aberration diagrams in the infinity in-focus state in the telephoto end state. FIG. 32B shows meridional transverse aberration diagrams with shake compensation for the rotational shake of 1.50° in the infinity photography state in the wide-angle end state of the eighth example, and FIG. 34B meridional transverse aberration diagrams with shake compensation for the rotational shake of 0.60° in the infinity photography state in the telephoto end state of the eighth example. It is clearly seen from the aberration diagrams that the zoom lens system ZL8 of the eighth example is well corrected for various aberrations in each of the focal length states from the wide-angle end state to the telephoto end state and has excellent imaging performance.

Ninth Example

Figure 35:
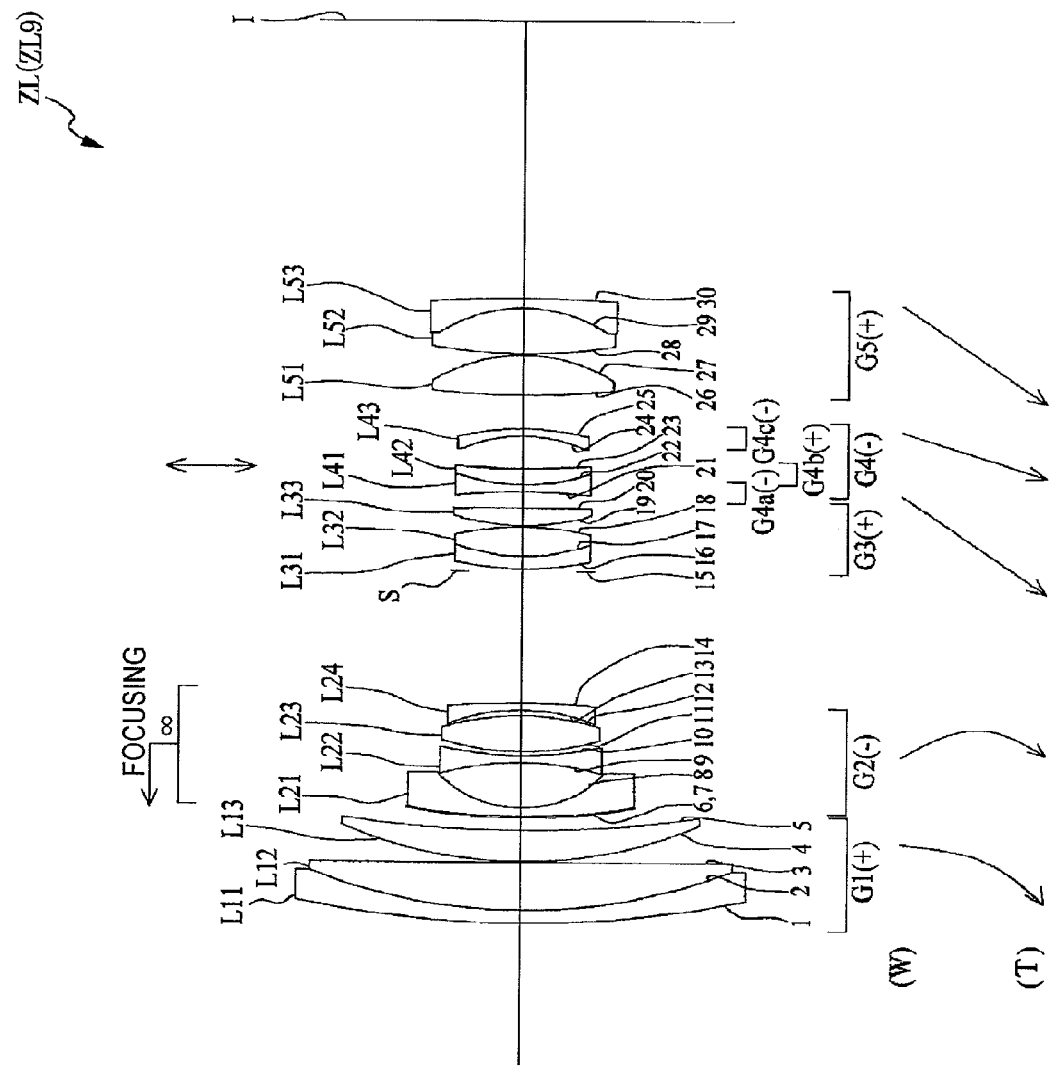
FIG. 35 is a sectional view showing a configuration of a zoom lens system according to the ninth example.

FIG. 35 is a drawing showing the configuration of the zoom lens system ZL9 according to the ninth example. In this zoom lens system ZL9 of FIG. 35, the first lens unit G1 is composed of the following lenses arranged in order from the object side: a cemented lens of a negative meniscus lens L11 with a convex surface on the object side and a positive meniscus lens L12 with a convex surface on the object side; and a positive meniscus lens L13 with a convex surface on the object side. The second lens unit G2 is composed of the following lenses arranged in order from the object side: a negative meniscus lens L21 with a convex surface on the object side; a biconcave lens L22; a biconvex lens L23; and a negative meniscus lens L24 with a concave surface on the object side; the negative meniscus lens L21 located nearest to the object side in the second lens unit G2 is a composite aspherical lens in which an aspherical surface is formed by laying a resin layer on the object-side lens surface.

The third lens unit G3 is composed of the following lenses arranged in order from the object side: a cemented lens of a negative meniscus lens L31 with a convex surface on the object side and a biconvex lens L32; and a biconvex lens L33. The fourth lens unit G4 is composed of the following lenses arranged in order from the object side: a cemented lens of a biconcave lens L41 (4a lens G4a) and a positive meniscus lens L42 (4b lens G4b) with a convex surface on the object side; and a negative meniscus lens L43 (4c lens G4c) with a concave surface on the object side; the biconcave lens L41 (4a lens G4a) located nearest to the object side in the fourth lens unit G4 is a glass mold type aspherical lens in which the object-side lens surface is of an aspherical shape. The fifth lens unit G5 is composed of the following lenses arranged in order from the object side: a biconvex lens L51; and a cemented lens of a biconvex lens L52 and a negative meniscus lens L53 with a concave surface on the object side; the biconvex lens L51 located nearest to the object side in the fifth lens unit G5 is a glass mold type aspherical lens in which the image-side lens surface is of an aspherical shape.

In the ninth example, the fourth lens unit G4 is so configured that the cemented lens of the biconcave lens L41 (4a lens G4a) and the positive meniscus lens L42 (4b lens G4b) with the convex surface on the object side is moved so as to have a component in a direction orthogonal to the optical axis, thereby effecting compensation for the image position with occurrence of camera shake.

Since the anti-vibration compensation factor is 0.96 and the focal length is 18.4 (mm) in the wide-angle end state in the ninth example, the movement amount of the 4a lens G4a and the 4b lens G4b for compensation for the rotational deviation of 1.50° is 0.50 (mm). Since the anti-vibration compensation factor is 1.69 and the focal length is 131.2 (mm) in the telephoto end state in the ninth example, the movement amount of the 4a lens G4a and the 4b lens G4b for compensation for the rotational deviation of 0.60° is 0.81 (mm).

Table 33 below provides values of specifications in the ninth example.

TABLE 33

| s | r | d | ν | n |
|---|---|---|---|---|
| 1 | 112.1569 | 1.8000 | 23.78 | 1.846660 |
| 2 | 58.9628 | 6.8193 | 65.36 | 1.603576 |
| 3 | 134933.2300 | 0.1000 | | |
| 4 | 46.6226 | 4.4150 | 58.17 | 1.656160 |
| 5 | 126.2737 | (d1) | | |
| *6 | 79.1072 | 0.2000 | 38.09 | 1.553890 |
| 7 | 65.0000 | 1.2500 | 41.28 | 1.833557 |
| 8 | 12.4412 | 6.3645 | | |
| 9 | −30.7007 | 1.0000 | 37.30 | 1.832041 |
| 10 | 37.1726 | 0.5656 | | |
| 11 | 28.6372 | 5.0654 | 21.89 | 1.851566 |
| 12 | −27.5478 | 0.8229 | | |
| 13 | −19.8405 | 1.0028 | 42.62 | 1.833884 |
| 14 | −83.9641 | (d2) | | |
| 15 | 0.0000 | 0.4000 | | |
| 16 | 33.4879 | 1.7500 | 23.78 | 1.846660 |
| 17 | 19.6805 | 4.1226 | 69.81 | 1.520350 |
| 18 | −30.3359 | 0.2000 | | |
| 19 | 24.3031 | 2.5692 | 82.50 | 1.498000 |
| 20 | −507.4183 | (d3) | | |
| *21 | −63.2689 | 1.0600 | 42.51 | 1.834032 |
| 22 | 21.8379 | 2.3208 | 23.80 | 1.846000 |
| 23 | 90.2702 | 4.6000 | | |
| 24 | −15.3335 | 1.0000 | 54.66 | 1.729157 |
| 25 | −27.1645 | (d4) | | |
| 26 | 97.9379 | 5.6102 | 63.18 | 1.536981 |
| *27 | −16.7260 | 0.2000 | | |
| 28 | 54.2066 | 6.4592 | 64.41 | 1.513811 |
| 29 | −15.9610 | 1.4000 | 35.86 | 1.837905 |
| 30 | −160.0000 | (Bf) | | |

| | WE | MFL | TE |
|---|---|---|---|
| f = | 18.4~ | 56.3~ | 131.2 |
| FNO = | 3.7 | 5.1~ | 5.8 |
| ω = | 38.7~ | 13.7~ | 6.0 |
| IH = | 14.0~ | 14.0~ | 14.0 |
| LLS = | 127.748~ | 159.282~ | 185.685 |
| Bf = | 39.272~ | 60.150~ | 77.217 |

[Focal Lengths of Respective Lens Units]

| LU | SS | FL |
|---|---|---|
| G1 | 1 | 80.846 |
| G2 | 6 | −12.289 |
| G1 | 15 | 21.900 |
| G2 | 21 | −22.542 |
| G3 | 26 | 29.108 |

In the ninth example, each lens surface of the sixth surface, the twenty first surface, and the twenty seventh surface is formed in an aspherical shape. Table 34 below provides data of the aspherical surfaces, i.e., values of the conic constant κ and the aspherical constants A4-A10 thereof.

TABLE 34

| | κ | A4 | A6 | A8 | A10 |
|---|---|---|---|---|---|
| 6th surface | 24.8303 | 9.11840E−06 | −6.69300E−08 | 1.74540E−10 | −5.56370E−13 |
| 21st surface | −0.4549 | 4.72520E−06 | −8.61830E−09 | 0.00000E+00 | 0.00000E+00 |
| 27th surface | 0.3588 | −4.67110E−07 | −1.27860E−09 | −1.10550E−10 | −8.78330E−14 |

In the ninth example, the following spaces vary during zooming: axial air space d1 between the first lens unit G1 and the second lens unit G2; axial air space d2 between the second lens unit G2 and the third lens unit G3; axial air space d3 between the third lens unit G3 and the fourth lens unit G4; axial air space d4 between the fourth lens unit G4 and the fifth lens unit G5. Table 35 below provides the varying spaces at respective focal lengths in the wide-angle end state, in an intermediate focal length state, and in the telephoto end state.

TABLE 35

| | WE | MFL | TE |
|---|---|---|---|
| d1 | 1.749 | 24.474 | 39.858 |
| d2 | 18.616 | 6.547 | 0.500 |
| d3 | 2.200 | 5.386 | 6.213 |
| d4 | 4.813 | 1.627 | 0.800 |

Table 36 below shows values corresponding to the respective condition expressions in this ninth example.

TABLE 36

| |
|---|
| (1)((1/r4BR2) × (−f4)) = 0.250 |
| (2)(−f4/fw345) = 0.751 |
| (3)(d34t − d34w)/fw345 = 0.134 |
| (4)(d45w − d45t)/fw345 = 0.134 |
| (5)((1/r4AR2) × (−f4)) = 1.032 |
| (6)((1/r4BR1) × (−f4)) = 1.032 |
| (7)(N4B − N4A) = 0.012 |
| (8)(ν4A − ν4B) = 18.710 |

Figure 36A:
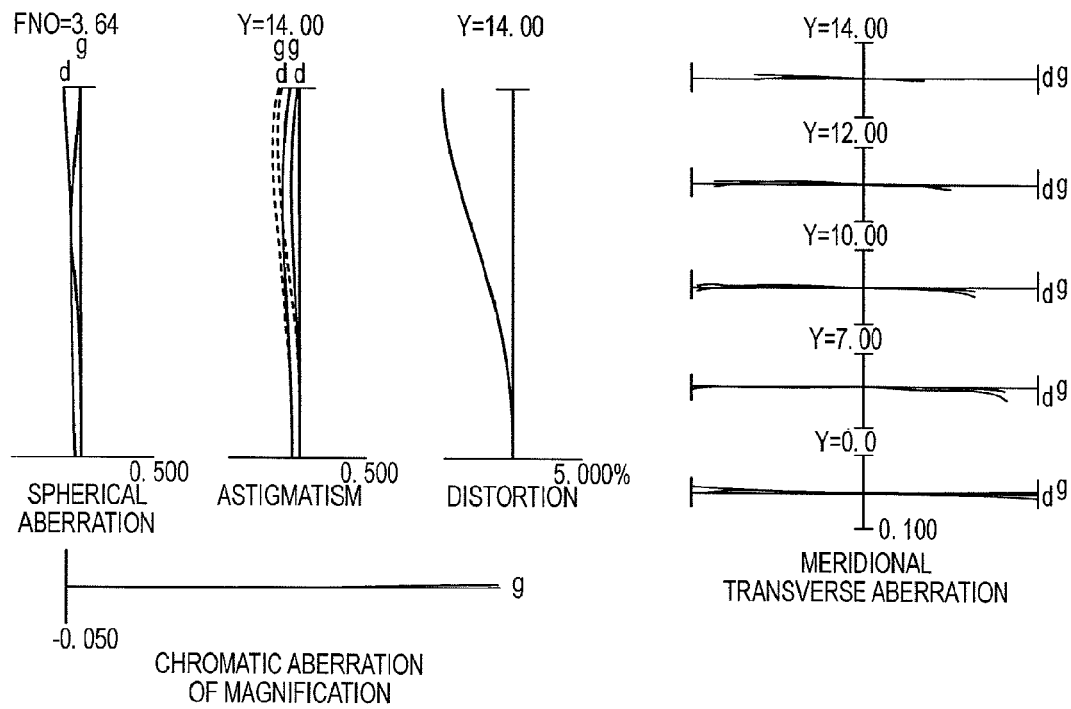
FIG. 36A is various aberration diagrams in the infinity in-focus state of the ninth example, which are those in the wide-angle end state.
Figure 36B:
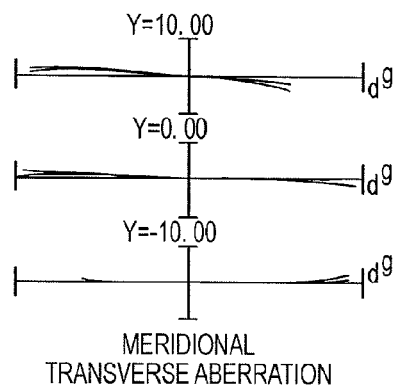
FIG. 36B is various aberration diagrams in the infinity in-focus state of the ninth example, which are meridional transverse aberration diagrams with shake compensation for rotational shake of 1.50° in the infinity photography state in the wide-angle end state.
Figure 37:
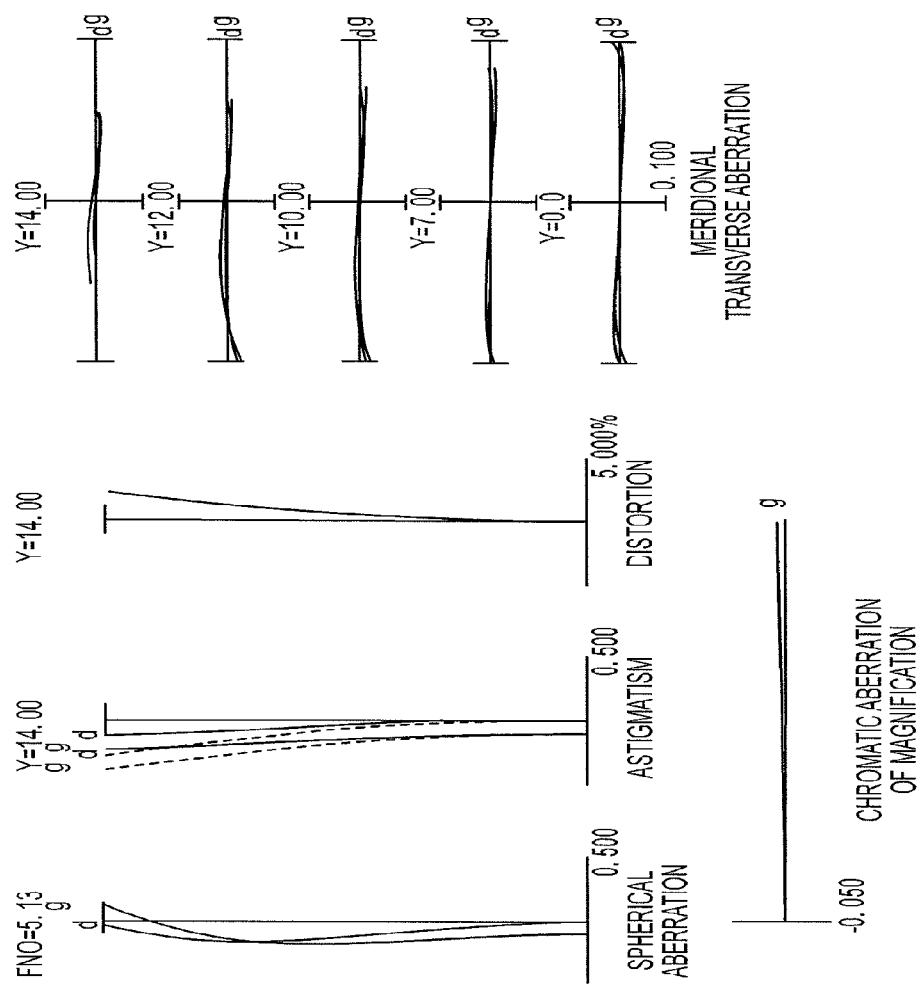
FIG. 37 is aberration diagrams in the infinity in-focus state in an intermediate focal length state of the ninth example.
Figure 38A:
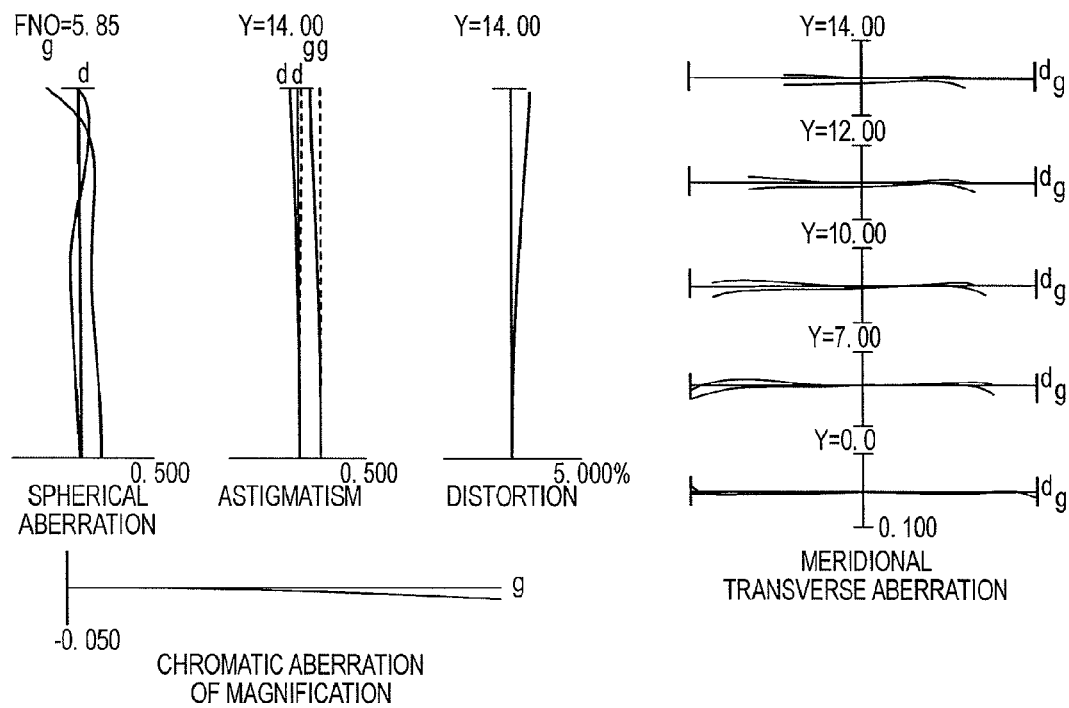
FIG. 38A is various aberration diagrams in the infinity in-focus state of the ninth example, which are those in the telephoto end state.
Figure 38B:
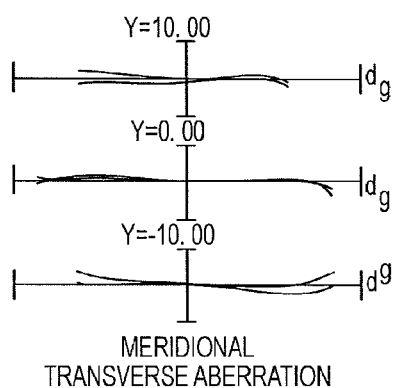
FIG. 38B is various aberration diagrams in the infinity in-focus state of the ninth example, which are meridional transverse aberration diagrams with shake compensation for rotational shake of 0.60° in the infinity photography state in the telephoto end state.

FIG. 36A shows aberration diagrams in the infinity in-focus state in the wide-angle end state of the ninth example, FIG. 37 aberration diagrams in the infinity in-focus state in the intermediate focal length state, and FIG. 38A aberration diagrams in the infinity in-focus state in the telephoto end state. FIG. 36B shows meridional transverse aberration diagrams with shake compensation for the rotational shake of 1.50° in the infinity photography state in the wide-angle end state of the ninth example, and FIG. 38B meridional transverse aberration diagrams with shake compensation for the rotational shake of 0.60° in the infinity photography state in the telephoto end state of the ninth example. It is clearly seen from the aberration diagrams that the zoom lens system ZL9 of the ninth example is well corrected for various aberrations in each of the focal length states from the wide-angle end state to the telephoto end state and has excellent imaging performance.

Tenth Example

Figure 39:
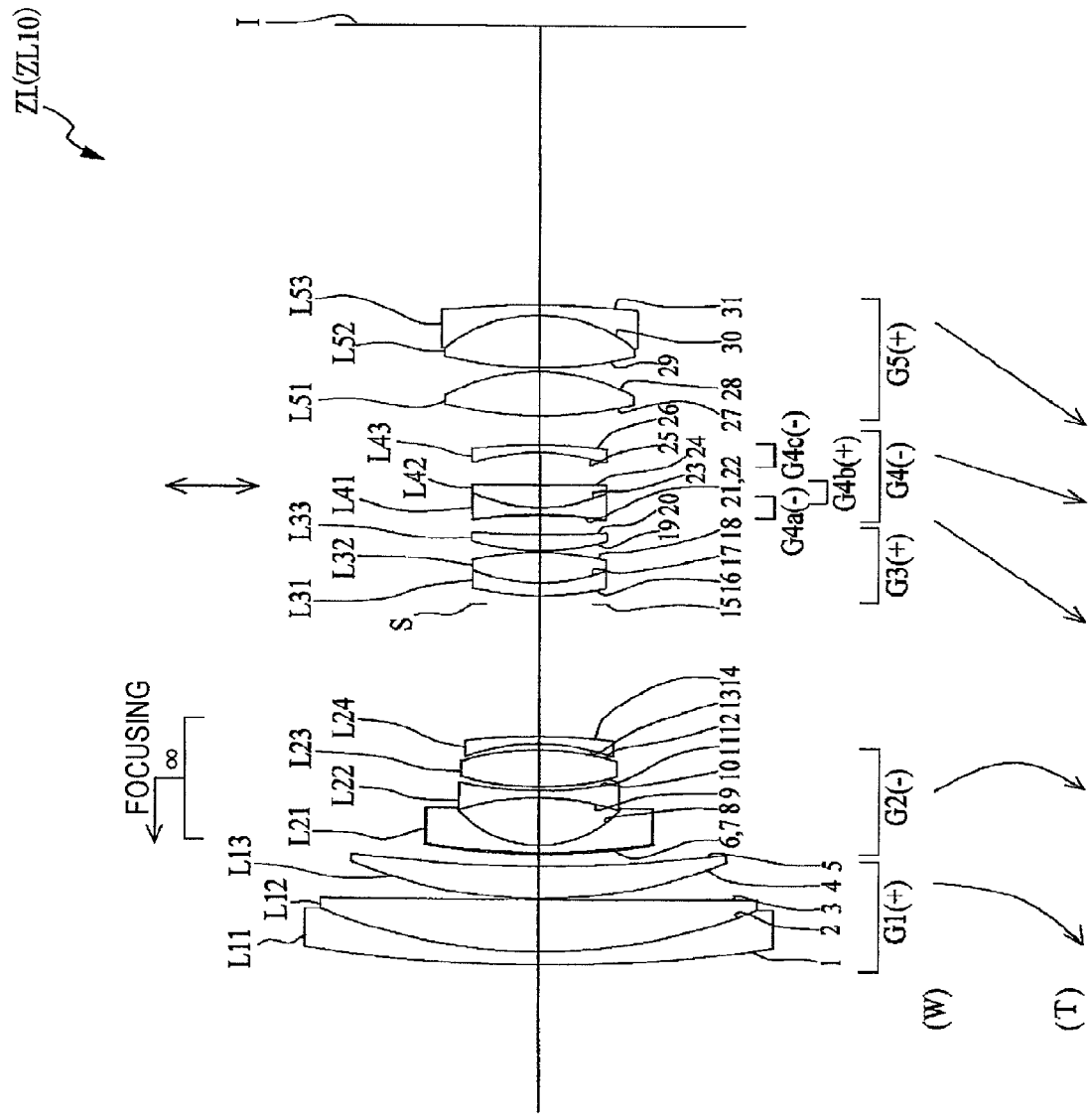
FIG. 39 is a sectional view showing a configuration of a zoom lens system according to the tenth example.

FIG. 39 is a drawing showing the configuration of the zoom lens system ZL10 according to the tenth example. In this zoom lens system ZL10 of FIG. 39, the first lens unit G1 is composed of the following lenses arranged in order from the object side: a cemented lens of a negative meniscus lens L11 with a convex surface on the object side and a positive meniscus lens L12 with a convex surface on the object side; and a positive meniscus lens L13 with a convex surface on the object side. The second lens unit G2 is composed of the following lenses arranged in order from the object side: a negative meniscus lens L21 with a convex surface on the object side; a biconcave lens L22; a biconvex lens L23; and a negative meniscus lens L24 with a concave surface on the object side; the negative meniscus lens L21 located nearest to the object side in the second lens unit G2 is a composite aspherical lens in which an aspherical surface is formed by laying a resin layer on the object-side lens surface.

The third lens unit G3 is composed of the following lenses arranged in order from the object side: a cemented lens of a negative meniscus lens L31 with a convex surface on the object side and a biconvex lens L32; and a positive meniscus lens L33 with a convex surface on the object side. The fourth lens unit G4 is composed of the following lenses arranged in order from the object side: a cemented lens of a biconcave lens L41 (4a lens G4a) and a positive meniscus lens L42 (4b lens G4b) with a convex surface on the object side; and a negative meniscus lens L43 (4c lens G4c) with a concave surface on the object side; the biconcave lens L41 (4a lens G4a) located nearest to the object side in the fourth lens unit G4 is a composite aspherical lens in which an aspherical surface is formed by laying a resin layer on the object-side lens surface. The fifth lens unit G5 is composed of the following lenses arranged in order from the object side: a biconvex lens L51; and a cemented lens of a biconvex lens L52 and a negative meniscus lens L53 with a concave surface on the object side; the negative meniscus lens L53 located nearest to the image side in the fifth lens unit G5 is a glass mold type aspherical lens in which the image-side lens surface is of an aspherical shape.

In the tenth example, the fourth lens unit G4 is so configured that the cemented lens of the biconcave lens L41 (4a lens G4a) and the positive meniscus lens L42 (4b lens G4b) with the convex surface on the object side is moved so as to have a component in a direction orthogonal to the optical axis, thereby effecting compensation for the image position with occurrence of camera shake.

Since the anti-vibration compensation factor is 1.01 and the focal length is 16.4 (mm) in the wide-angle end state in the tenth example, the movement amount of the 4a lens G4a and the 4b lens G4b for compensation for the rotational deviation of 1.50° is 0.43 (mm). Since the anti-vibration compensation factor is 1.81 and the focal length is 102.0 (mm) in the telephoto end state in the tenth example, the movement amount of the 4a lens G4a and the 4b lens G4b for compensation for the rotational deviation of 0.60° is 0.59 (mm).

Table 37 below provides values of specifications in the tenth example.

TABLE 37

| s | r | d | ν | n |
|---|---|---|---|---|
| 1 | 153.8859 | 1.8000 | 23.78 | 1.846660 |
| 2 | 57.0964 | 7.0870 | 61.28 | 1.630009 |
| 3 | 3646.5256 | 0.1000 | | |
| 4 | 48.8123 | 4.4150 | 46.65 | 1.815470 |
| 5 | 138.1872 | (d1) | | |
| *6 | 99.0907 | 0.2000 | 38.09 | 1.553890 |
| 7 | 69.8084 | 1.0000 | 44.24 | 1.825495 |
| 8 | 11.3523 | 6.3636 | | |
| 9 | −26.7608 | 1.0000 | 42.60 | 1.834000 |
| 10 | 37.8660 | 0.5309 | | |

TABLE 37-continued

| | | | | |
|---|---|---|---|---|
| 11 | 29.7415 | 5.0776 | 22.93 | 1.848386 |
| 12 | −24.9665 | 0.8398 | | |
| 13 | −20.4861 | 1.0028 | 37.93 | 1.832305 |
| 14 | −62.1035 | (d2) | | |
| 15 | 0.0000 | 1.1000 | | |
| 16 | 28.8737 | 1.7500 | 23.78 | 1.846660 |
| 17 | 17.2050 | 4.1402 | 59.42 | 1.519000 |
| 18 | −28.5208 | 0.2000 | | |
| 19 | 22.7031 | 2.3510 | 82.49 | 1.498000 |
| 20 | 150.0469 | (d3) | | |
| *21 | −41.4874 | 0.1500 | 38.09 | 1.553890 |
| 22 | −36.4874 | 1.0000 | 37.16 | 1.834000 |
| 23 | 15.4285 | 3.0254 | 25.43 | 1.805181 |
| 24 | 480.3477 | 4.5000 | | |
| 25 | −19.6899 | 1.0000 | 40.29 | 1.820865 |
| 26 | −51.7953 | (d4) | | |
| 27 | 39.2092 | 5.9232 | 69.65 | 1.494313 |
| 28 | −19.8633 | 0.6672 | | |
| 29 | 41.5729 | 7.0735 | 70.41 | 1.487490 |
| 30 | −15.2714 | 1.4000 | 40.78 | 1.806100 |
| *31 | −67.9910 | (Bf) | | |

| | WE | MFL | TE |
|---|---|---|---|
| f = | 16.4~ | 55.0~ | 102.0 |
| FNO = | 3.6~ | 5.1~ | 5.8 |
| ω = | 42.0~ | 13.9~ | 7.7 |
| IH = | 14.0~ | 14.0~ | 14.0 |
| LLS = | 128.338~ | 164.176~ | 186.292 |
| Bf = | 38.199~ | 62.873~ | 78.620 |

[Focal Lengths of Respective Lens Units]

| LU | SS | FL |
|---|---|---|
| G1 | 1 | 80.125 |
| G2 | 6 | −12.100 |
| G1 | 15 | 21.900 |
| G2 | 21 | −18.488 |
| G3 | 27 | 24.700 |

In the tenth example, each lens surface of the sixth surface, the twenty first surface, and the thirty first surface is formed in an aspherical shape. Table 38 below provides data of the aspherical surfaces, i.e., values of the conic constant κ and the aspherical constants A4-A10 thereof.

TABLE 38

| | κ | A4 | A6 | A8 | A10 |
|---|---|---|---|---|---|
| 6th surface | −157.1928 | 4.52590E−05 | −2.08030E−07 | 7.04390E−10 | −1.27000E−12 |
| 21st surface | 9.3216 | 3.11160E−05 | 3.26730E−08 | 0.00000E+00 | 0.00000E+00 |
| 31st surface | −1.2227 | 1.38530E−05 | 6.33000E−09 | −1.41840E−10 | 1.56520E−13 |

In the tenth example, the following spaces vary during zooming: axial air space d1 between the first lens unit G1 and the second lens unit G2; axial air space d2 between the second lens unit G2 and the third lens unit G3; axial air space d3 between the third lens unit G3 and the fourth lens unit G4; axial air space d4 between the fourth lens unit G4 and the fifth lens unit G5. Table 39 below provides the varying spaces at respective focal lengths in the wide-angle end state, in an intermediate focal length state, and in the telephoto end state.

TABLE 39

| | WE | MFL | TE |
|---|---|---|---|
| d1 | 1.709 | 26.331 | 37.251 |
| d2 | 18.207 | 4.749 | 0.200 |
| d3 | 2.525 | 5.050 | 5.525 |
| d4 | 4.000 | 1.475 | 1.000 |

Table 40 below shows values corresponding to the respective condition expressions in this tenth example.

TABLE 40

| |
|---|
| (1)((1/r4BR2) × (−f4)) = 0.038 |
| (2)(−f4/fw345) = 0.596 |
| (3)(d34t − d34w)/fw345 = 0.097 |
| (4)(d45w − d45t)/fw345 = 0.097 |
| (5)((1/r4AR2) × (−f4)) = 1.198 |
| (6)((1/r4BR1) × (−f4)) = 1.198 |
| (7)(N4B − N4A) = −0.029 |
| (8)(ν4A − ν4B) = 11.730 |

Figure 40A:
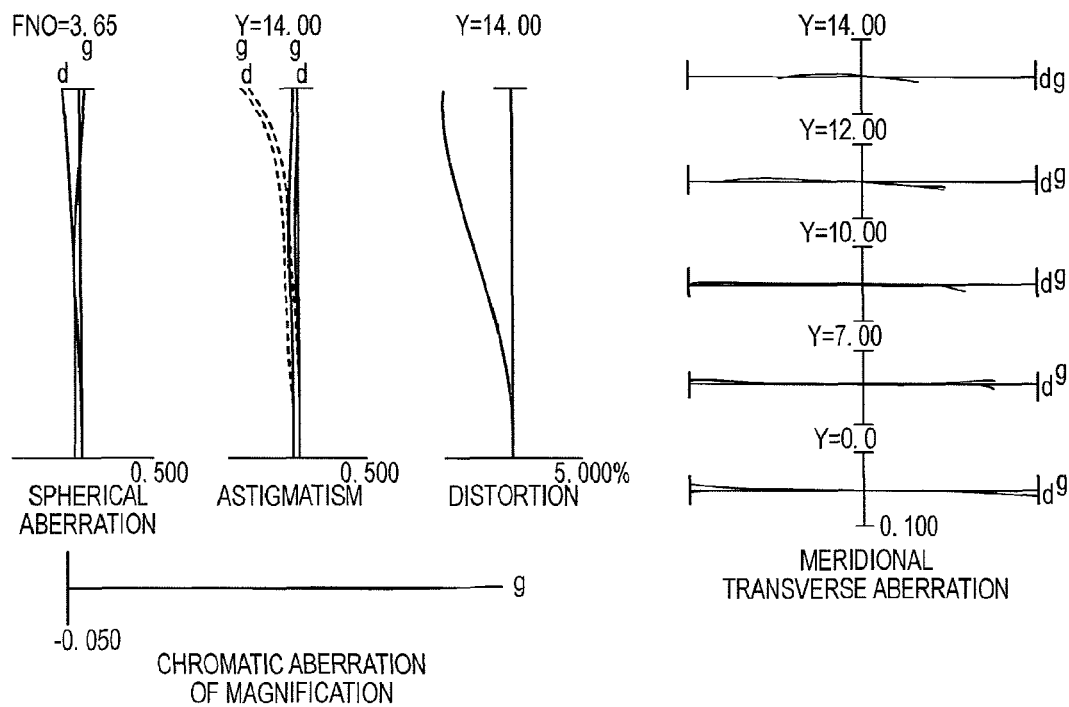
FIG. 40A is various aberration diagrams in the infinity in-focus state of the tenth example, which are those in the wide-angle end state.
Figure 40B:
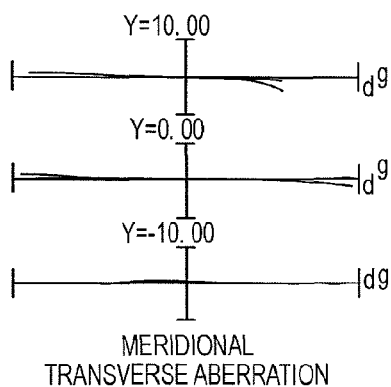
FIG. 40B is various aberration diagrams in the infinity in-focus state of the tenth example, which are meridional transverse aberration diagrams with shake compensation for rotational shake of 1.50° in the infinity photography state in the wide-angle end state.
Figure 41:
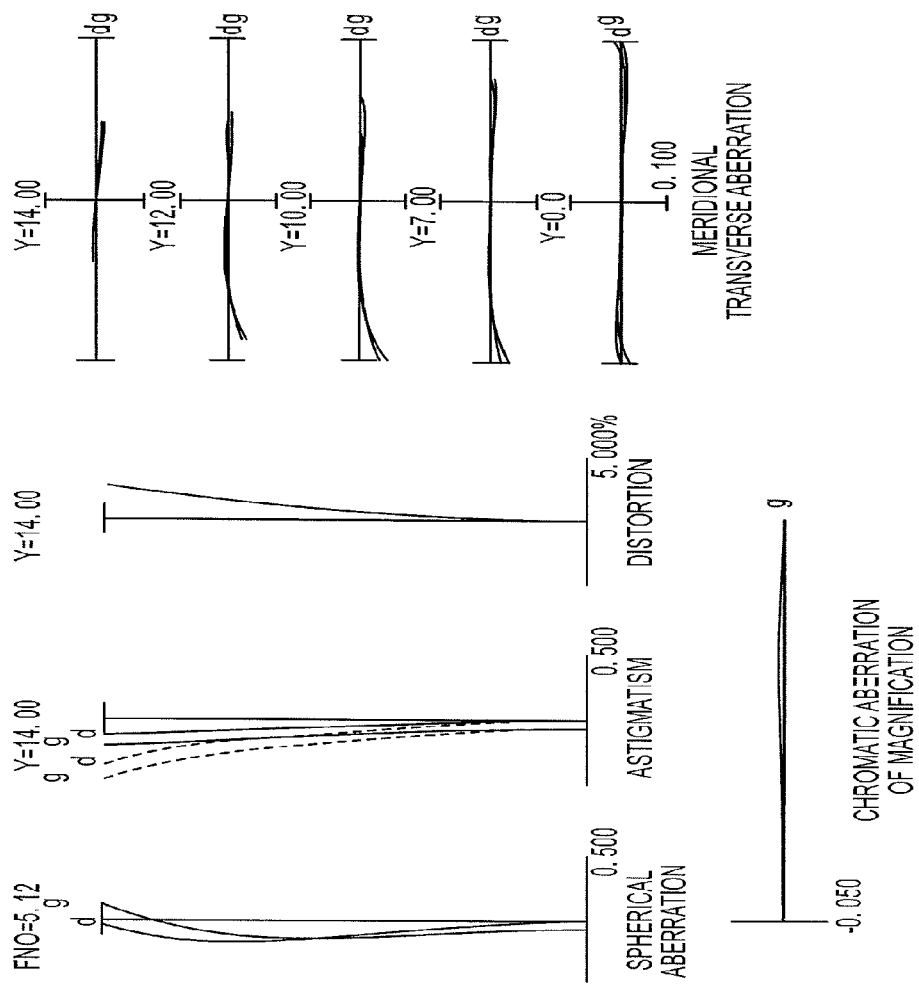
FIG. 41 is aberration diagrams in the infinity in-focus state in an intermediate focal length state of the tenth example.
Figure 42A:
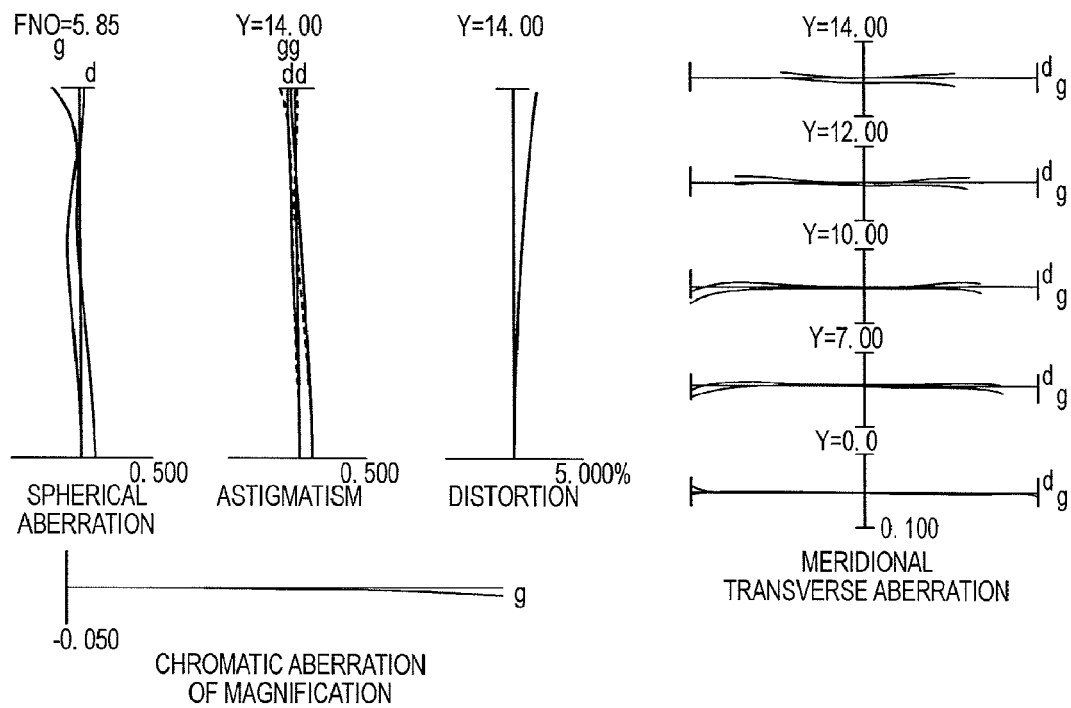
FIG. 42A is various aberration diagrams in the infinity in-focus state of the tenth example, which are those in the telephoto end state.
Figure 42B:
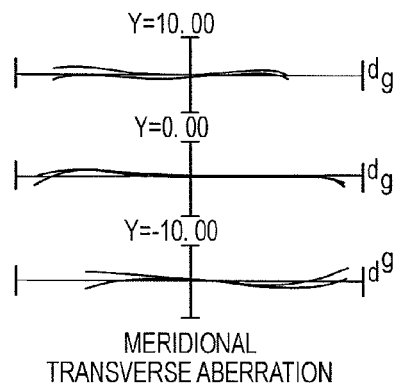
FIG. 42B is various aberration diagrams in the infinity in-focus state of the tenth example, which are meridional transverse aberration diagrams with shake compensation for rotational shake of 0.60° in the infinity photography state in the telephoto end state.

FIG. 40A shows aberration diagrams in the infinity in-focus state in the wide-angle end state of the tenth example, FIG. 41 aberration diagrams in the infinity in-focus state in the intermediate focal length state, and FIG. 42A aberration diagrams in the infinity in-focus state in the telephoto end state. FIG. 40B shows meridional transverse aberration diagrams with shake compensation for the rotational shake of 1.50° in the infinity photography state in the wide-angle end state of the tenth example, and FIG. 42B meridional transverse aberration diagrams with shake compensation for the rotational shake of 0.60° in the infinity photography state in the telephoto end state of the tenth example. It is clearly seen from the aberration diagrams that the zoom lens system ZL10 of the tenth example is well corrected for various aberrations in each focal length state from the wide-angle end state to the telephoto end state and has excellent imaging performance.

The invention is not limited to the foregoing embodiments but various changes and modifications of its components may be made without departing from the scope of the present invention. Also, the components disclosed in the embodiments may be assembled in any combination for embodying the present invention. For example, some of the components may be omitted from all components disclosed in the embodiments. Further, components in different embodiments may be appropriately combined.

What is claimed is:

1. A zoom lens system comprising a front lens group and a rear lens group arranged along an optical axis and in order from an object side, wherein the rear lens group comprises:
a first lens unit having a positive refracting power;
a second lens unit having a negative refracting power; and
a third lens unit having a positive refracting power,
wherein upon zooming from a wide-angle end state to a telephoto end state, a space between the front lens group and the first lens unit varies, a space between the first lens unit and the second lens unit increases from d12w to d12t, and a space between the second lens unit and the third lens unit decreases from d23w to d23t,
wherein the second lens unit comprises the following units arranged in order from the object side:
a 2a partial lens unit having a negative refracting power; and
a 2b partial lens unit having a negative refracting power,
wherein either the 2a partial lens unit or the 2b partial lens unit is movable so as to have a component in a direction perpendicular to the optical axis, the zoom lens system satisfying conditions of the following expressions:

$$0.002 < (d12t - d12w)/BL < 0.110, \text{ and}$$

$$0.002 < (d23w - d23t)/BL < 0.090,$$

where $BL = fw123 \times (1 - \beta w123)$, and
where $fw123$ is a composite focal length of the first lens unit, the second lens unit, and the third lens unit in the wide-angle end state and $\beta w123$ is a composite magnification of the first lens unit, the second lens unit, and the third lens unit in the wide-angle end state.

2. The zoom lens system according to claim 1, satisfying a condition of the following expression:

$$0.300 < |\Delta x1|/BL < 1.000,$$

where $BL = fw123 \times (1 - \beta w123)$, and
where $\Delta x1$ is a moving distance of the first lens unit relative to an image plane upon zooming from the wide-angle end state to the telephoto end state, $fw123$ is the composite focal length of the first lens unit, the second lens unit, and the third lens unit in the wide-angle end state, and $\beta w123$ is the composite magnification of the first lens unit, the second lens unit, and the third lens unit in the wide-angle end state.

3. The zoom lens system according to claim 1, satisfying a condition of the following expression:

$$0.050 < (-f2)/BL < 0.900,$$

where $BL = fw123 \times (1 - \beta w123)$, and
where $f2$ is a focal length of the second lens unit, $fw123$ is the composite focal length of the first lens unit, the second lens unit, and the third lens unit in the wide-angle end state, and $\beta w123$ is the composite magnification of the first lens unit, the second lens unit, and the third lens unit in the wide-angle end state.

4. The zoom lens system according to claim 1, satisfying a condition of the following expression:

$$-0.002 < (d23w - d23t)/BL < 0.065.$$

5. The zoom lens system according to claim 1, wherein at least one of the second lens unit and the third lens unit comprises at least one aspherical surface.

6. An optical device comprising the zoom lens system as set forth in claim 1.

7. A method of manufacturing a zoom lens system, comprising:
a step of arranging a front lens group and a rear lens group along an optical axis and in order from an object side, the rear lens group comprising a first lens unit having a positive refracting power, a second lens unit having a negative refracting power, and a third lens unit having a positive refracting power, and
a step of, upon zooming from a wide-angle end state to a telephoto end state, varying a space between the front lens group and the first lens unit, increasing a space between the first lens unit and the second lens unit from $d12w$ to $d12t$, and decreasing a space between the second lens unit and the third lens unit from $d23w$ to $d23t$,
wherein the second lens unit comprises the following units arranged in order from the object side:
a 2a partial lens unit having a negative refracting power; and
a 2b partial lens unit having a negative refracting power,
wherein either the 2a partial lens unit or the 2b partial lens unit is movable so as to have a component in a direction perpendicular to the optical axis,
the zoom lens system satisfying conditions of the following expressions:

$$0.002 < (d12t - d12w)/BL < 0.110, \text{ and}$$

$$0.002 < (d23w - d23t)/BL < 0.090,$$

where $BL = fw123 \times (1 - \beta w123)$, and
where $fw123$ is a composite focal length of the first lens unit, the second lens unit, and the third lens unit in the wide-angle end state and $\beta w123$ is a composite magnification of the first lens unit, the second lens unit, and the third lens unit in the wide-angle end state.

8. The method of manufacturing a zoom lens system according to claim 7, satisfying conditions of the following expressions:

$$0.010 < (d12w/d13w) < 0.400, \text{ and}$$

$$0.010 < (d23t/d13t) < 0.400,$$

where $d13w$ is a space between the first lens unit and the third lens unit in the wide-angle end state and $d13t$ is a space between the first lens unit and the third lens unit in the telephoto end state.

9. The method of manufacturing a zoom lens system according to claim 7, satisfying a condition of the following expression:

$$0.300 < |\Delta x1|/BL < 1.000,$$

where $BL = fw123 \times (1 - \beta w123)$, and
where $\Delta x1$ is a moving distance of the first lens unit relative to an image plane upon zooming from the wide-angle end state to the telephoto end state, $fw123$ is the composite focal length of the first lens unit, the second lens unit, and the third lens unit in the wide-angle end state, and $\beta w123$ is the composite magnification of the first lens unit, the second lens unit, and the third lens unit in the wide-angle end state.

10. The method of manufacturing a zoom lens system according to claim 7, satisfying a condition of the following expression:

$$0.050 < (-f2)/BL < 0.900,$$

where $BL = fw123 \times (1 - \beta w123)$, and
where $f2$ is a focal length of the second lens unit, $fw123$ is the composite focal length of the first lens unit, the second lens unit, and the third lens unit in the wide-angle end state, and $\beta w123$ is the composite magnification of the first lens unit, the second lens unit, and the third lens unit in the wide-angle end state.

\* \* \* \* \*